US008070583B2

(12) United States Patent
Baerlocher et al.

(10) Patent No.: US 8,070,583 B2
(45) Date of Patent: Dec. 6, 2011

(54) SERVER BASED GAMING SYSTEM AND METHOD FOR SELECTIVELY PROVIDING ONE OR MORE DIFFERENT TOURNAMENTS

(75) Inventors: Anthony J. Baerlocher, Reno, NV (US); Richard J. Schneider, Las Vegas, NV (US); Cara L. Iddings, Henderson, NV (US); Vince Manfredi, Henderson, NV (US); Michael MacVittie, Reno, NV (US)

(73) Assignee: IGT, Reno, NV (US)

( * ) Notice: Subject to any disclaimer, the term of this patent is extended or adjusted under 35 U.S.C. 154(b) by 1162 days.

(21) Appl. No.: 11/830,198

(22) Filed: Jul. 30, 2007

(65) Prior Publication Data

US 2008/0070680 A1 Mar. 20, 2008

Related U.S. Application Data

(63) Continuation of application No. 11/760,328, filed on Jun. 8, 2007, now Pat. No. 7,684,882.

(60) Provisional application No. 60/804,642, filed on Jun. 13, 2006, provisional application No. 60/864,711, filed on Nov. 7, 2006.

(51) Int. Cl.
*A63F 13/00* (2006.01)

(52) U.S. Cl. ........................................... 463/16; 463/20

(58) Field of Classification Search ............... 463/16–20
See application file for complete search history.

(56) References Cited

U.S. PATENT DOCUMENTS

| | | | |
|---|---|---|---|
| 4,339,798 | A | 7/1982 | Hedges et al. |
| 4,582,324 | A | 4/1986 | Koza et al. |
| 4,669,731 | A | 6/1987 | Clarke |
| 4,679,143 | A | 7/1987 | Hagiwara |
| 4,695,053 | A | 9/1987 | Vazquez, Jr. et al. |
| 4,817,951 | A | 4/1989 | Couch et al. |
| 4,837,728 | A | 6/1989 | Barrie et al. |
| 4,856,787 | A | 8/1989 | Itkis |
| 4,871,171 | A | 10/1989 | Rivero |
| 5,042,809 | A | 8/1991 | Richardson |
| 5,083,271 | A | 1/1992 | Thacher et al. |
| 5,114,155 | A | 5/1992 | Tillery et al. |
| 5,152,529 | A | 10/1992 | Okada |
| 5,186,460 | A | 2/1993 | Fongeallaz et al. |
| 5,242,163 | A | 9/1993 | Fulton |
| 5,259,613 | A | 11/1993 | Marnell, II |
| 5,265,874 | A | 11/1993 | Dickinson et al. |

(Continued)

FOREIGN PATENT DOCUMENTS

AU 42326/89 3/1990

(Continued)

OTHER PUBLICATIONS

Global Player Casino Blackjack Game Rules Screen Shot [online] [retrieved on Apr. 1, 2008, publication date unknown]. Retrieved from the Internet at <URL: www.global-player.com>. (5 pages).

(Continued)

*Primary Examiner* — Dmitry Suhol
*Assistant Examiner* — Jay Trent Liddle
(74) *Attorney, Agent, or Firm* — K&L Gates LLP

(57) ABSTRACT

A gaming system includes a central server or controller operable to communicate a plurality of different commands to a plurality of gaming machines to provide non-tournament game play and to provide tournament game play on the same gaming machines.

32 Claims, 37 Drawing Sheets

U.S. PATENT DOCUMENTS

| | | | |
|---|---|---|---|
| 5,275,400 | A | 1/1994 | Weingardt et al. |
| 5,288,081 | A | 2/1994 | Breeding |
| 5,290,033 | A | 3/1994 | Bittner et al. |
| 5,359,510 | A | 10/1994 | Sabaliauskas |
| 5,393,057 | A | 2/1995 | Marnell, II |
| 5,397,125 | A | 3/1995 | Adams |
| 5,417,430 | A | 5/1995 | Breeding |
| 5,472,197 | A | 12/1995 | Gwiasda et al. |
| 5,544,892 | A | 8/1996 | Breeding |
| 5,560,603 | A | 10/1996 | Seelig et al. |
| 5,564,701 | A | 10/1996 | Dettor |
| 5,580,309 | A | 12/1996 | Piechowiak et al. |
| 5,611,730 | A | 3/1997 | Weiss |
| 5,645,486 | A | 7/1997 | Nagao et al. |
| 5,655,961 | A | 8/1997 | Acres et al. |
| 5,664,998 | A | 9/1997 | Seelig et al. |
| 5,702,304 | A | 12/1997 | Acres et al. |
| 5,711,715 | A | 1/1998 | Ringo et al. |
| 5,741,183 | A | 4/1998 | Acres et al. |
| 5,746,656 | A | 5/1998 | Bezick et al. |
| 5,752,882 | A | 5/1998 | Acres et al. |
| 5,755,621 | A | 5/1998 | Marks et al. |
| 5,758,875 | A | 6/1998 | Giacalone, Jr. |
| 5,761,647 | A | 6/1998 | Boushy |
| 5,769,716 | A | 6/1998 | Saffari et al. |
| 5,779,242 | A | 7/1998 | Kaufman |
| 5,779,544 | A | 7/1998 | Seelig et al. |
| 5,779,549 | A | 7/1998 | Walker et al. |
| 5,806,045 | A | 9/1998 | Biorge et al. |
| 5,816,918 | A | 10/1998 | Kelly et al. |
| 5,820,459 | A | 10/1998 | Acres et al. |
| 5,820,460 | A | 10/1998 | Fulton |
| 5,823,874 | A | 10/1998 | Adams |
| 5,823,879 | A | 10/1998 | Goldberg et al. |
| 5,833,536 | A | 11/1998 | Davids et al. |
| 5,836,817 | A | 11/1998 | Acres et al. |
| 5,851,148 | A | 12/1998 | Brune et al. |
| D404,436 | S | 1/1999 | McGahn et al. |
| 5,855,515 | A | 1/1999 | Pease et al. |
| 5,855,516 | A | 1/1999 | Eiba |
| 5,876,284 | A | 3/1999 | Acres et al. |
| 5,882,260 | A | 3/1999 | Marks et al. |
| 5,898,587 | A | 4/1999 | Bell et al. |
| 5,902,184 | A | 5/1999 | Bennett |
| 5,902,983 | A | 5/1999 | Crevelt et al. |
| 5,911,418 | A | 6/1999 | Adams |
| 5,917,725 | A | 6/1999 | Thacher et al. |
| 5,919,088 | A | 7/1999 | Weiss |
| 5,924,927 | A | 7/1999 | Matsuura et al. |
| 5,935,000 | A | 8/1999 | Sanchez, III et al. |
| 5,941,772 | A | 8/1999 | Paige |
| 5,947,820 | A | 9/1999 | Morro et al. |
| 5,951,397 | A | 9/1999 | Dickinson |
| 5,976,015 | A | 11/1999 | Seelig et al. |
| 5,980,384 | A | 11/1999 | Barrie |
| 5,993,316 | A | 11/1999 | Coyle et al. |
| 5,997,400 | A | 12/1999 | Seelig et al. |
| 6,012,982 | A | 1/2000 | Piechowiak et al. |
| 6,012,983 | A | 1/2000 | Walker et al. |
| 6,019,374 | A | 2/2000 | Breeding |
| 6,039,648 | A | 3/2000 | Guinn et al. |
| 6,048,271 | A | 4/2000 | Barcelou |
| 6,077,162 | A | 6/2000 | Weiss |
| 6,082,887 | A | 7/2000 | Feuer et al. |
| 6,089,975 | A | 7/2000 | Dunn |
| 6,089,976 | A | 7/2000 | Schneider et al. |
| 6,093,100 | A | 7/2000 | Singer et al. |
| 6,102,400 | A | 8/2000 | Scott et al. |
| 6,110,043 | A | 8/2000 | Olsen |
| 6,113,098 | A | 9/2000 | Adams |
| 6,120,378 | A | 9/2000 | Moody et al. |
| 6,128,550 | A | 10/2000 | Heidel et al. |
| 6,135,885 | A | 10/2000 | Lermusiaux |
| 6,142,872 | A | 11/2000 | Walker et al. |
| 6,146,273 | A | 11/2000 | Olsen |
| 6,159,095 | A | 12/2000 | Frohm et al. |
| 6,159,097 | A | 12/2000 | Gura |
| 6,159,098 | A | 12/2000 | Slomiany et al. |
| 6,162,122 | A | 12/2000 | Acres et al. |
| 6,165,071 | A | 12/2000 | Weiss |
| 6,165,072 | A | 12/2000 | Davis et al. |
| 6,168,521 | B1 | 1/2001 | Luciano et al. |
| 6,174,237 | B1 | 1/2001 | Stephenson |
| 6,186,893 | B1 | 2/2001 | Walker et al. |
| 6,190,255 | B1 | 2/2001 | Thomas et al. |
| 6,193,606 | B1 | 2/2001 | Walker et al. |
| 6,203,010 | B1 | 3/2001 | Jorasch et al. |
| 6,206,782 | B1 | 3/2001 | Walker et al. |
| 6,210,275 | B1 | 4/2001 | Olsen |
| 6,210,277 | B1 | 4/2001 | Stefan |
| 6,224,482 | B1 | 5/2001 | Bennett |
| 6,224,484 | B1 | 5/2001 | Okuda et al. |
| 6,224,486 | B1 | 5/2001 | Walker et al. |
| 6,231,445 | B1 | 5/2001 | Acres |
| 6,238,287 | B1 | 5/2001 | Komori et al. |
| 6,244,958 | B1 | 6/2001 | Acres |
| 6,257,981 | B1 | 7/2001 | Acres et al. |
| 6,287,202 | B1 | 9/2001 | Pascal et al. |
| 6,309,299 | B1 | 10/2001 | Weiss |
| 6,312,332 | B1 | 11/2001 | Walker et al. |
| 6,315,668 | B1 | 11/2001 | Metke et al. |
| 6,319,122 | B1 | 11/2001 | Packes, Jr. et al. |
| 6,319,127 | B1 | 11/2001 | Walker et al. |
| 6,322,451 | B1 | 11/2001 | Miura |
| 6,334,614 | B1 | 1/2002 | Breeding |
| 6,352,479 | B1 | 3/2002 | Sparks, II |
| 6,354,592 | B1 | 3/2002 | Virzi |
| 6,361,441 | B1 | 3/2002 | Walker et al. |
| 6,364,765 | B1 | 4/2002 | Walker et al. |
| 6,375,567 | B1 | 4/2002 | Acres |
| 6,390,299 | B1 | 5/2002 | Mellon et al. |
| 6,406,371 | B1 | 6/2002 | Baba et al. |
| 6,409,602 | B1 | 6/2002 | Wiltshire et al. |
| 6,416,408 | B2 | 7/2002 | Tracy et al. |
| 6,419,583 | B1 | 7/2002 | Crumby et al. |
| 6,425,828 | B2 | 7/2002 | Walker et al. |
| 6,431,983 | B2 | 8/2002 | Acres |
| RE37,885 | E | 10/2002 | Acres et al. |
| 6,468,155 | B1 | 10/2002 | Zucker et al. |
| 6,471,591 | B1 | 10/2002 | Crumby |
| 6,503,145 | B1 | 1/2003 | Webb |
| 6,508,709 | B1 | 1/2003 | Karmarkar |
| 6,514,139 | B2 | 2/2003 | Levitan |
| 6,533,664 | B1 | 3/2003 | Crumby |
| 6,543,774 | B1 | 4/2003 | Taylor |
| 6,572,471 | B1 | 6/2003 | Bennett |
| 6,585,592 | B1 | 7/2003 | Crumby |
| 6,604,997 | B2 | 8/2003 | Saidakovsky et al. |
| 6,607,195 | B2 | 8/2003 | Vancura |
| 6,607,438 | B2 | 8/2003 | Baerlocher et al. |
| 6,625,578 | B2 | 9/2003 | Spaur et al. |
| 6,638,170 | B1 | 10/2003 | Crumby |
| 6,648,753 | B1 | 11/2003 | Tracy et al. |
| 6,652,378 | B2 | 11/2003 | Cannon et al. |
| 6,656,047 | B1 | 12/2003 | Tarantino et al. |
| 6,688,973 | B2 | 2/2004 | Satloff et al. |
| 6,699,124 | B2 | 3/2004 | Suchocki |
| 6,712,699 | B2 | 3/2004 | Walker et al. |
| 6,712,702 | B2 | 3/2004 | Goldberg et al. |
| 6,729,959 | B1 | 5/2004 | Moore et al. |
| 6,733,390 | B2 | 5/2004 | Walker et al. |
| 6,755,743 | B1 | 6/2004 | Yamashita et al. |
| 6,775,580 | B2 | 8/2004 | Jira et al. |
| 6,786,824 | B2 | 9/2004 | Cannon |
| 6,790,143 | B2 | 9/2004 | Crumby |
| 6,800,030 | B2 | 10/2004 | Acres |
| 6,805,629 | B1 | 10/2004 | Weiss |
| 6,814,664 | B2 | 11/2004 | Baerlocher et al. |
| 6,817,948 | B2 | 11/2004 | Pascal et al. |
| 6,832,958 | B2 | 12/2004 | Acres et al. |
| 6,837,793 | B2 | 1/2005 | McClintic |
| 6,843,724 | B2 | 1/2005 | Walker et al. |
| 6,843,725 | B2 | 1/2005 | Nelson |
| 6,848,997 | B1 | 2/2005 | Hashimoto et al. |
| 6,860,808 | B2 | 3/2005 | Levitan |
| 6,860,810 | B2 | 3/2005 | Cannon et al. |
| 6,863,612 | B2 | 3/2005 | Willis |

| | | | |
|---|---|---|---|
| 6,869,361 | B2 | 3/2005 | Sharpless et al. |
| 6,875,110 | B1 | 4/2005 | Crumby |
| 6,884,167 | B2 | 4/2005 | Walker et al. |
| 6,887,151 | B2 | 5/2005 | Leen et al. |
| 6,887,159 | B2 | 5/2005 | Leen et al. |
| 6,890,258 | B2 | 5/2005 | Weiss |
| 6,896,616 | B2 | 5/2005 | Weiss |
| 6,899,628 | B2 | 5/2005 | Leen et al. |
| 6,908,390 | B2 | 6/2005 | Nguyen et al. |
| 6,929,546 | B2 | 8/2005 | Moore et al. |
| 6,929,550 | B2 | 8/2005 | Hisada |
| 6,932,708 | B2 | 8/2005 | Yamashita et al. |
| 6,935,958 | B2 | 8/2005 | Nelson |
| 6,939,229 | B2 | 9/2005 | McClintic |
| RE38,812 | E | 10/2005 | Acres et al. |
| 6,964,608 | B1 | 11/2005 | Koza |
| 6,966,832 | B2 | 11/2005 | Leen et al. |
| 6,979,267 | B2 | 12/2005 | Leen et al. |
| 6,984,177 | B2 | 1/2006 | Lydon et al. |
| 6,991,538 | B2 | 1/2006 | Cannon |
| 7,014,563 | B2 | 3/2006 | Stephan et al. |
| 7,192,352 | B2 | 3/2007 | Walker et al. |
| 7,303,475 | B2 | 12/2007 | Britt et al. |
| 7,364,510 | B2 | 4/2008 | Walker et al. |
| 7,387,571 | B2 | 6/2008 | Walker et al. |
| 7,470,187 | B2 | 12/2008 | Baerlocher et al. |
| 7,470,188 | B2 | 12/2008 | Baerlocher et al. |
| 7,470,189 | B2 | 12/2008 | Baerlocher et al. |
| 7,470,190 | B2 | 12/2008 | Baerlocher et al. |
| 7,684,874 | B2 * | 3/2010 | Schlottmann et al. ............ 700/9 |
| 7,689,302 | B2 * | 3/2010 | Schlottmann et al. .......... 700/91 |
| 7,878,899 | B2 * | 2/2011 | Duhamel et al. ................ 463/23 |
| 2001/0004609 | A1 * | 6/2001 | Walker et al. ................... 463/42 |
| 2001/0009865 | A1 | 7/2001 | Demar et al. |
| 2002/0028707 | A1 | 3/2002 | Pascal et al. |
| 2002/0039923 | A1 | 4/2002 | Cannon et al. |
| 2002/0132660 | A1 * | 9/2002 | Taylor ............................. 463/16 |
| 2002/0151342 | A1 | 10/2002 | Tracy et al. |
| 2002/0160825 | A1 | 10/2002 | Nicastro et al. |
| 2002/0177483 | A1 | 11/2002 | Cannon |
| 2003/0050111 | A1 | 3/2003 | Saffari |
| 2003/0060264 | A1 | 3/2003 | Chilton et al. |
| 2003/0114218 | A1 | 6/2003 | McClintic |
| 2003/0130041 | A1 | 7/2003 | Pascal et al. |
| 2003/0176219 | A1 | 9/2003 | Manfredi et al. |
| 2003/0186745 | A1 | 10/2003 | Nguyen et al. |
| 2003/0190960 | A1 | 10/2003 | Jokipii et al. |
| 2003/0199321 | A1 | 10/2003 | Williams |
| 2004/0029631 | A1 | 2/2004 | Duhamel |
| 2004/0132521 | A1 | 7/2004 | Peterson |
| 2004/0142750 | A1 | 7/2004 | Glisson et al. |
| 2004/0176167 | A1 | 9/2004 | Michaelson et al. |
| 2004/0204226 | A1 | 10/2004 | Foster et al. |
| 2004/0204243 | A1 | 10/2004 | de Mello Costa |
| 2004/0224773 | A1 | 11/2004 | Sham |
| 2004/0229700 | A1 | 11/2004 | Cannon et al. |
| 2004/0242325 | A1 | 12/2004 | Levitan et al. |
| 2004/0248652 | A1 | 12/2004 | Massey et al. |
| 2005/0005127 | A1 | 1/2005 | Rowe et al. |
| 2005/0043072 | A1 | 2/2005 | Nelson |
| 2005/0043088 | A1 | 2/2005 | Nguyen et al. |
| 2005/0043089 | A1 | 2/2005 | Nguyen et al. |
| 2005/0043094 | A1 | 2/2005 | Nguyen et al. |
| 2005/0054431 | A1 | 3/2005 | Walker et al. |
| 2005/0071024 | A1 | 3/2005 | Henshaw |
| 2005/0102047 | A1 | 5/2005 | Ottofy |
| 2005/0148380 | A1 | 7/2005 | Cannon et al. |
| 2005/0153760 | A1 | 7/2005 | Varley |
| 2005/0170892 | A1 | 8/2005 | Atkinson |
| 2005/0181856 | A1 | 8/2005 | Cannon et al. |
| 2005/0192089 | A1 | 9/2005 | Blatter et al. |
| 2005/0208989 | A1 | 9/2005 | Kane et al. |
| 2005/0215310 | A1 | 9/2005 | Boyd et al. |
| 2005/0221882 | A1 | 10/2005 | Nguyen et al. |
| 2005/0233794 | A1 | 10/2005 | Cannon et al. |
| 2005/0236068 | A1 | 10/2005 | Jansheski |
| 2005/0255919 | A1 | 11/2005 | Nelson |
| 2005/0267610 | A1 | 12/2005 | Shinoda |
| 2005/0278041 | A1 | 12/2005 | Bortnik et al. |
| 2005/0288101 | A1 | 12/2005 | Lockton et al. |
| 2005/0288803 | A1 | 12/2005 | Ropp et al. |
| 2006/0003835 | A1 | 1/2006 | Olive |
| 2006/0019734 | A1 | 1/2006 | Roemer |
| 2006/0019744 | A1 | 1/2006 | Roemer |
| 2006/0030407 | A1 | 2/2006 | Thayer |
| 2006/0030959 | A1 | 2/2006 | Duhamel |
| 2006/0030960 | A1 | 2/2006 | Duhamel et al. |
| 2006/0040735 | A1 | 2/2006 | Baerlocher |
| 2006/0055113 | A1 | 3/2006 | Levi |
| 2006/0058103 | A1 | 3/2006 | Danieli et al. |
| 2006/0063580 | A1 | 3/2006 | Nguyen et al. |
| 2006/0082056 | A1 | 4/2006 | Kane et al. |
| 2006/0089189 | A1 | 4/2006 | Harvey |
| 2006/0105839 | A1 | 5/2006 | Graeve et al. |
| 2006/0128453 | A1 | 6/2006 | Hoffman |
| 2006/0128460 | A1 * | 6/2006 | Muir et al. ...................... 463/16 |
| 2006/0128472 | A1 | 6/2006 | Beavers |
| 2006/0135253 | A1 | 6/2006 | George et al. |
| 2006/0136079 | A1 | 6/2006 | Stern |
| 2006/0138728 | A1 | 6/2006 | Gordon et al. |
| 2006/0148565 | A1 | 7/2006 | Gauselmann et al. |
| 2006/0157934 | A1 | 7/2006 | Yoseloff et al. |
| 2006/0160600 | A1 | 7/2006 | Hill et al. |
| 2006/0160608 | A1 | 7/2006 | Hill et al. |
| 2006/0161276 | A1 | 7/2006 | Soltani |
| 2006/0165254 | A1 | 7/2006 | Fujimoto et al. |
| 2006/0177109 | A1 | 8/2006 | Storch |
| 2006/0178185 | A1 | 8/2006 | Weis |
| 2006/0178202 | A1 | 8/2006 | Hughes et al. |
| 2006/0183540 | A1 | 8/2006 | Grauzer et al. |
| 2006/0202422 | A1 | 9/2006 | Bahar |
| 2006/0214372 | A1 | 9/2006 | Picken |
| 2006/0223638 | A1 | 10/2006 | Koyama et al. |
| 2006/0226605 | A1 | 10/2006 | Kenny |
| 2006/0229122 | A1 | 10/2006 | Macke |
| 2006/0232012 | A1 | 10/2006 | Boyer |
| 2006/0241795 | A1 | 10/2006 | Weingardt et al. |
| 2006/0247012 | A1 | 11/2006 | Walker et al. |
| 2006/0247955 | A1 | 11/2006 | Humphrey |
| 2006/0252521 | A1 | 11/2006 | Gururajan et al. |
| 2006/0252554 | A1 | 11/2006 | Gururajan et al. |
| 2006/0258427 | A1 | 11/2006 | Rowe et al. |
| 2006/0258442 | A1 | 11/2006 | Ryan |
| 2006/0293099 | A1 | 12/2006 | Cooper |
| 2007/0015587 | A1 | 1/2007 | Glisson et al. |
| 2007/0087809 | A1 * | 4/2007 | Baerlocher ..................... 463/16 |
| 2007/0087823 | A1 | 4/2007 | Walker et al. |
| 2007/0090599 | A1 | 4/2007 | Hamilton |
| 2007/0117621 | A1 | 5/2007 | Walker et al. |
| 2007/0129147 | A1 | 6/2007 | Gagner |
| 2007/0135950 | A1 | 6/2007 | Oliveras |
| 2007/0135951 | A1 | 6/2007 | Romik et al. |
| 2007/0167239 | A1 | 7/2007 | O'Rourke |
| 2007/0173318 | A1 | 7/2007 | Abbott |
| 2007/0218968 | A1 | 9/2007 | Snow et al. |
| 2007/0243936 | A1 | 10/2007 | Binenstock et al. |
| 2007/0259709 | A1 | 11/2007 | Kelly et al. |

FOREIGN PATENT DOCUMENTS

| | | |
|---|---|---|
| CA | 2527367 | 5/2007 |
| CA | 2527416 | 5/2007 |
| EP | 1 672 596 | 6/2006 |
| GB | 2 161 008 | 1/1986 |
| WO | WO 98/51384 | 11/1998 |
| WO | WO 00/20082 | 4/2000 |
| WO | WO 01/91075 | 11/2001 |
| WO | WO 2005/110563 | 11/2005 |
| WO | WO 2006/014833 | 2/2006 |
| WO | WO 2006/045113 | 4/2006 |
| WO | WO 2006/096752 | 9/2006 |
| WO | WO 2007/006002 | 1/2007 |
| WO | WO 2007/044785 | 4/2007 |

OTHER PUBLICATIONS

Golden Palace Multi Table Tournaments Game Description [online] [retrieved on Apr. 4, 2008, publication date unknown]. Retrieved from the Internet at <URL: http://www.goldenpalacepoker.com/tournaments.html>. (13 pages).
InterCasino Blackjack Game Rules [online] [retrieved on Apr. 1, 2008, publication date unknown]. Retrieved from the Internet at <URL: http://www.intercasino.com/games/blackjack/>. (8 pages).
InterCasino Craps Game Rules [online] [retrieved on Apr. 1, 2008, publication date unknown]. Retrieved from the Internet at <URL: http://www.intercasino.com/games/craps/>. (10 pages).
InterCasino Multi Line Slots Game Rules [online] [retrieved on Apr. 2, 2008, publication date unknown]. Retrieved from the Internet at <URL: http://www.intercasino.com/hlep/rules/multilineslots.shtml>. (49 pages).
InterCasino Roulette Game Rules [online] [retrieved on Apr. 1, 2008, publication date unknown]. Retrieved from the Internet at <URL: http://www.intercasino.com/games/roulette/>. (7 pages).
InterCasino Slots Game Rules [online] [retrieved on Apr. 1, 2008, publication date unknown]. Retrieved from the Internet at <URL: http://www.intercasino.com/games/slots/>. (13 pages).
InterCasino Tournaments Game Rules [online] [retrieved on Mar. 31, 2008, publication date unknown]. Retrieved from the Internet at <URL: http://www.intercasino.com/help/rules/tournaments.shtml>. (5 pages).
Lasseters Aztec Game Rules [online] [retrieved on Apr. 2, 2008, publication date unknown]. Retrieved from the Internet at <URL: http://www.lasseters.com/game/rules/las_aztec.jsp>. (3 pages).
Lasseters Hollywood Legends Game Rules [online] [retrieved on Apr. 2, 2008, publication date unknown]. Retrieved from the Internet at <URL: https://austrust.lasseters.com.au/en/rules/help/html/HollywoodLegens.html>. (3 pages).
Lasseters Psychedelia Game Rules [online] [retrieved on Apr. 2, 2008, publication date unknown]. Retrieved from the Internet at <URL: https://austrust.lasseters.com.au/en/rules/help/html/Psychedelia.html>. (3 pages).
Omni Casino Private Room Explanation [online] [retrieved on Apr. 2, 2008, publication date unknown]. Retrieved from the Internet at <URL: http://www.omnicasino.com>. (1 page).
Omni Casino What is a Tournament? Explanation [online] [retrieved on Apr. 2, 2008, publication date unknown]. Retrieved from the Internet at <URL: http://www.omnicasino.com>. (4 pages).
Parabol Casino Tournament Game Rules Screen Shot [online] [retrieved on Apr. 1, 2008, publication date unknown]. Retrieved from the Internet at <URL: www.parabolcasino.com>. (1 page).
Reviews on Tetris Deluxe (GB) at dooyoo.co.uk website (www.dooyoo.co.uk/gameboy-game/tetris-deluxe/reviews/, 9 pages.).
Starluck.com World Slots Tournament Rules Screen Shots [online] [retrieved on Apr. 4, 2008, publication date unknown]. Retrieved from the Internet at <URL: www.starluck.com>. (2 pages).
Team Tiger News 2-Stage Freeroll Tournaments News Letter sent Apr. 19, 2004 from TigerGaming.com. (2 pages).
Team Tiger News "Winner Take All" Tournament News Letter Apr. 2004 from TigerGaming.com. (2 pages).
William Hill 3 Card Poker Game Rules [online] [retrieved on Apr. 1, 2008, publication date unknown]. Retrieved from the Internet at <URL: http://www.williamhillcasino.com/rules_poker_3_card.htm>. (3 pages).
William Hill Multi-Hand Blackjack Game Rules [online] [retrieved on Apr. 1, 2008, publication date unknown]. Retrieved from the Internet at <URL: http://www.williamhillcasino.com/rules_blackjack_multi-hand.htm>. (4 pages).
William Hill Multi-Player Blackjack Game Rules [online] [retrieved on Apr. 1, 2008, publication date unknown]. Retrieved from the Internet at <URL: http://www.williamhillcasino.com/rules_blackjack_multi.htm>. (5 pages).
William Hill One Spin Wonder Roulette Game Rules [online] [retrieved on May 12, 2008, publication date unknown]. Retrieved from the Internet at <URL: http://www.williamhillcasino.com>. (2 pages).
William Hill Single Player Blackjack/Multi-Split Blackjack Game Rules [online] [retrieved on Apr. 1, 2008, publication date unknown]. Retrieved from the Internet at <URL: http://www.williamhillcasino.com/rules_blackjack_single.htm>. (4 pages).
William Hill Slots Game Rules [online] [retrieved on Apr. 1, 2008, publication date unknown]. Retrieved from the Internet at <URL: http://www.williamhillcasino.com/rules_slots.htm>. (9 pages).
Written Opinion of the International Searching Authority for Application No. PCT/US07/70740 mailed on Sep. 30, 2008. (6 pages).
Diamond Dash Advertisement [online] [retrieved on Mar. 31, 2004]. Retrieved from the Internet at <URL: http://www.arcadeplanet.com/images/diamond_dash.jpg>. (1 page).
EZ-Pay and Related Brochures, written by IGT, published in Dec. 2000. (15 pages).
Gamblers Bonus Advertisement [online] [retrieved on Nov. 20, 2007]. Retrieved from the Internet at <URL: http://www.gamblersbonus.com>. (5 pages).
IGT Gaming Systems Brochure, written by IGT, published in 2002. (16 pages).
Instant Slotto Article, written by Strictly Slots, published in Apr. 2001. (3 pages).
"Letter from Mr. McClarnon regarding disclosure of U.S. Patent No. 6,409,602; dated Jun. 1, 2008." (1 page).
Office Action dated Aug. 12, 2003 for U.S. Appl. No. 09/960,762. (8 pages).
Office Action dated Apr. 27, 2004 for U.S. Appl. No. 09/960,762. (8 pages).
Player Tracking and Related Brochures, written by IGT, published in Aug. 2001. (1 page).
Reel 'Em In-Big Bass Bucks Article, published by Strictly Slots in Aug. 2005. (1 page).
Silver Strike Advertisement and Pictures, written by Anchor Gaming, published in Dec. 1997. (3 pages).
Take Your Pick Article, written by Strictly Slots, published in Mar. 2001. (1 page).
Tournamania Advertisement, written by Atronic Casino Technology, Ltd., published in 2005. (2 pages).
Diamond Dash Advertisement [online] [retrieved on Mar. 31, 2004]. Retrieved from the Internet at <URL: http://www.arcadeplanet.com/images/diamond_dash.jpg>.
EZ-Pay and Related Brochures, written by IGT, published in Dec. 2000.
Gamblers Bonus Advertisement [online] [retrieved on Nov. 20, 2007]. Retrieved from the Internet at <URL: http://www.gamblersbonus.com>.
Instant Slotto Article, written by Strictly Slots, published in Apr. 2001.
Office Action dated Aug. 12, 2003 for U.S. Appl. No. 09/960,762.
Office Action dated Apr. 27, 2004 for U.S. Appl. No. 09/960,762.
Player Tracking and Related Brochures, written by IGT, published in Aug. 2001.
Reel 'Em In-Big Bass Bucks Article, published by Strictly Slots in Aug. 2005.
Silver Strike Advertisement and Pictures, written by Anchor Gaming, published in Dec. 1997.
Take Your Pick Article, written by Strictly Slots, published in Mar. 2001.
Tournamania Advertisement, written by Atronic Casino Technology, Ltd., published in 2005.
IGT Gaming Systems Brochure, written by IGT, published in 2002.
"Letter from Mr. McClarnon regarding disclosure of U.S. Patent No. 6,409,602; dated Jun. 1, 2008."

* cited by examiner

FIG. 7

Table of Possible Elements of Player Qualification for the Tournament

122

| | |
|---|---|
| Player Qualifier | Selection of player qualifiers the player must meet in order to qualify for the tournament, such as the amount of credits wagered, an amount credits won, a jackpot win or a specific game outcome, such as a bonus win. |
| Player Qualifier Schedule | Selection of the Date Range, the Days of Week, and the Hour Range in day for the tournament. |
| Player Qualifier | Determine if the player qualifies for the tournament based on player tracking information which may include but not limited to the Player's Ranking, the Player's Birthday, the Player's Anniversary or if the Player is a New Member |
| Tournament Available | Determine the time after qualifying that the player can play the tournament session. The gaming system may enable the player to immediately play in the tournament, to play in the tournament a certain or predetermined amount of time after qualifying for the tournament or at a scheduled tournament time. |
| Time Period for Accruing Tournament Qualifiers | Determine if a player may accrue qualifiers over a certain time period or if the qualifier is only limited to what happens in a single session on a gaming machine. |

FIG. 22A

382

| Tournament - Time 1 | | |
|---|---|---|
| Symbol Combination | Associated Points | Chance of Generating the Symbol Combination |
| 7 7 7 7 7 | 100,000 | .001% |
| BAR BAR BAR BAR BAR | 1000 | 1% |
| 7 7 7 | 500 | 2% |
| BAR BAR BAR | 100 | 4% |

FIG. 22B

382

| Tournament - Time 2 | | |
|---|---|---|
| Symbol Combination | Associated Points | Chance of Generating the Symbol Combination |
| 7 7 7 7 7 | 100,000 | .05% |
| BAR BAR BAR BAR BAR | 1000 | 1% |
| 7 7 7 | 500 | 2% |
| BAR BAR BAR | 100 | 4% |

FIG. 22C

382

| Tournament - Time 3 | | |
|---|---|---|
| Symbol Combination | Associated Points | Chance of Generating the Symbol Combination |
| 7 7 7 7 7 | 100,000 | 1% |
| BAR BAR BAR BAR BAR | 1000 | 1% |
| 7 7 7 | 500 | 2% |
| BAR BAR BAR | 100 | 4% |

FIG. 22D

382

| Tournament - Time 4 | | |
|---|---|---|
| Symbol Combination | Associated Points | Chance of Generating the Symbol Combination |
| 7 7 7 7 7 | 100,000 | 0% |
| BAR BAR BAR BAR BAR | 1000 | 1% |
| 7 7 7 | 500 | 2% |
| BAR BAR BAR | 100 | 4% |

SERVER BASED GAMING SYSTEM AND METHOD FOR SELECTIVELY PROVIDING ONE OR MORE DIFFERENT TOURNAMENTS

PRIORITY CLAIM

This application is a continuation application of, claims priority to and the benefit of U.S. patent application Ser. No. 11/760,328, filed on Jun. 8, 2007, which is a non-provisional application of, claims priority to and the benefit of U.S. Provisional Patent Application Ser. No. 60/804,642 filed on Jun. 13, 2006, and is a non-provisional application of, claims priority to and the benefit of U.S. Provisional Patent Application Ser. No. 60/864,711, filed on Nov. 7, 2006, the entire contents of these applications are incorporated herein by reference.

CROSS-REFERENCE TO RELATED APPLICATIONS

This application relates to the following co-pending commonly owned patent applications: "SERVER BASED GAMING SYSTEM AND METHOD FOR SELECTIVELY PROVIDING ONE OR MORE DIFFERENT TOURNAMENTS," Ser. No. 11/760,292; "SERVER BASED GAMING SYSTEM AND METHOD FOR SELECTIVELY PROVIDING ONE OR MORE DIFFERENT TOURNAMENTS," Ser. No. 11/760,346; "SERVER BASED GAMING SYSTEM AND METHOD FOR SELECTIVELY PROVIDING ONE OR MORE DIFFERENT TOURNAMENTS," Ser. No. 11/760,307; "SERVER BASED GAMING SYSTEM AND METHOD FOR SELECTIVELY PROVIDING ONE OR MORE DIFFERENT TOURNAMENTS," Ser. No. 11/830,441; "SERVER BASED GAMING SYSTEM AND METHOD FOR SELECTIVELY PROVIDING ONE OR MORE DIFFERENT TOURNAMENTS," Ser. No. 11/830,262; "SERVER BASED GAMING SYSTEM AND METHOD FOR SELECTIVELY PROVIDING ONE OR MORE DIFFERENT TOURNAMENTS," Ser. No. 11/830,246; and "SERVER BASED GAMING SYSTEM AND METHOD FOR SELECTIVELY PROVIDING ONE OR MORE DIFFERENT TOURNAMENTS," Ser. No. 11/830,471.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming device manufacturers strive to make wagering gaming devices that provide as much enjoyment, entertainment and excitement as possible for players. Gaming tournaments, such as slot tournaments, are exciting for certain players and are a widely used form of casino promotion. Generally, a slot tournament is a group event where a plurality of players pay for or otherwise qualify to join the tournament. The players individually play the tournament on designated gaming machines. These designated gaming machines have the same gaming machine paytables. The players may either play the same number of games, play for the same allotted period of time or play with the same allotted initial amount of money or number of credits. The winner or winners of the tournament are determined based on a highest tournament point score or a highest individual game score. Certain tournament games have been slot games and poker games.

More specifically, in a time based slot tournament, the gaming machines used for the tournament are specially configured gaming machines that, upon the issuance of a start command by a game controller or operator, allow the players to play as fast as they can without requiring the player to input any additional money. For each player, the wins during the tournament are accumulated, held and displayed by the gaming machine as that player's points. At the end of the period of time, all of the gaming machines are disabled. The person having the highest accumulated number of points obtained during the tournament period is the winner. The winner is awarded a prize.

The end of known tournament sessions may be determined by more than one factor, such as when the player runs out of time or credits. For example, each tournament player receives 1000 credits to bet and fifteen minutes to play the game. When the player runs out of the 1000 credits or fifteen minutes pass, the player's tournament game play is terminated.

Tournaments are generally run on specially set-up gaming machines which are commonly grouped together in a dedicated room or area in the casino. Tournament gaming machines grouped in a particular room limits the public's ability to view the tournament. Moreover, these gaming devices are dedicated for playing in a tournament and are therefore not played when a tournament is not in progress. That is, the dedicated tournament gaming machines are only active during tournament play and do not provide player's the ability to play other, non-tournament games on these dedicated gaming machines. This gaming machine dedication is costly to a casino because they take up floor space in the casino and because they are unoccupied or not played for significant amounts of time.

It should be appreciated that even in situations where certain gaming machines are not always dedicated for playing in a tournament, converting the gaming machines for use in the play of a tournament requires extensive set-up for the tournament. For each such tournament, a group of gaming machines is roped off to create a tournament area. Each tournament gaming machine must be taken out of service for a casino worker to switch or adjust the hardware and/or software of the gaming machine, and each of the gaming machines have to be rebooted to implement the specific tournament game. Upon completion of the tournament, a casino worker has to switch or adjust the hardware and/or software of each of the gaming machines back to the original hardware and/or software and reboot each gaming machine for regular or non-tournament play. This time intensive set-up and breakdown of the tournament gaming machines is expensive to the casino because of the idleness of the gaming machines during this time and the cost of the labor for the set-up and breakdown of the tournament. Additionally, certain smaller casinos do not have enough floor space to dedicate certain gaming machines to a tournament. For example, riverboat casinos are often too small to have dedicated tournament areas and are also too small to incur extensive set-up and take down costs for a tournament.

It should also be appreciated that the intensive set-up and breakdown process inherently requires that players play the tournament during the time the gaming machines are in tournament mode. This manner of setup requires an inflexible schedule of play for the players because the players must play the tournament gaming machines at the time allotted by a casino. Certain players often must leave the gaming machine they are playing and go to one of the specific tournament gaming machines to participate in the tournament. Thus, current tournaments do not enable players to play at one's leisure. To incorporate even a small amount of flexibility of when players may participate in the tournament, a casino has to allow the gaming machines to remain in tournament mode for extended periods of time which reduces playing time of non-tournament play and which does not maximize use of floor space. If a casino allows flexibility, a number of gaming machines in tournament mode may be completely unoccupied because players may not be playing them at all times. For example, to have a small window of flexibility, a casino enables the 100 tournament players to play between 8 am and 1 pm and allot 25 gaming machines to the tournament. During the designated time interval (i.e., 8 am and 1 pm) there may be no players on the gaming machines at some points in time, thus wasting valuable gaming machine time and casino floor space. At some points, there may also be players wanting to play the tournament, thereby wasting player time.

Additionally, current tournament modes often require an announcer to inform the players of the tournament schedule or status. Certain players are intimidated or annoyed by such announcers and as a result avoid tournaments so they do not have to listen to the announcers. Additionally, often players must be in a certain range of the tournament room to hear the announcer and be aware of an upcoming tournament. This setup does not provide a way for informing all players of the tournament and other pertinent tournament information.

With no way of informing current players about the tournament, casinos lose out on a valuable marketing tool for the tournament. They also have no way to inform target players who are likely to be interested in the tournament, or to encourage tournament play by informing players of entry requirements.

Therefore, there is a need for a new gaming system to improve aspects of the configuration and implementation of tournament game play.

SUMMARY

One embodiment of the present disclosure relates to a gaming system including a central server or controller operable to communicate a plurality of different commands, instructions or other communications to a plurality of gaming devices to provide non-tournament game play and communicate a plurality of different commands, instructions or other communications to provide tournament game play on the same gaming devices or machines. The gaming devices or machines of the gaming system are operable to switch from non-tournament game play mode to tournament game play mode upon receipt of such commands, instructions or other communications from the central server or controller. Upon completion of a tournament, the gaming system is operable to switch the gaming devices or machines used in the tournament back to non-tournament game play mode.

In one embodiment, a plurality of the gaming machines are in communication with or linked to a central controller, central server or remote host to form a gaming system. The central, controller, central server or remote host may be any suitable server or computing device which at least includes a processor and a memory or storage device. The central controller: (a) stores a plurality of different commands, instructions or other communications and is operable to cause the execution of these commands on display devices of the gaming machines which act as a "thin client," (b) stores a plurality of different commands, instructions or other communications, such as game programs, and sends one or more of the commands, instructions or other communications to each gaming machine and the individual gaming machines execute the received commands and therefore act as a "thick client" and/or (c) stores a plurality of different commands, instructions or other communications, such as game programs, and sends one or more of the different commands, instructions or other communications to each gaming machine and the individual gaming machines execute the received commands upon a further command from the central controller. In another embodiment, the central controller communicates with a plurality of computers over the internet and enables the tournament to be played over the internet or other suitable data network. It should be appreciated that the gaming system may include any suitable combinations of communication and game control between the central controller and the individual gaming machines to execute non-tournament game play and tournament game play.

In one embodiment, the central server or controller stores a plurality of different executable game programs. In this embodiment, each game program may represent a different setting, configuration, or mode of game play or type of game which may be played on one, more or each of the gaming machines in the gaming system.

In one embodiment, in non-tournament play mode, the central controller stores a plurality of commands such as wagering game programs. The central controller selects, executes and controls one or more of the game programs on each of the gaming machines in the gaming system. The selected game programs may be selected based on any suitable factor, such as but not limited to: (i) a player selection, (ii) a predetermination, (iii) a random determination, (iv) a player's wager amount, (v) a player's status (such as determined through a player tracking system), (vi) a level of a jackpot award, (vii) the time of day or amount of time a game program is played, and (viii) a gaming establishment operator command or instruction, and any combination thereof. In these embodiments, the gaming machine is utilized to display the game program, which is executed by the central controller, receive inputs from the player and provide any award to the player.

In one embodiment, the tournament game program is uploaded to the central controller. In one embodiment, the central controller also executes the selected tournament game program for each of the participating gaming machines in the tournament. That is, the gaming system utilizes the gaming machines to display the tournament game program which is executed and controlled by the central controller.

In other embodiments, one or more selected game programs are communicated from the central controller to one or more gaming machines and the gaming machine stores, selects and executes the game program. In one embodiment, the gaming machines switch programs from the non-tournament game program to the tournament program upon the tournament start time. In another embodiment, the gaming machines activate a tournament mode of the current game program. That is, instead of switching to a new game program, the gaming machine switches to a tournament mode of the gaming program currently running on the gaming machine. The gaming machine then communicates or messages the outcome of the game program to the central controller.

For example, in non-tournament game play, a gaming machine stores one or a plurality of instructions and commands communicated from the central controller. The gaming machine selects and executes a game from the stored instructions and commands. The selected game may be selected based on any suitable factor, such as but not limited to: (i) a player selection, (ii) a predetermination, (iii) a random determination, (iv) a player's wager amount, (v) a player's status (such as determined through a player tracking system), (vi) a level of a jackpot award, (vii) the time of day or amount of time a game program is played, (viii) a gaming establishment operator command, instruction or other communication, or any combination thereof.

In another example, in tournament game play, the game program of the tournament is communicated from the central controller to each of the participating gaming machines or to each gaming machine of the gaming system. Encoded in the game program are the times for the rounds and/or of the sessions of the tournament. Multiple tournament embodiments include players playing a tournament at a same time and at different times. Upon the start time of the tournament where all of the players play the tournament at the same time, each of the participating gaming machines automatically switches to tournament mode and executes the tournament game program at the same time. In another embodiment, the gaming machine only participates in the tournament game if it is an available gaming machine. In one embodiment, if the gaming machine is not available, a gaming system or operator selects another gaming machine to participate in the tournament. In another embodiment, the gaming system or operator makes the gaming machine available by setting up the non-tournament player on a different gaming machine. It should be appreciated that the gaming establishment may determine any suitable method of how to handle gaming machines that are scheduled to participate in a tournament that are being used for non-tournament game play at the start of a tournament.

In another embodiment, before a group tournament where the players play at the same time, the central controller messages the gaming machines scheduled to participate in the tournament to go into a pre-tournament mode a certain amount of time before the tournament start time, such as one hour before the scheduled tournament. If the gaming machine is unoccupied, the gaming machine posts a message to inform potential players that the gaming machine is unavailable because the gaming machine is awaiting a tournament. The gaming machine may additionally provide any other appropriate message to the player, such as how to enter the tournament, an advertisement, where to find a gaming machine with the same game or games and/or how to play another tournament. If a player is playing on one of the gaming machines allocated for the tournament in pre-tournament mode, the gaming establishment may determine rules for that gaming machine, such as whether to select another gaming machine for the tournament and enable the player to keep playing at the gaming machine.

In the embodiments where players play at different times, the tournament game program(s) may be: (i) previously downloaded to certain gaming machines which are designated to the players, or (ii) sent to and downloaded by the gaming machine upon an event. In one type of tournament, upon the logging onto a gaming machine, such as by insertion of a player tracking card or the entry of a player identification number, code or name, by a player that has an outstanding tournament entry that may be played at the player's chosen time, the gaming machine downloads that tournament game program from the central server. The gaming machine then enables the player to play the tournament game at that gaming machine. It should be appreciated that the player may or may not play the tournament game at that gaming machine.

In one embodiment, each participating gaming machine communicates the game results at certain time intervals to the central controller so that results of the tournament are displayed to players during the tournament in real time.

In another embodiment, the central controller communicates a plurality of executable game programs from a stored set or pool of game programs to a plurality of gaming machines. In this embodiment, upon a triggering event, such as the initiation of a tournament, the central controller determines which game program that one, a plurality or all of the gaming machines will execute. The central controller communicates the selected game program to one, a plurality or all of the gaming machines and the gaming machines execute the game program selected by the central controller.

In one embodiment, the gaming system disclosed herein is integrated with one or more player tracking systems. In one embodiment, the gaming system and/or the player tracking system tracks the participating player's gaming activity at each of the gaming machines the player plays. In one such embodiment, the gaming system, the individual gaming machine and/or the associated player tracking system timely tracks when a player initiates play of or logs onto a gaming machine by the insertion of their playing tracking card, enters identifying information, such as a player number or cashes in to begin a gaming session and also timely tracks when a player ends play of or logs off the gaming machine by removal of their player tracking card or concludes play for that gaming session. That is, in one embodiment, the gaming system, the individual gaming machine and/or the associated player tracking system tracks a player logging onto the gaming machine and a player logging off of the gaming machine for each gaming session. During one or more gaming sessions, the gaming system, the individual gaming machine and/or the associated player tracking system tracks any suitable information, such as any amounts wagered, average wager amounts and/or the time wagers are placed. In different embodiments, for one or more players, the player tracking system includes the player's account number, the player's card number or other identification number, the player's first name, the player's surname, the player's preferred name or nickname, the player's player tracking ranking, any promotion status associated with the player's player tracking card, the player's address, the player's birthday, the player's anniversary, the player's recent gaming sessions, or any other suitable data. It should be appreciated that the player tracking data may be used for any suitable purpose in non-tournament game play and in tournament game play.

In one embodiment, prior to tournament game play, the tournament must be configured. The gaming system is operable to be configured by a plurality of methods. The gaming system is operable to upload one or more pre-configured tournament game programs to host a tournament. That is, a distributor configures and sells a plurality of different pre-configured tournament game programs. The gaming system is operable to upload and store pre-configured game programs and to cause the play of the tournament based on the pre-configured game program.

The gaming system is operable to run a tournament on an uploaded pre-configured game program that is operable to be modified, enabling a gaming establishment operator to customize the tournament. That is, a gaming establishment may purchase a plurality of pre-configured game programs and upload the programs to the central server. The tournament game programs are configured for the gaming establishment operator to alter one or more default settings of the tournament. For example, the gaming establishment operator may change a parameter of the tournament, for example, the tournament award. The pre-configured tournament game programs enable a gaming establishment operator to customize the tournament in one or a plurality of ways. That is, the gaming establishment operator inputs one or more configuration guidelines that control one or more elements of the tournament.

Additionally, the gaming system is operable for the gaming establishment operator to completely create or customize a tournament. That is, the gaming system enables the gaming establishment operator to configure a new and unique tournament based on one or more gaming establishment operator selectable tournament configurations or tournament elements.

In different embodiments, a plurality of elements must be configured for an operable tournament. These configurable elements include the time and location of the tournament, the duration of the tournament, the type of tournament, any player qualification criteria for entry into the tournament, a list of qualified players, the game or games for the tournament and the scoring and prizes for the tournament.

More specifically, one of the configurable elements is a tournament type, such as an invited guest tournament, or an automatic or bonus tournament. The invited guest tournament has a predetermined guest list of players that may play in the tournament. Only players on this guest list may register for the tournament and play in the tournament. In this type of tournament, the guest list is loaded or manually entered into the gaming system prior to the play of the tournament. In one embodiment of an automatic or bonus tournament, any suitable number of guests may play the automatic tournament immediately, or upon a scheduled time or times upon meeting certain eligibility or qualification requirements, such as winning a tournament entry in a non-tournament game play bonus game.

In one embodiment, one of the configurable elements is the required qualifications or qualifiers for a player to play in the tournament. In certain embodiments, the player tracking system provides the gaming system with information used in the determination of a tournament qualification. It should be appreciated that any suitable qualifier may be considered for tournament entry, including but not limited to: an amount wagered, an amount won, a jackpot win, a bonus win, a player tracking rank or a win from another tournament. In certain embodiments, only players in the player tracking system are eligible to participate in the tournament.

In one embodiment, one of the configurable elements is what type of rounds the tournament will include. That is, one of the configurable elements is how the gaming system will enable the players to play in a tournament. A tournament may include a single round, where the gaming system enables each player to play a single play of the tournament. The tournament may include multiple rounds, where the gaming system enables each of the players to play multiple plays of the tournament.

In one embodiment, the tournament is a synchronized tournament. In a synchronized tournament, multiple players compete in the tournament at the same time. In one embodiment, each player plays the tournament on an assigned gaming machine and each player plays the tournament simultaneously. The players of the synchronized tournament play each round at a same time or relatively the same time. That is, the players of the synchronized tournament play the tournament on designated gaming machines as a group. If there are more players than designated gaming machines, the gaming system provides one or more sessions in each round. For example, if 100 players are competing against each other in the synchronized tournament and only 50 gaming machines are designated for the tournament, each round will include two separate sessions to enable each of the players a play of the tournament for each round. At the end of synchronized tournament play, the gaming system determines a winner based on determined game parameters, such as the winner is the player with the highest point total for each of the rounds.

In a synchronized tournament embodiment, the tournament configuration includes how the gaming machines for each player will be chosen. In one embodiment, the gaming establishment operator determines and assigns a gaming machine to each player. In another embodiment, the gaming establishment operator enters all of the players into the gaming system and the gaming system randomly determines and assigns a gaming machine to each person. That is, the gaming system determines and assigns a gaming machine for each player of the tournament. In another embodiment, the tournament is completely determined by the gaming system. That is, the gaming system determines the players and the gaming machines assigned to the each player. It should be appreciated that a gaming establishment may implement any suitable randomized method to randomly determine or assign a gaming machine to a player. In one embodiment, the random method of assigning gaming machines does not include input from the central controller but is completed by the gaming establishment by any suitable method. In another embodiment, a participating player may pick his or her own gaming machine for the tournament. For example, in a synchronized tournament, a player may enter a player tracking card or a player identification number into the gaming machine the player wants to play on, prior to the start of the tournament and play the tournament at that chosen gaming machine.

In other embodiments, the tournaments are self-scheduled tournaments. In the self-scheduled tournament, multiple players compete in the tournament at overlapping or different times. Each of the players play the tournament on a server based gaming machine of that player's choice. Each of the players plays the tournament during a designated time period (such as a day, a week, or a month). However, the gaming system enables the player to determine exactly when to play the game during that designated time period. Each of the players of the self-scheduled tournament may play a round of the tournament at different times, as long as the tournament play is within the designated time period. In the self-scheduled tournament, the player decides when to play the tournament game and which participating gaming machine to play the tournament on. At the end of the designated time period for the self-scheduled tournament play, the gaming system determines a winner based the determined game parameters, such as the winner is the player with the highest combined point total.

In other embodiments, the tournaments are configured as bonus tournaments. In one embodiment of a bonus tournament, during non-tournament game play, the gaming system awards the player a tournament game as an award or bonus. Upon receiving the bonus tournament entry, the gaming system enables the player to immediately play the bonus tournament at the awarding gaming machine. The winner is determined at the end of a certain time period, such as every day. At the end of tournament time period, the gaming system determines a winner based on the determined game parameters. Alternatively, the tournament is a delayed bonus tournament and the player is given an "entry" as their bonus. The entry enables a player to enroll or play a tournament at a later start time. In one embodiment, the bonus entry awarded to the player is for a synchronized tournament at a later date at the hosting gaming establishment.

In other embodiments, the tournaments are configured as on-demand tournaments. An on-demand tournament enables the player to request a tournament. A player sends a request to the central controller asking to be enrolled in the tournament. The central controller sends a message to the player regarding their request. In one embodiment, the tournament begins when a predetermined number of players enroll in the tournament. For example, a tournament begins when forty players request and enter the tournament. A player is enrolled against currently pending or enrolled players and the tournament starts as soon as forty players are enrolled. Until the forty players enroll in the tournament, the pending players may continue non-tournament game play until the start of the tournament.

In other embodiments, the tournament is a self-scheduled tournament that the gaming system enables the player to play instantly. In one such embodiment, the tournament is a self-scheduled tournament that the player may play instantly, but the results of the tournament are provided after an occurrence of a triggering event. For example, the player may have to wait until a certain time, or until a certain number of players have played the tournament game to know their final standing. Alternatively, the gaming system enables the player to play a tournament game against or according to a paytable. The gaming system compares the player's point total to a paytable. The gaming machine provides the player an award if they accrue a number of points associated with a payout.

In a further embodiment, the tournaments are configured as challenge tournaments. A player can search for other players and send a request that one or more players join them in a tournament. In one embodiment, the players each place a wager on the tournament with the winner receiving a designated portion of the combined wagers. The gaming establishment may retain a portion of the combined wagers, and runner-ups in the tournament may also receive smaller designated portions.

In one embodiment, the tournament configuration includes a maximum number of players for participation in the tournament and which gaming machines will participate in the tournament. The tournament configuration may include any suitable entry requirements to the tournament, such as entry fees.

It should be appreciated that the gaming system may determine one or more winners of a tournament in any suitable manner or score a tournament in any suitable manner. For example, in one embodiment, all of the players begin the tournament with a set number of points or credits to wager with and the player with the most accumulated points or credits at the end of the tournament is the winner. In another embodiment, the players have an unlimited number of points or credits to wager with and the player with the most accumulated points or credits at the end of the tournament wins.

In another embodiment, the player with the most occurrences of a designated event or a designated outcome is the winner. For example, the player with the most 777 symbol combinations generated during the tournament wins the tournament. In another example, the player with the most scatter pay occurrences wins the tournament. In another embodiment, the player with most occurrences of a single designated symbol wins the tournament. For example, the gaming system determines the winner of the tournament based on which player has accumulated or generated the most wild symbols during the tournament. In another embodiment, the player with the most occurrences or generations of one or more designated groups of symbols wins the tournament. In another embodiment, the player with the most occurrences of an event in a certain time period during the tournament is the winner of the tournament. For example, upon the occurrence of a triggering event, the gaming system monitors a designated outcome or event for a certain time period to determine the tournament winner.

In one embodiment, an occurrence of a designated event or outcome determines when the tournament ends. In one embodiment, the designated event or outcome is a designated event or outcome achieved by a single player. For example, when a single player achieves the symbol combination of five seven symbols, the tournament ends. In another embodiment, the designated event or outcome is a designated event or outcome achieved by each of a designated number of players. For example, when five players achieve the symbol combination of five seven symbols, the tournament ends. It should be appreciated that the tournament may end for any suitable reason.

In various alternative embodiments, the tournament can have multiple winners. In one such embodiment, the gaming system determines a first tournament winner based on a first method of scoring, such as the player with the most points or credits (as discussed above). The gaming system additionally determines one or more second tournament winners based on a second method of scoring, such as the most occurrences of a designated event, such as an occurrence of a symbol, a symbol combination, etc. In one example, the tournament has two different categories of scoring. The player with the most points or credits wins a first prize and the player with the most occurrences of a designated outcome or event wins a second prize. If the same player wins the most points and has the most occurrences of a designated outcome, then the same player wins the first and the second prizes. The gaming system may provide any suitable number of players wins or prizes based on any suitable criteria.

The tournament can include multiple winners in other suitable manners. For example, the gaming system determines one tournament winner based on a first method of scoring (such as the player with the most credits) and additionally determines one or more tournament winners of one or more intermittent awards or prizes. In one embodiment, the intermittent or intermediate award or prize is determined by a sub-tournament based on a suitable method of scoring. For example, the player with the most occurrences of a designated outcome or event during a time period of the tournament, which is a portion of or less than the total time period of the tournament, wins the intermittent award or prize. For example, the player with the most winning symbol combinations in the first five minutes wins an intermediate award or prize. In another example, the top five players with the most wins on a certain payline win intermittent prizes. In another embodiment, the player with the most occurrences of winning outcomes wins an intermediate award or prize. In another embodiment, the player with the most occurrences of winning outcomes in a row wins an intermediate award or prize. In another embodiment, the player with the most occurrences of losing outcomes in a row wins an intermediate award or prize. In another embodiment, the player with the highest single payout wins an intermediate award or prize. In another embodiment, the player with the highest average payout wins an intermediate award or prize. The gaming system may provide any suitable number of players wins or prizes based on any suitable criteria.

In other embodiments, a game outcome of one player may affect one or more of the games, points or credits of one or more other players. When a player achieves a designated outcome during a tournament, the gaming system changes one or more aspects of one or more other player's games, points or credits. For example, during a tournament, every time a player achieves a designated symbol combination, the gaming system provides that player an award funded by each of the other players. For example, Player A achieves the outcome of the symbol combination of lemon-lemon-orange-orange on the first payline. The gaming system provides Player A an award of $15 funded by the other players of the gaming system. That is, the gaming system takes credits from the non-triggering players and provides it to the triggering player. In one embodiment, the gaming system takes a set amount from each non-triggering player, such as $0.50 and provides the triggering player with the total. In another embodiment, the gaming system provides the triggering player a predetermined amount and the players fund the predetermined amount. For example, the amount is $20.00. When there are 5 non-triggering players, each player must pay $4.00. However, when there are 10 non-triggering players, each player must pay only $2.00. In another embodiment, when a player achieves a designated outcome during a tournament, the tournament play of one or more non-triggering players stops for a certain time period. For example, when a triggering player achieves a certain number of a designated symbol combination, the gaming system freezes tournament game play for a period of 15 seconds on the other gaming machines of one or more non-triggering players. In another embodiment, when a player achieves a designated outcome during a tournament, the tournament play time of one or more non-triggering player's decreases for a certain time period. In another embodiment, when a player achieves a designated outcome during a tournament, the tournament play for the triggering player increases for a certain amount of time. That is, the play of the tournament for the triggering player is extended. In another embodiment, when a player achieves a designated outcome during a tournament, the gaming system removes time from non-triggering players and provides such time to the triggering player. For example, when a player achieves a designated event, the gaming system takes a minute from the tournament time of each non-triggering tournament player and provides it to the triggering player. For example, if there is one triggering player and 27 non-triggering players, the triggering player's tournament game time is extended by 27 minutes and each of the 27 non-triggering tournament players' tournament time decreases by one minute. It should be appreciated that any suitable aspect of one or more player's game play may affect one or more aspects of other players' tournaments.

In one embodiment, the tournament configuration includes the game play and prize structure of the tournament. For example, the tournament configuration includes the tournament game, the paytable for the tournament game, the method of scoring for the tournament and any bonusing or bonus modes for that tournament game.

It should be appreciated that any suitable game or combinations of games may be employed as a tournament game or as a non-tournament game, including but not limited to slot, keno, bingo, bunco, poker, blackjack, craps, and checkers. In one embodiment, the gaming system is operable to convert any suitable game into a tournament game. That is, in one embodiment, the gaming system may take a suitable game and convert it to a tournament game using the existing game program. In one such embodiment, the gaming system disables certain features, such as one or more bonus features, in the tournament game. In another embodiment, the gaming system does not disable such features and enables the player to either keep the points from the bonus for the tournament total points or to keep the winnings won from the game or bonus features. For example, a bonus mode may slow down the tournament game and therefore, the gaming system enables the player to keep the winnings from that bonus game as credits to be used in non-tournament games.

In one embodiment, the tournament game is a customizable game which has a different theme or is not available as a primary or bonus game. This embodiment enables the gaming establishment to "brand" their tournament games to give them a specific look. Branding enables the tournament game to be associated with the specific gaming establishment. Branding is easily recognized by players who will associate the specific look with the specific gaming establishment and the tournament mode. The novelty of the new game look is exciting for certain players in part because it provides new stimulation, and is otherwise eye-catching to draw other players to be interested in the tournament. These custom games may include elements not available to non-tournament games, such as different themes or different paytables.

In one embodiment, a gaming establishment operator may customize one or more aspects of the game. That is, in one embodiment, the gaming system enables the gaming establishment operator to select the game of the tournament. The gaming system then enables the player to select further features or aspects of the selected game, such as the winning combinations for the tournament.

In one embodiment, the gaming establishment operator determines the winning outcomes of the tournament and the probability of the players generating the winning outcomes during the tournament. In one embodiment, the gaming system enables the gaming establishment operator to determine the likelihood of achieving the winning outcomes and the probability of the players achieving the outcomes.

In another embodiment, the present disclosure accomplishes a way of guaranteeing that at least one or more players in the tournament are provided an outcome that results in a large award or jackpot award being displayed to the player during the tournament. Some players have never seen gaming machines provide such large awards to players during tournament play or regular non-tournament play. Thus, in various embodiments described below, the tournament gaming system guarantees that at least one or more players receives a game outcome associated with a maximum award or top ranking during tournament game play.

More specifically, in one embodiment, the tournament is configured to guarantee that at least one player will achieve a designated outcome that is associated with a designated award amount, such as a maximum award amount, for a game played during the tournament. That is, in one embodiment, the tournament game outcomes include a game outcome that is associated with a maximum award, jackpot award or a maximum or large amount of points or non-redeemable credits. The tournament is configured such that at least one participating gaming machine of the tournament generates the game outcome associated with this maximum award during each tournament and displays or indicates the associated or maximum award to one of the players. This maximum award or jackpot award is not an overall win of the tournament, but is one of a plurality of tournament game awards displayed to a player during the course of the tournament. The gaming system accumulates each of the player's displayed awards during the course of the tournament to determine each player's overall tournament score or accumulated credit total. The gaming system determines the winner of the tournament based on each tournament player's overall tournament score at the end of the tournament. That is, the gaming system does not actually provide a monetary amount to a player for an individual tournament game award, such as the maximum award, but uses each tournament game award to determine the tournament winner.

For ease of discussion, the maximum award is used herein primarily to describe different embodiments of providing designated awards to a player. It should be appreciated the present disclosure is not limited to guaranteeing a display of maximum awards or outcomes and may include any suitable designated amount, designated award or designated prize.

In one embodiment, the gaming system changes the probability of achieving a maximum award until at least one gaming machine participating in the tournament generates the outcome associated with the maximum award and displays the maximum award to the player. For example, in one embodiment, the maximum award is associated with a winning game outcome that has an initial probability of being generated in the tournament. As the tournament progresses, if that winning game outcome has not been generated in association with one of the tournament games, the probability associated with that winning game outcome increases as the tournament progresses such that the probability of a gaming machine generating or providing the winning game outcome comes close to or reaches one-hundred percent by the end of the tournament.

In certain embodiments, the probability of generating a game outcome associated with a maximum award increases evenly for each participating gaming machine.

In certain embodiments, the probability of generating a game outcome associated with a maximum award increases differently for one or more participating gaming machines or does not increase at all for some participating gaming machines. The probability of generating a game outcome associated with a maximum award may be based on any suitable factor.

It should be appreciated that a single maximum award may be displayed to one or a plurality of players during a tournament and added to those players' overall tournament scores. It should also be appreciated that the tournament may include a plurality of maximum awards that may be displayed to a plurality of players during a tournament and added to those players' overall tournament scores.

In another embodiment, the tournament has a predetermined pool of game outcomes. Once a game outcome is generated by one of the gaming machines or a central controller during a tournament, that game outcome is unavailable to the other gaming machines for the duration of the tournament. In this embodiment, as each award or game outcome is provided to one of the players, the gaming system flags or removes the provided award or other game outcome from the predetermined set or pool. Once flagged or removed from the set or pool, the specific provided award or game outcome from that specific pool cannot be provided to the players again. This type of gaming system provides players with all of the available awards or other game outcomes over the course of the play cycle and guarantees the amount of awards displayed to the players during the course of the tournament. In one such embodiment, the predetermined pool of game outcomes includes one or more designated game outcomes associated with a maximum award or jackpot award. Therefore, the tournament is configured to guarantee that at least one gaming machine will generate the designated outcome and display a maximum award, a maximum amount or a jackpot award to a player during the play of the tournament. In another such embodiment, the predetermined pool of game outcomes includes one or more maximum awards or jackpot awards. The gaming system accumulates the awards displayed to the players and the maximum award or jackpot award counts towards the player's tournament score.

In another embodiment, one or more designated game outcomes are in a predetermined pool of game outcomes, and these designated game outcomes are associated with maximum or jackpot awards. In one embodiment, each of the other game outcomes is randomly determined. Upon an occurrence of a triggering event, the gaming system generates the game outcomes in the pool of outcomes and provides them to one or more players during the tournament. Therefore, at least one gaming machine displays a maximum award to the player during the course of the tournament. The gaming machine accumulates the maximum award in addition to the awards associated with other game outcomes generated for the player during the course of the tournament. The gaming system determines the tournament winner or winners based on each player's accumulated tournament score.

The tournament configuration is stored by the central controller and the gaming system invites players to participate in the tournament in any suitable manner based on the configured qualification criteria. The gaming system may invite players to participate in the tournament via the internet, postal mail, leaflets, gaming machines, on-screen messaging, signage, kiosks, player carding or in any other suitable manner.

The gaming system may enable the players to accept a tournament invite or register for a tournament via a gaming establishment employee, self-registration at a kiosk or at a gaming machine, the postal mail, the internet or in any other suitable manner.

The tournament invitation process and the tournament registration process may be integrated in any suitable manner in with a player tracking system.

It should be appreciated that the gaming system may provide any suitable messaging to the players before, during and after the tournament. For example, if the player tries to register for a tournament, but is not qualified for the tournament, a kiosk or a gaming machine informs the player as to why that player is not qualified. The display devices of the gaming machines may display the requirements and qualifications for tournament entry. Appropriate safeguards may be initiated to ensure that a non-qualified player is not able to register for the tournament.

In one embodiment, the central controller broadcasts performance messaging to one or more devices in the gaming system. In one embodiment, the central controller is incorporated with a sign manager that integrates with the central controller to display any suitable information. For example, if the central controller receives coin-in meters at a set rate, the central controller communicates with the sign manager based on that rate to broadcast suitable updates regarding player status's game and tournament results.

By utilization of the central server to communicate with each sign controller, the gaming system presents a wealth of information to the player about not only tournaments the player is participating in, but also other tournaments or jackpot awards that may be available to the player. Furthermore, the central server, the player tracking system and the sign controller configuration enables for the signs/display devices to be custom tailored to the player who is playing each gaming machine to provide the player with information that will be most beneficial to their gaming session.

The gaming system enables the registered players to play the tournament at the determined tournament times, depending on the type of tournament. For example, in a synchronized tournament, each of the players play the tournament at the same scheduled times. In a self-scheduled tournament, the gaming system provides the player times to play the tournament at registration. In a bonus tournament, the registration and tournament game play are immediate upon tournament qualification.

For example, in a single round synchronized tournament embodiment, the central controller sends the tournament game program to each of the participating gaming machines. It should be appreciated that the central controller may send the tournament game program at any point prior to the start of the tournament. In one embodiment, at a certain time period prior to the start of the tournament session, the central controller sends a message to display the available tournament credits and/or tournament minutes on the display device of each gaming machine participating in the tournament. The gaming system displays player information, such as a name or nickname of the participating players on one or more display devices. The gaming system begins the tournament and enables the players to play the tournament according to the tournament parameters. Upon an event during the tournament, each gaming machine sends the player's information and scores to the central server. The event may be any suitable event, such as an amount of time (i.e., every second or every minute) or upon the end of each game on that gaming machine. The central server causes the display of the player information on one or more display devices in the gaming establishment and/or on one or more display devices of the participating gaming machines and/or on the internet, thus providing up to date/real time ranking and scoring information for the tournament.

Upon completion of the synchronized tournament, the central controller determines a rank for each of the players according to the configured tournament rules. The gaming system awards a prize to the determined winner or winners. In one embodiment, a prize ticket is printed off at the gaming machine of the winner so that player does not have to leave the gaming machine. The gaming system sends a message, instruction or a command to each of the participating gaming machines causing the gaming machines to switch back into non-tournament play mode.

For example, in a single round self-scheduled tournament embodiment, the central controller sends the tournament game program to each of the participating gaming machines. Upon registration, a player is given a certain time period to play the tournament, such as between 6:00 am and 3:00 pm any time within the next week. During this designated time period, the gaming system enables the player to play the self-scheduled tournament at any of the participating gaming machines. In one embodiment of the self-scheduled tournament, only players that are members of the player tracking system may play the tournament.

Upon completion of the entire self-scheduled tournament, the central controller determines a rank for each of the players according to the configured tournament rules. The gaming system awards a prize to the determined winner or winners.

In one embodiment, the tournament is a self-scheduled tournament which includes multiple players and multiple rounds. That is, each player of the multiple players plays the tournament at that player's own pace after qualification for the tournament round. In this example of the multi-round self-scheduled tournament, the score of each round of the tournament counts towards a final tournament score which determines the winner of the tournament. The tournament may include any suitable number of rounds and the tournament may be configured using any suitable specifications.

For example, the tournament duration is a month and during that month, the player may play a limit of 25 rounds. This limit may be set by the gaming establishment in any suitable manner. The player may play only one round a day. The designated time period for the self-scheduled tournament is any time of the day upon qualification that day. That is, at any point during that day if a player meets the qualification criteria for that day, the gaming system sends a message to the player that the player is eligible to play a tournament round at any time the player wants before midnight on that date. This process can be repeated on 25 different days within the time frame the gaming system enables that player to play a round of the tournament. For example, to qualify to play a tournament round that day, a player must earn a certain number of player tracking points. Player tracking points are part of player tracking programs that are individually established by gaming establishments. Player tracking points may be earned in any suitable manner, such as by an amount wagered, time played, game wins or any other suitable method. In this example, to qualify for the tournament, the player must earn 100 points that day. Upon qualification, any server based gaming machine is operable to enable the qualified player to play the tournament. In one embodiment, the score of each of these 25 sessions will count towards a player's final tournament score. In an alternative embodiment, only a set number of the player's best sessions will count. At the end of the month, the gaming system provides the player with the highest final tournament score (the sum of each round score) an award or prize.

In another embodiment, the tournament is a multi-round combination tournament that includes the following two parts: a preliminary self-scheduled rounds and a final synchronized round. The first part of the tournament is a preliminary self-scheduled tournament that includes multiple players and multiple rounds. In this example of the multi-round combination tournament, the score of one or more of the preliminary rounds counts towards a final preliminary tournament round score which qualifies a player to play in a final synchronized round of the tournament. This final synchronized round is played at a certain time on a certain day and determines the winner of the multi-round combination tournament. That is, instead of each round contributing to a final tournament score, the preliminary tournament round scores determine qualification to play a final synchronized round to determine the tournament winner(s). The tournament may include any suitable number of preliminary rounds and the tournament may be configured using any suitable specifications. Upon qualification, any server based gaming machine is operable to enable the player to play tournament games for a preliminary round. The determined number of preliminary round scores contribute to the player's final preliminary tournament score.

For example, the designated time period for the preliminary self-scheduled rounds is a week and the preliminary round number limit is five. That is, during one week, a player may play the tournament game upon qualification that day. Five rounds count toward a final preliminary round score. Alternatively, only a select number of the player's best scores determine their preliminary score. A certain number of players, such as the players with the top five final preliminary round scores, qualify to play the final synchronized tournament round at 6 pm on the Saturday after the end of the preliminary rounds of the tournament. The gaming system determines a winner based on the final tournament round scores.

It should be appreciated that in these multi-round embodiments, in different embodiments each score of each game and each round does not count towards that player's final tournament score. For example, in one embodiment, for each player, only the top three scores from all of the rounds played by that player count towards a final tournament score. In another embodiment, only the top three scores count towards a final preliminary round score to compete in a final tournament round. In one embodiment, it is possible to play as few as three different rounds and win the preliminary round. A player may also increase their chances of achieving a better score by playing more rounds in the gaming establishment and submitting up to the limit of 20 scores (from which the top three will be entered). In one embodiment, the players may be one or more rounds on the internet or other data network. It should also be appreciated that any suitable qualifier or qualifiers may be used to determine qualification for the tournament.

In another example tournament, the tournament is an instant synchronized tournament which is conducted at random times a certain number of times each day to create spontaneous excitement among the players. In one embodiment, any player or particular groups of players (such as higher level players) that participate in a player tracking system can qualify to be a tournament contestant by meeting specific tournament criteria. Alternatively, any player, including any players not in a player tracking system, can qualify by meeting specific tournament criteria. If a player qualifies for the instant synchronized tournament, in one embodiment, the player is required to stand-by in the gaming establishment to play the tournament. The gaming establishment notifies the players at the start of the tournament. For example, the gaming establishment makes an audio announcement, announcing the start of the tournament or communicates with the sign manager to inform the players of the tournament via different gaming establishment display devices or by providing on-screen messaging. At the start time of that tournament, the player must be at a designated server based gaming machine and be identified to the gaming machine, such as by the insertion of a player tracking card. The gaming system initiates the tournament. The gaming system determines a winner based on the configured game criteria and provides the tournament winner a prize.

It should be appreciated that the gaming system may run an instant tournament on any number of days and any number of times in a day. The time of the instant synchronized tournament may be randomly determined, predetermined, or based on any suitable tournament information, such as the number of eligible players. The time may also be based on the gaming establishment's data trends, such as having a tournament when the gaming establishment is known to have a "low traffic" time, such as Tuesday mornings.

In another embodiment, the tournament is a multi-round self-scheduled tournament, where upon qualification and registration, the gaming system informs the players of the number of rounds of the tournament and dates and times for each round. Qualified players can play their rounds at leisure within configured times. For example, a self-scheduled tournament first round is between 9 am and 12 pm on Saturday, the second round is between 1 pm and 3 pm on Saturday and the third round is between 4 pm and 6 pm on Saturday. In this self-scheduled tournament mode, the gaming system enables the player to play games in non-tournament mode at a gaming machine, make an input to play the tournament at that same gaming machine, to play the tournament at that same gaming machine and then switch back to non-tournament mode and continue playing regular, non-tournament games at that same gaming machine. This setup facilitates the player's privacy to play their tournament and removes some of the hoopla and announcing that certain players do not enjoy during current tournaments.

In another example, the tournaments can take other forms, such as an on-demand tournament, a player challenge tournament, a bonus tournament, or a delayed bonus tournament.

It should be appreciated that all of the gaming machines should be operable to work with the player tracking system to have the capacity to automatically maintain contest scores and display standings after player identification at the gaming machine, such as by a player card entry, entry of an identification number or any other means. Additionally, the gaming machines must have the ability to switch into the tournament mode as required by the tournament or by the player.

In certain tournaments with a number of sessions, players often perceive that if they have a bad first round, they have no chance of actually winning the tournament. Thus, the player may give up on the tournament and terminate further tournament play.

The gaming system in various embodiments implements a turbo mode or bonus mode for any suitable reason or upon any suitable triggering event. For example, one or more turbo modes may be available to a player for a minute when that player ranks in the last five of the tournament. In one embodiment, the turbo modes are triggered upon a game event, such as a symbol combination. In another embodiment, turbo modes are randomly awarded to players during the tournament. It should be appreciated that one or more turbo awards may be awarded to the same player at the same time. In one embodiment, the gaming system implements a turbo mode based on a suitable math model that is favored to help a player make up ground if they are trailing and keep the tournament more interesting for all players. Various embodiments of a turbo mode include: extra symbol wilds, locked expanding wilds, scatter pays or extra scatter pays, random multipliers, higher paytables, extra points, additional winning combinations, faster play, auto play, extra paylines or extra ways, extra reels, or any other desired features.

Accordingly, by storing a plurality of different game programs and selecting, on demand, one or more game programs to be executed, the gaming system disclosed herein enables multiple types of different games to be played on a same gaming machine, enabling non-tournament and tournament game play.

Additional features and advantages are described in, and will be apparent from, the following Detailed Description and the figures.

BRIEF DESCRIPTION OF THE FIGURES

FIG. 7 is a table of possible elements to be considered in player qualification for the tournament.

FIGS. 22A, 22B, 22C and 22D are charts illustrating the probabilities associated with the generation of symbol combinations changing at different times in a tournament.

DETAILED DESCRIPTION

The present disclosure relates in general to a gaming system including a central controller and a plurality of different gaming machines. Each of the gaming machines is operable with the central controller to provide a tournament game to the player in addition to one or more non-tournament games to the player.

The central controller either stores a plurality of different commands or instructions, such as game programs, and causes the execution of these commands on display devices of the gaming machines or sends one or more commands to each gaming machine and the individual gaming machines execute the received commands. It should be appreciated that the gaming system may include any suitable combinations of communication and game control between the central controller and the individual gaming machines to execute tournament game play and non-tournament game play.

In one embodiment, the computerized instructions for controlling the game or games are executed by a central server, central controller or remote host. In such a "thin client" embodiment, the central server remotely controls the games (or other suitable interfaces) and the gaming device is utilized to display such games (or suitable interfaces) and receive one or more inputs or commands from a player. In another embodiment, the computerized instructions for controlling the games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions or games of the gaming device are implemented in a thin client environment and certain other functions or games of the gaming device are implemented in a thick client environment. In one such embodiment, computerized instructions for controlling any primary games are communicated from the central server to the gaming device in a thick client configuration and computerized instructions for controlling any secondary games, tournament games and/or bonus functions are executed by a central server in a thin client configuration.

Figure 1:
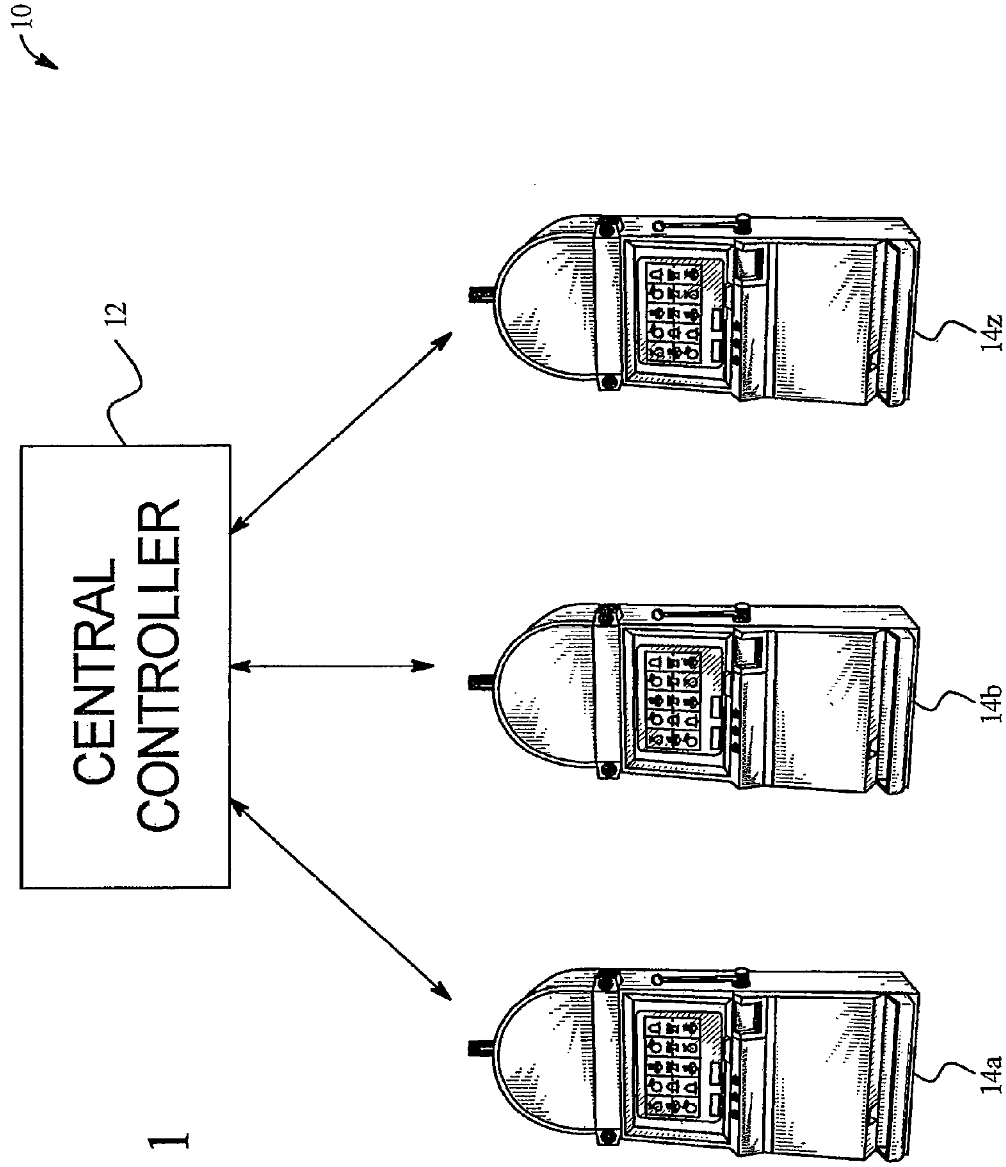
FIG. 1 is a schematic diagram of the central controller in communication with a plurality of gaming machines in accordance with one embodiment disclosed herein.

Referring to FIG. 1, in one embodiment a plurality of gaming machines or gaming machines 14*a*, 14*b* . . . 14*z* are in communication with or linked to a central server or processor 12 to form a gaming system 10. In this embodiment, the game program to be executed by one, more or each of the gaming machines is selected by the central server and communicated to the appropriate gaming machine. The number of gaming machines in the gaming system can vary as desired by the implementer of the gaming system. These gaming machines are referred to herein alternatively as the group of gaming machines, the gaming machines, the linked gaming machines or the system gaming machines. The play of each of the gaming machines 14*a*, 14*b* . . . 14*z* in the group is determined, at least in part, by the central server 12.

The central server or controller may be any suitable server or computing device which includes a processor and a memory or storage device. In alternative embodiments, the central server is a progressive controller or another gaming machine in the gaming system. In one embodiment, the memory device stores different game programs and instructions, executable by a gaming machine processor, to control the gaming machine. Each executable game program represents a different type game which may be played on one, more or each of the gaming machines in the gaming system. Such different games may include the same or substantially the same game play with different paytables. The game programs include one or more tournament games that are playable on a plurality of the gaming machines each playable by a single player. In different embodiments, the executable game program is for a primary game, a secondary game or both, in addition to the one or more tournament games. In another embodiment, the game program may be executable as a secondary game to be played simultaneously with the play of a primary game which may be downloaded from the central server to the gaming machine or fixed on the gaming machine or vice versa.

The memory device also stores other data such as image data, event data, player input data, random or pseudo-random number generators, pay-table data or information and applicable game rules that relate to the play of the gaming machine. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming system disclosed herein.

In one embodiment, a gaming machine processor of each gaming machine may be designed to facilitate transmission of signals between the individual gaming machine and the central server or controller. In one embodiment, the data network is a local area network (LAN), in which one, more or each of the gaming machines are substantially proximate to each other and an on-site central server or controller as in, for example, a gaming establishment or a portion of a gaming establishment. In another embodiment, the data network is a wide area network (WAN) in which one, more or each of the gaming machines are in communication with at least one off-site central server or controller. In this embodiment, the plurality of gaming machines may be located in a different part of the gaming establishment or within a different gaming establishment than the off-site central server or controller. Thus, the WAN may include an off-site central server or controller and an off-site gaming machine located within gaming establishments in the same geographic area, such as a city or state. The WAN gaming system may be substantially identical to the LAN gaming system described above, although the number of gaming machines in each system may vary relative to each other.

In another embodiment, the data network is an internet or intranet. In this embodiment, the operation of each gaming machine can be viewed at that gaming machine with at least one internet browser. In this embodiment, operation of each gaming machine and accumulation of credits may be accomplished with only a connection to the central server or controller (the internet/intranet server), through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

Figure 2A:
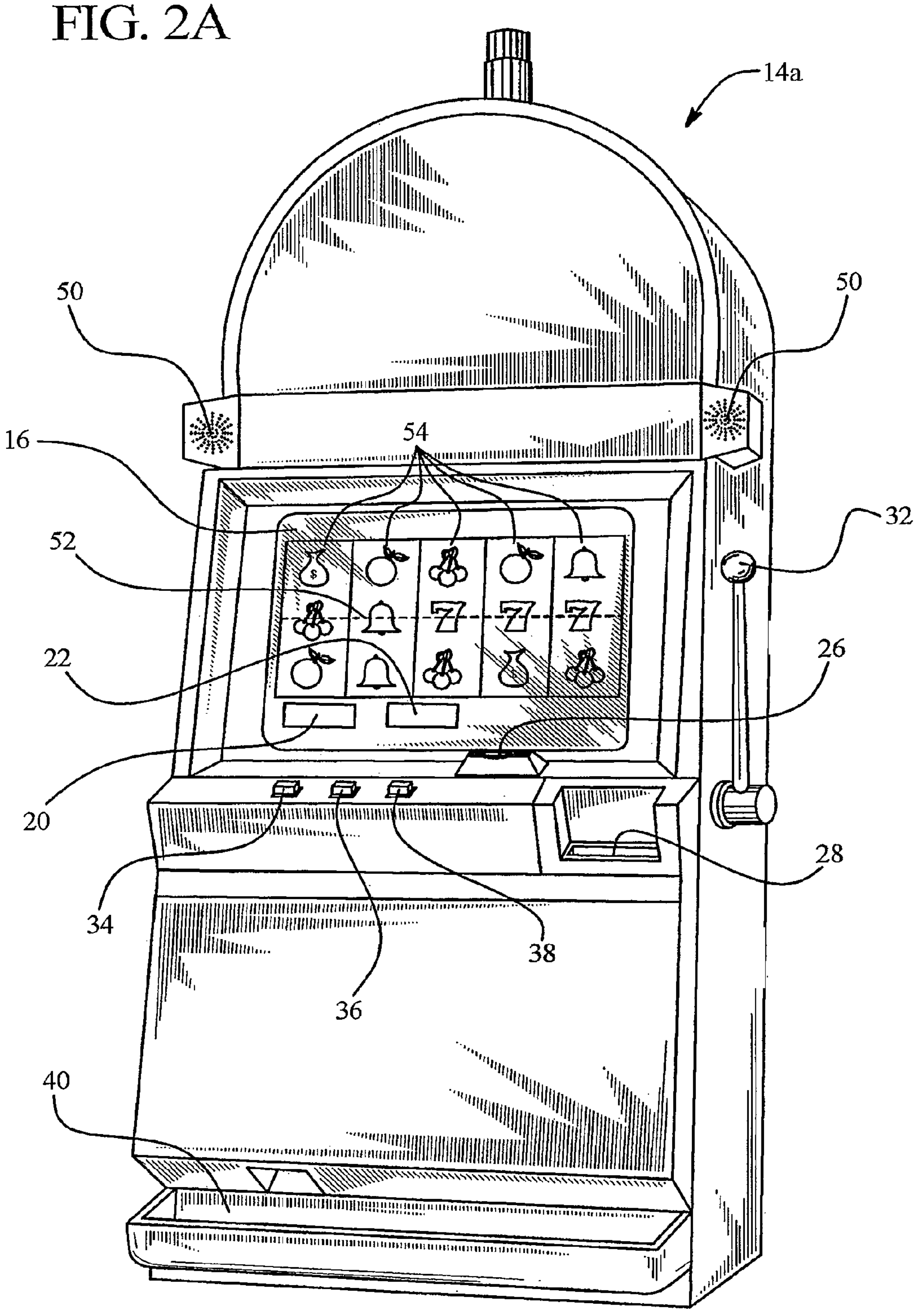
FIGS. 2A and 2B are perspective views of alternative embodiments of the gaming machine of the gaming system disclosed herein.
Figure 2B:
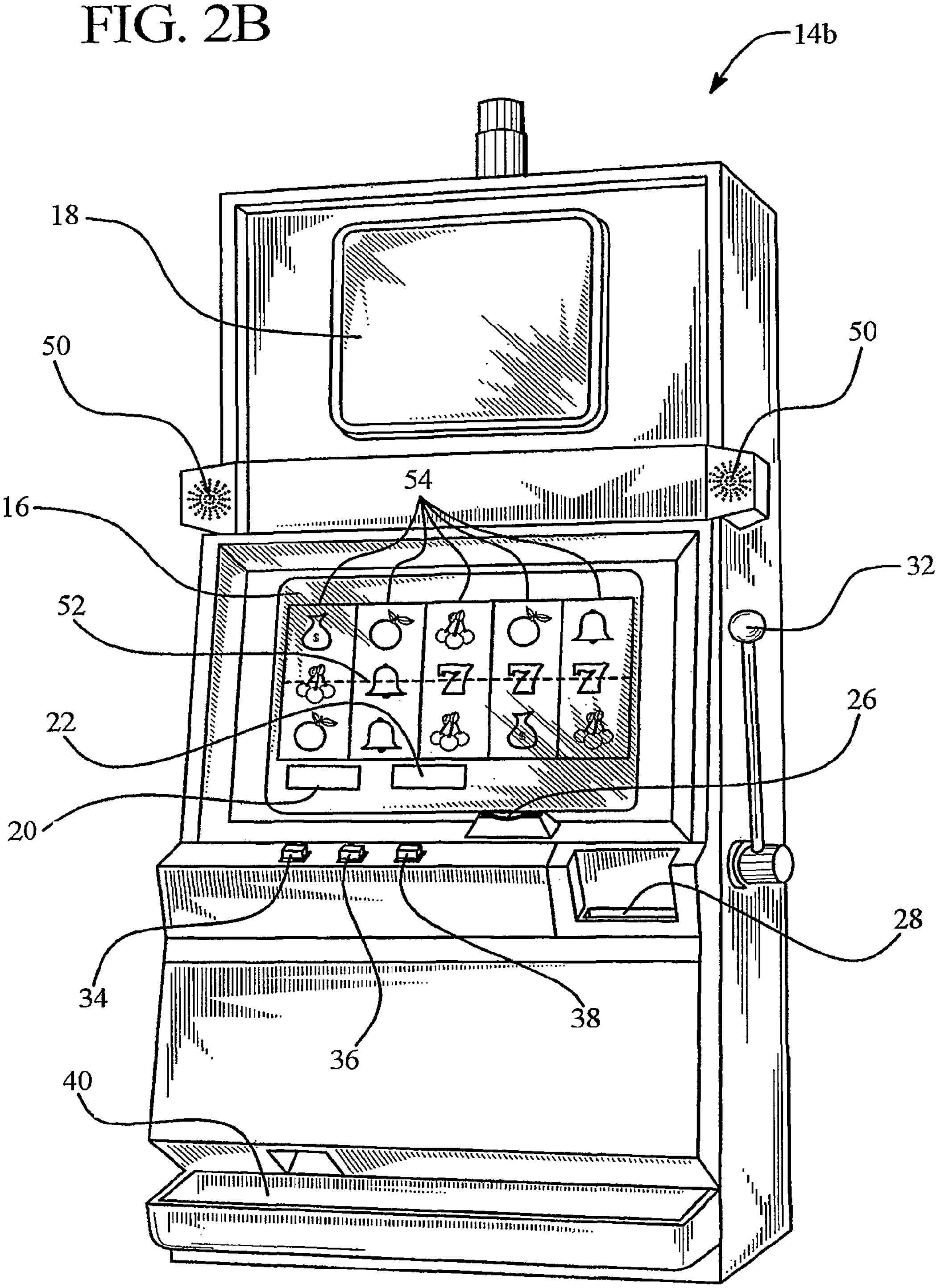

Two alternative embodiments of the gaming machines of the gaming system are illustrated in FIGS. 2A and 2B as gaming machine 14*a* and gaming machine 14*b*, respectively. Gaming machine 14*a* and/or gaming machine 14*b* are generally referred to herein as gaming machine 14.

In one embodiment, as illustrated in FIGS. 2A and 2B, each gaming machine in the gaming system has a support structure, housing or cabinet which provides support for a plurality of displays, inputs, controls and other features of a conventional gaming machine. It is configured so that a player can operate it while standing or sitting. Each gaming machine may be positioned on a base or stand or can be configured as a pub-style table-top game (not shown) which a player can operate preferably while sitting. As illustrated by the different configurations shown in FIGS. 2A and 2B, the gaming machine may have varying cabinet and display configurations.

Figure 3:
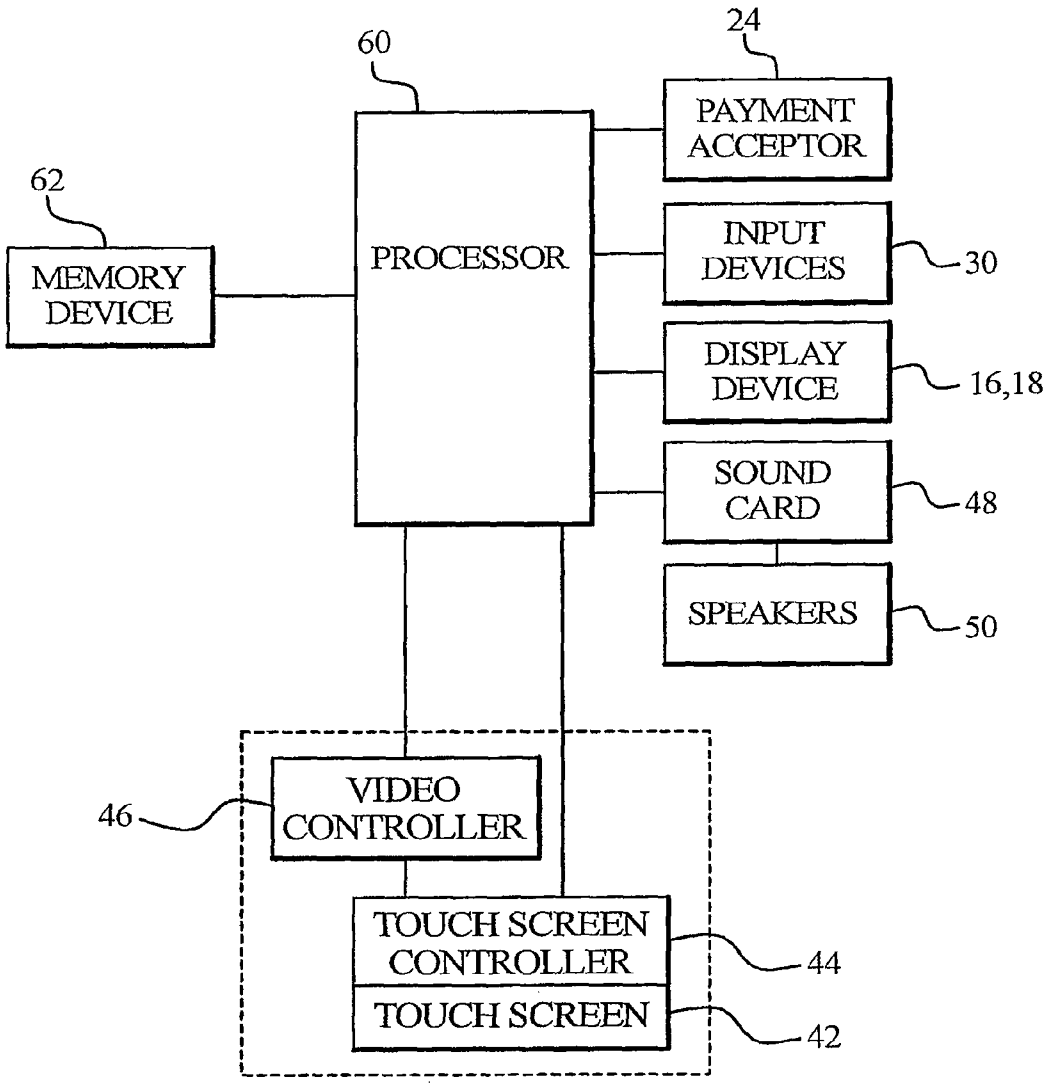
FIG. 3 is a schematic block diagram of an electronic configuration of one embodiment of the gaming machine of the gaming system disclosed herein.

In one embodiment, as illustrated in FIG. 3, each gaming machine in the gaming system at least includes at least one gaming machine processor 60, such as a microprocessor, a microcontroller-based platform, a suitable integrated circuit or one or more application-specific integrated circuits (ASIC's). In one embodiment, the gaming machine processor is in communication with or operable to access or to exchange signals with at least one local data storage or local memory device 62. In one embodiment, the gaming machine processor and the local memory device reside within the cabinet of the gaming machine.

In one embodiment, the local memory device stores, at least in part, program code and instructions, executable by the gaming machine processor, to control the gaming machine. The local memory device may also store, at least in part, other data such as image data, event data, player input data, random or pseudo-random number generators, pay-table data or information and applicable game rules that relate to the play of the gaming machine. In one embodiment, the local memory device includes random access memory (RAM). In one embodiment, the local memory device includes read only memory (ROM). In one embodiment, the local memory device includes flash memory and/or EEPROM (electrically erasable programmable read only memory).

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller." In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

In one embodiment, as illustrated in FIG. 2A, the gaming machines of the gaming system each include one or more display devices controlled by the gaming machine processor and/or the central server. The display devices are preferably connected to or mounted to the cabinet of the gaming machine. The embodiment shown in FIG. 2A includes a central display device 16 which displays a primary game. This display device may also display any secondary game associated with the primary game as well as information relating to the primary or secondary game. The alternative embodiment shown in FIG. 2B includes a central display device 16 and an upper display device 18. The upper display device may display the primary game, any suitable secondary game associated with the primary game and/or information relating to the primary or secondary game. In another embodiment, at least one display device may be a mobile display device, such as a PDA or tablet PC, that enables play of at least a portion of the primary or secondary game at a location remote from the gaming machine. As seen in FIGS. 2A and 2B, in one embodiment, the gaming machine includes a credit display 20 which displays a player's current number of credits, cash, account balance or the equivalent. In one embodiment, gaming machine includes a bet display 22 which displays a player's amount wagered.

The display devices may include, without limitation, a monitor, a television display, a plasma display, a liquid crystal display (LCD) a display based on light emitting diodes (LED), a display based on a plurality of organic light-emitting diodes (OLEDs) or any other suitable electronic device or display mechanism. In one embodiment, as described in more detail below, the display device includes a touch-screen with an associated touch-screen controller. The display devices may be of any suitable configuration, such as a square, rectangle, elongated rectangle. In another embodiment, one or more display device may be a movable display which includes information, such as information about all the game programs which may be played. In one embodiment, the movable display includes two rollers and a belt which frictionally engages the rollers. The information regarding the different available games are on different sections of the belt, wherein the belt is configured such that each of such sections may be displayed sequentially to a player. In this embodiment, each section corresponds to a different game which may be played at the gaming machine. A drive roller which is powered by a suitable motor coupled to the drive roller, rotates the belt in a clockwise, counter-clockwise or any suitable combination of directions. The processor in the gaming machine (or the central controller) controls the drive roller and causes the drive roller to move to sequentially display one or more sections and thus display information regarding one or more games played. It should be appreciated that any suitable display device may be employed to display such information to a player.

In one embodiment, the gaming machine utilizes one or more of the display devices to display information to the player regarding which game program is selected.

In one embodiment, the gaming machine utilizes one or more display devices to display information to the player regarding which game program is selected. That is, each game program is associated with certain information, such as which game program is being played, the applicable paytable for the game being played, the instructions of how the game is played or any other suitable information. In this embodiment, the information associated with the selected game program is displayed to the player. For example, the gaming machine may utilize at least one movable display to indicate information regarding which game program is selected. It should be appreciated that any other suitable information, such as any other available game program(s), the paytables applicable for other game program(s), the instructions of how the other game(s) are played or information relating to any primary game or any secondary games, may also be displayed to the player using one or more display devices.

The display devices of the gaming machines of the gaming system are configured to display at least one and preferably a plurality of game or other suitable images, symbols and indicia such as any visual representation or exhibition of the movement of objects such as mechanical or video reels and wheels, dynamic lighting, video images, images of people, characters, places, things and faces of cards, tournament advertisements and the like.

In other embodiments, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 3, in one embodiment, the gaming machines of the gaming system each include at least one payment acceptor 24 in communication with the gaming machine processor. As seen in FIGS. 2A and 2B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips may accept payment. In one embodiment, a player may insert an identification card into a card reader of the gaming machine. In one embodiment, the identification card is a smart card having a programmed microchip or a magnetic strip coded with a player's identification, credit totals and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming machine through electronic funds transfer. When a player funds the gaming machine, the gaming machine processor determines the amount of funds entered and displays the corresponding amount on the credit or other suitable display as described above.

As seen in FIGS. 2A, 2B and 3, in one embodiment the gaming machines of the gaming system each include at least one and preferably a plurality of input devices 30 in communication with the gaming machine processor and/or the central server. The input devices can include any suitable device which enables the player to produce an input signal which is read by the gaming machine processor. In one embodiment, after appropriate funding of the gaming machine, the input device is a game activation device, such as a pull arm 32 or a play button 34 which is used by the player to start any primary game or sequence of events in the gaming machine. The play button can be any suitable play activator such as a bet one button, a max bet button or a repeat the bet button. In one embodiment, upon appropriate funding, the gaming machine begins the game play automatically. In another embodiment, upon the player engaging one of the play buttons, the gaming machine automatically activates game play.

In one embodiment, as shown in FIGS. 2A and 2B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming machine.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 3, one input device is a touch-screen 42 coupled with a touch-screen controller 44, or some other touch-sensitive display overlay to enable player interaction with the images on the display. The touch-screen and the touch-screen controller are connected to a video controller 46. A player can make decisions and input signals into the gaming machine by touching the touch-screen at the appropriate places. One such input device is a touch-screen button panel.

The gaming machines of the gaming system may each further include a plurality of communication ports for enabling communication of the gaming machine processor with external peripherals, such as external video sources, expansion buses, game or other displays, an SCSI port or a key pad. In one embodiment, the player can use a keyboard at the gaming machine, or any other suitable input device, to input commands or instructions and personal data to enter the tournament.

In one embodiment, as seen in FIG. 3, the gaming machines of the gaming system each include a sound generating device controlled by one or more sounds cards 48 which function in conjunction with the gaming machine processor. In one embodiment, the sound generating device includes at least one and preferably a plurality of speakers 50 or other sound generating hardware and/or software for generating sounds, such as playing music for the primary and/or secondary game or for other modes of the gaming machine, such as an attract mode. In one embodiment, the gaming machine provides dynamic sounds coupled with attractive multimedia images displayed on one or more of the display devices to provide an audio-visual representation or to otherwise display full-motion video with sound to attract players to the gaming machine. During idle periods, the gaming machine may display a sequence of audio and/or visual attraction messages to attract potential players to the gaming machine. The videos may also be customized for or to provide any appropriate information.

In one embodiment, the gaming machines of the gaming system each include a sensor, such as a camera, in communication with the gaming machine processor (and possibly controlled by the gaming machine processor) that is selectively positioned to acquire an image of a player actively using the gaming machine and/or the surrounding area of the gaming machine. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the gaming machine processor may incorporate that image into the primary and/or secondary game as a game image, symbol or indicia.

In one embodiment, the gaming machines of the gaming system can each incorporate any suitable primary or secondary game in addition to any tournament game. The gaming machine or device may include some or all of the features of conventional gaming machines or devices. The primary, game, the tournament game and/or the secondary game may comprise any suitable reel-type game, card game, cascading or falling symbol game, number game or other game of chance susceptible to representation in an electronic or electromechanical form which produces a random outcome based on probability data upon activation from a wager. That is, different games, such as video poker games, video blackjack games, video Keno, video bingo or any other suitable primary or secondary game may be implemented.

In one embodiment, as illustrated in FIGS. 2A and 2B, an executable game program communicated to the gaming machine is a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player for the play of the game. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming machine determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming machine provides the player one award for that occurrence of the generated winning symbol combination. For example, if one winning symbol combination is generated on the reels, the gaming machine will provide a single award to the player for that winning symbol combination (i.e., not based on paylines that would have passed through that winning symbol combination). It should be appreciated that because a gaming machine with wagering on ways to win provides the player one award for a single occurrence of a winning symbol combination and a gaming machine with paylines may provide the player more than one award for the same occurrence of a single winning symbol combination (i.e., if a plurality of paylines each pass through the same winning symbol combination), it is possible to provide a player at a ways to win gaming machine more ways to win for an equivalent bet or wager on a traditional slot gaming machine with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming machine with at least one symbol generated in an active symbol position. For example, a three reel gaming machine with three symbols generated in active symbol positions on each reel includes 27 ways to win (i.e., 3 symbols on the first reel×3 symbols on the second reel×3 symbols on the third reel). A four reel gaming machine with three symbols generated in active symbol positions on each reel includes 81 ways to win (i.e., 3 symbols on the first reel×3 symbols on the second reel×3 symbols on the third reel×3 symbols on the fourth reel). A five reel gaming machine with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming machine enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming machine uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming machine provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming machine provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming machine individually determines if a symbol generated in an active symbol position on a first reel forms part of a winning symbol combination with or is otherwise suitably related to a symbol generated in an active symbol position on a second reel. In this embodiment, the gaming machine classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming machine classifies the two cherry symbols as a string of related symbols because the two cherry symbols form part of a winning symbol combination.

After determining if any strings of related symbols are formed between the symbols on the first reel and the symbols on the second reel, the gaming machine determines if any of the symbols from the next adjacent reel should be added to any of the formed strings of related symbols. In this embodiment, for a first of the classified strings of related symbols, the gaming machine determines if any of the symbols generated by the next adjacent reel form part of a winning symbol combination or are otherwise related to the symbols of the first string of related symbols. If the gaming machine determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming machine adds the related cherry symbol generated on the third reel to the previously classified string of cherry symbols.

On the other hand, if the gaming machine determines that no symbols generated on the next adjacent reel are related to the symbols of the first string of related symbols, the gaming machine marks or flags such string of related symbols as complete. For example, if the first string of related symbols is the string of related cherry symbols and none of the symbols of the third reel are related to the cherry symbols of the previously classified string of cherry symbols, the gaming machine marks or flags the string of cherry symbols as complete.

After either adding a related symbol to the first string of related symbols or marking the first string of related symbols as complete, the gaming machine proceeds as described above for each of the remaining classified strings of related symbols which were previously classified or formed from related symbols on the first and second reels.

After analyzing each of the remaining strings of related symbols, the gaming machine determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming machine marks each of the remaining pending strings of related symbols as complete.

When each of the strings of related symbols is marked complete, the gaming machine compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, an executable game program communicated to the gaming machine may be for a poker game wherein the gaming machine enables the player to play a conventional game of video draw poker and initially deals five cards all face up from a virtual deck of fifty-two card deck. Cards may be dealt as in a traditional game of cards or in the case of the gaming machine, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming machine compares the final five-card hand to a payout table which utilizes conventional poker hand rankings to determine the winning hands. The gaming machine provides the player with an award based on a winning hand and the credits the player wagered.

In another embodiment, an executable game program communicated to the gaming machine may be for a multi-hand version of video poker. In this embodiment, the gaming machine deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In another embodiment, an executable game program communicated to the gaming machine may be for a keno game wherein the gaming machine displays a plurality of selectable indicia or numbers on at least one of the display devices. In this embodiment, the player selects at least one or a plurality of the selectable indicia or numbers via an input device such as the touch screen. The gaming machine then displays a series of drawn numbers to determine an amount of matches, if any, between the player's selected numbers and the gaming machine's drawn numbers. The player is provided an award based on the amount of matches, if any, based on the amount of determined matches.

In another embodiment, in addition to winning credits or other awards in a base or primary game, an executable game program communicated to the gaming machine may be for the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from a base or primary game or the tournament game(s). In one embodiment, the gaming machine includes a program which will automatically begin a bonus round after the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor or central server randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

In one embodiment, after receiving an appropriate game program to execute, the gaming machine randomly generates awards and/or other game outcomes based on probability data. In this embodiment, each award or other game outcome is associated with a probability and the generated award or other game outcome is based on the associated probabilities. It should be appreciated that since the outcomes are randomly generated or generated based upon a probability calculation, there is no certainty that the gaming machine will ever provide the player with any specific award or other game outcome.

In one embodiment, the game outcome provided to the player is determined by the central server or controller and provided to the player at the gaming machine. In this embodiment, upon a player initiating game play at one of the gaming machines, the initiated gaming machine communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for the primary game and the secondary game and/or the tournament game(s) based on probability data. In this embodiment, the central server or controller is capable of storing and utilizing program code or other data similar to the processor and memory device of the gaming machine.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free game.

The central server or controller communicates the generated or selected game outcome to the initiated gaming machine. The gaming machine receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming machine to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome is determined for each of a plurality of linked or networked gaming machines based on the results of a bingo game. In this embodiment, each individual gaming machine utilizes one or more bingo games to determine the predetermined game outcome provided to the player at that gaming machine. In one embodiment, the bingo game is displayed to the player. In another embodiment, the bingo game is not displayed to the player, but the results of the bingo game determine the predetermined game outcome provided to the player.

In the various bingo embodiments, as each gaming machine is enrolled in the bingo game, such as upon an appropriate wager or engaging an input device, the enrolled gaming machine is provided a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming machines, the same element may be present on all four of the bingo cards while another element may solely be present on one of the bingo cards.

In operation of these embodiments, upon providing a different bingo card to each of a plurality of enrolled gaming machines, the central controller randomly selects or draws, one at a time, a plurality of the elements. As each element is selected, each gaming machine determines if the selected element is present on the bingo card provided to that enrolled gaming machine. If the selected element is present on the bingo card provided to that enrolled gaming machine, that gaming machine marks or flags the selected element on the provided bingo card. This process of selecting elements and marking any selected elements on the provided bingo cards continues until one or more predetermined patterns are marked on one or more of the provided bingo cards. It should be appreciated that in one embodiment, the gaming machine requires the player to engage a "daub" button (not shown) to initiate the process of the gaming machine marking or flagging any selected elements.

After one or more predetermined patterns are marked on one or more of the provided bingo cards, a game outcome is determined for each of the enrolled gaming machines based, at least in part, on the selected elements on the provided bingo cards. As described above, the game outcome each gaming machine determines for the bingo game is utilized by that gaming machine to determine the predetermined game outcome provided to the player. For example, a first gaming machine to mark selected elements in a predetermined pattern is provided a first outcome of win $10 which will be provided to a first player regardless of how the first player plays in a first game and a second gaming machine to mark selected elements in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled gaming machine will provide a predetermined winning game outcome to a player.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming machine may be provided a supplemental or intermittent award regardless of if the enrolled gaming machine's provided bingo card wins or does not win the bingo game as described above. It should be further appreciated that other suitable methods for selecting or determining one or more predetermined game outcomes may be employed.

In another embodiment, the central server also monitors the activity of one, more or each of the gaming machines in communication with the central server or controller. In this embodiment, each individual gaming machine randomly generates the game outcomes to be provided to the player and the central server or controller monitors the activities and events occurring on the plurality of gaming machines. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated gaming establishment transactions.

In another embodiment, a plurality of gaming machines at one, more or each gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming machines distributed throughout a number of properties at different geographical locations including, for example, different locations within a city or different cities within a state.

In another embodiment, a plurality of gaming devices at one or more gaming sites are networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer serves gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine triggers a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered; for example, through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition is by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any suitable credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

In one embodiment, the central controller, central server or remote host is operable to communicate a plurality of different commands, instructions or other communications to a plurality of gaming machines to provide non-tournament game play and to provide tournament game play on the same gaming machines or devices, thus serving as a tournament manager in the gaming system.

Additionally, in one embodiment, the gaming system is integrated with one or more player tracking systems. In this embodiment, the gaming system and/or player tracking system is operable to track any participating player's gaming activity at each gaming machines of the gaming system that the player plays. In one such embodiment, the gaming system and/or the associated player tracking system timely tracks when a player inserts their playing tracking card to begin a gaming session and also timely tracks when a player removes their player tracking card or cashes out when concluding play for that gaming session. That is, in one embodiment, the gaming system, the individual gaming machine and/or the associated player tracking system tracks card-in/card-out for each gaming session. In one embodiment, the gaming system and/or the associated player tracking system provides safeguards against a missed card-out (such as via a "card-in heartbeat" which messages the player tracking system in designated intervals to ensure the player is still playing). In different embodiments, the gaming system works in accordance with the player tracking system to maintain data about players including, but not limited to: the player's account number, a player's identification number, the player's card number, the player's first name, the player's surname, the player's preferred name, the player's player tracking ranking, any promotion status associated with the player's player tracking card, tournament information, information about the player used for statistical analysis, the player's address, the player's birthday, the player's anniversary, the player's recent gaming sessions, or any other data deemed suitable by the gaming establishment operator.

In other embodiments, rather than requiring a player to insert a player tracking card or enter identifying information, the gaming device utilizes one or more portable devices carried by a player, such as a cell phone, email communication device, a radio frequency identification tag or any other suitable wireless device to track when a player begins and ends a gaming session. In other embodiments, the gaming device utilizes any suitable biometric technology or ticket technology to track when a player begins and ends a gaming session.

Each of these player tracking data may be used for any purpose in non-tournament game play and in tournament game play. For example, player tracking data may be used to determine qualification for the tournament. The player tracking data may also be used to determine who is likely to accept a tournament invitation and come to the tournament.

In one embodiment, prior to tournament game play, the tournament must be configured. The gaming system is operable to be configured in a plurality of methods. However, it should be appreciated that different embodiments of this gaming system may include any single suitable configuration method or any combination of suitable configuration methods.

The gaming system is operable to upload one or more pre-configured tournament game programs. That is, a distributor, such as a gaming machine distributor, manufactures and sells a plurality of different pre-configured tournament game programs. The gaming system is operable to upload one of the pre-configured game programs to the central controller and to cause the play of the programmed game tournament.

The gaming system is operable to upload a pre-configured game program that is operable to be modified or customized. That is, a distributor, such as a gaming machine distributor, manufactures and sells a plurality of different pre-configured tournament game programs. A gaming establishment may purchase one or a plurality of these pre-configured game programs and upload these game programs to the central server. However, one or a plurality of tournament parameters of these game programs are customizable. Therefore, if the gaming establishment operator wants to change a parameter of the tournament, for example, the theme of the tournament, the pre-configured tournament game programs enable the gaming establishment operator to customize the tournament in one or a plurality of ways. That is, the gaming establishment operator inputs one or more configuration guidelines that control one or more elements of the tournament.

The configuration guidelines may be used to define the actual game play or structure of the tournament. Additionally, the configuration may be used to customize a tournament for advertising purposes. For example, the gaming establishment operator can include the name of the gaming establishment and a name for the tournament in the customization process. The tournament may be customized to have a certain theme.

The theme and title of the tournament may reflect the advertising of one or more tournament sponsors. For example, if Company A is a vehicle company that sponsors the tournament, the prizes from the tournament may be vehicles from Company A and the tournament may include advertising and promotion for Company A.

The customization of the tournament enables the gaming establishment to pursue any suitable advertisements. For example, during a tournament, the gaming establishment may promote the next tournament to increase player awareness and participation in the next tournament. The tournament may be used for other gaming establishment and hotel promotion, such as advertisements for the restaurant in the gaming establishment or shops in the hotel. Additionally, the gaming establishment may run advertisements for other, non-affiliated corporations during the tournament.

In one embodiment, after one of the pre-configured modifiable tournament game programs is uploaded in the gaming system, the gaming system provides menu choices displayed on a display device linked to the central controller to enable the gaming establishment operator to easily input one or a plurality of the tournament parameters. The ability for the gaming establishment operator to configure the tournament is beneficial for creating customized tournaments. That is, such a configuration enables the gaming establishment to create, edit, and modify tournaments based on their specific needs.

Figure 4:
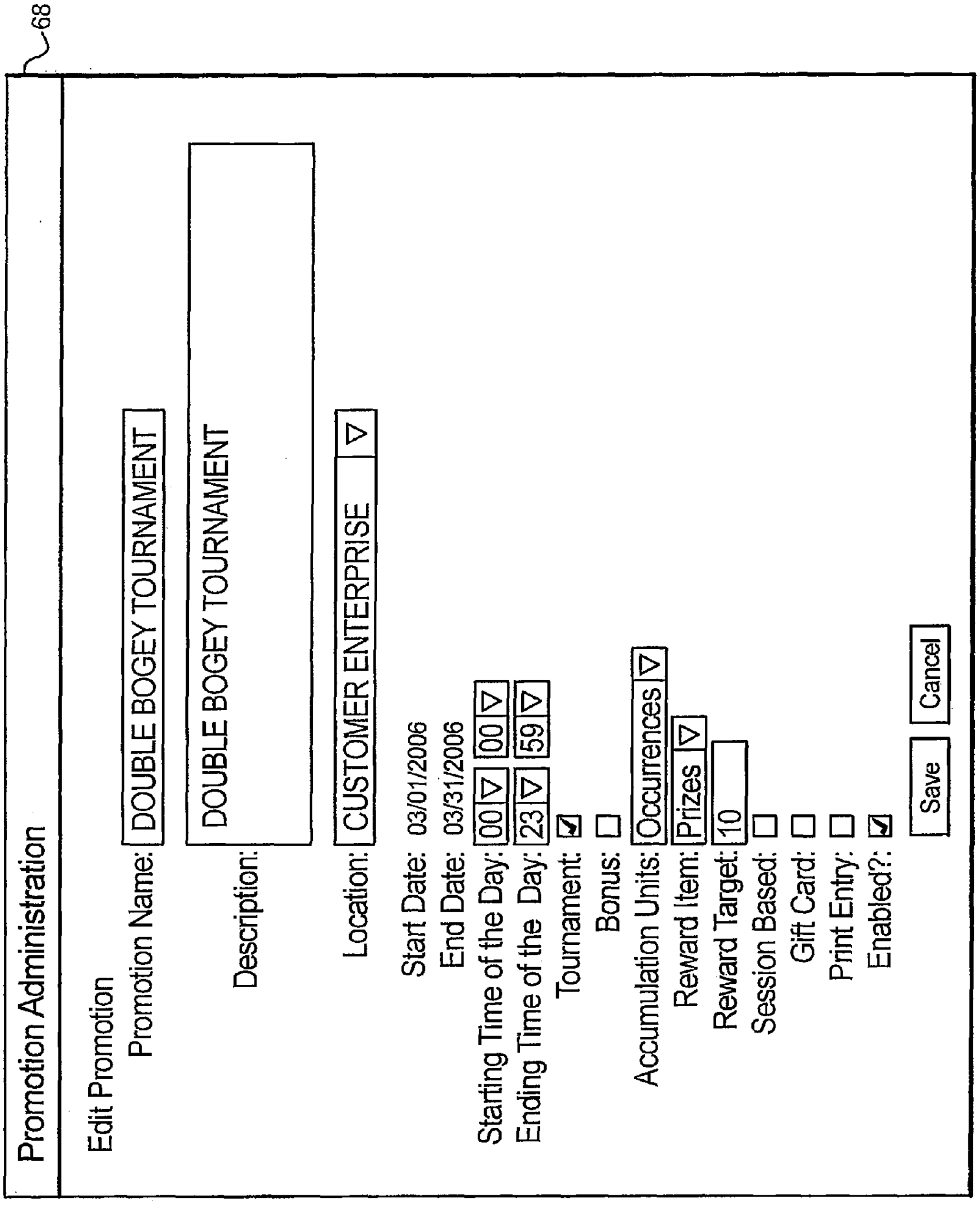
FIG. 4 is a screen shot of certain tournament parameters that are customizable for a tournament via a pull down menu in accordance with one embodiment disclosed herein.
Figure 5:
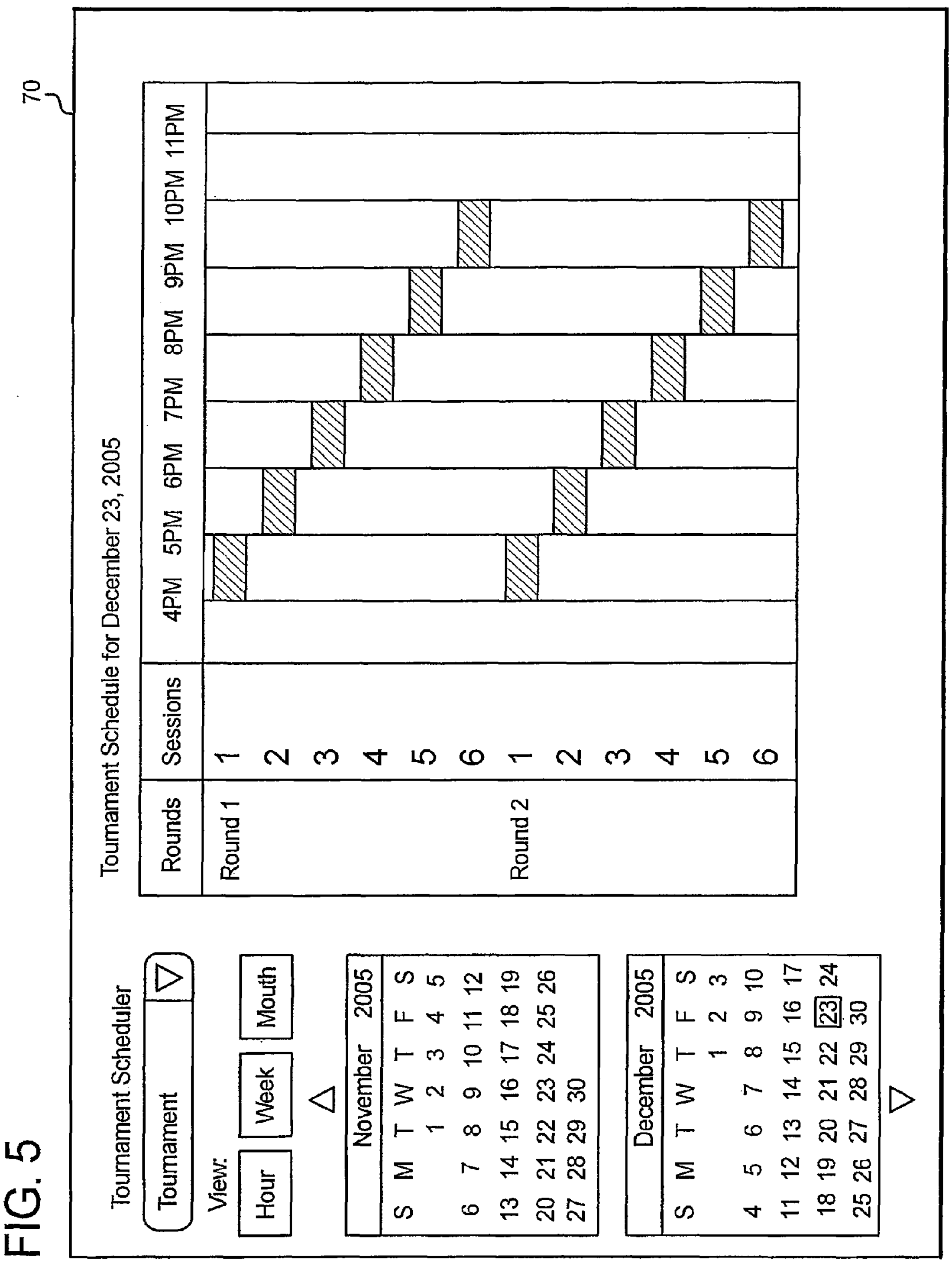
FIG. 5 is a screen shot of certain parameters of certain tournament parameters that are customizable for a tournament in accordance with one embodiment disclosed herein.

FIGS. 4 and 5 illustrate example screen shots from one of the customizable game programs. As illustrated in FIG. 4, certain elements of the tournament are customizable. That is, the game program may include a default tournament name. However, the gaming establishment operator may change that parameter of the tournament as illustrated in FIG. 4. It should be appreciated that this type of input screen may be used to modify any customizable tournament parameter.

As illustrated in FIG. 5, in one embodiment, the pre-configured tournament game program enables the gaming establishment operator to configure certain elements of the tournament, such as the tournament schedule. FIG. 5 illustrates scheduling parameters of a multi-round synchronized tournament configuration. The gaming system enables the gaming establishment operator to determine the number of sessions for each round of the synchronized tournament. The gaming system enables the gaming establishment operator to schedule a date and time for each session of each round of the synchronized tournament.

In one example of customization of a tournament gaming system, the gaming system enables a gaming establishment operator to retrieve or pull up one or more configurable tournament game programs via the central server. For example, if the gaming establishment operator wants to create a new tournament, the gaming system enables the gaming establishment operator to enter information pertinent to the tournament, such as a tournament name, a tournament description, location, start date, end date, start time, end time, prize information, tournament format, or any other desired information. The game program further enables the gaming establishment operator to enter or input information to further customize the tournament (such as the number of rounds, rounds allowed per day, the time between different sessions, player qualification information, maximum number of players, machine information, maximum number of machines, buy-in information, number of winners, length of tournament, paytable, advertising and theme information or any other desired information). The gaming establishment operator can also further integrate the tournament with the sign manager and messaging system, gaming machines, kiosks, or other devices to advertise the tournament. For example, upon tournament configuration completion, the gaming establishment operator may choose to advertise the tournament on display devices through-out the gaming establishment via the sign manager, which is a system that integrates the display devices of the gaming system. The gaming establishment operator may use information from the player tracking system to contact, such as by email, all of the players of the last three tournaments to advertise the newly configured tournament. It should be appreciated that upon tournament configuration, the gaming establishment may advertise the tournament in any suitable manner.

This customization functionality provides the gaming establishment with maximum flexibility to create tournaments almost instantaneously, modify parameters of the tournament, advertise the created tournament, and easily customize the tournament to meet the gaming establishment's current needs.

FIGS. 4 and 5 are example screen shots of how the tournament can be configured. However, the tournament may be configured in any suitable manner.

Additionally, the gaming system is operable for the gaming establishment operator to completely customize an entire tournament. That is, the gaming system is operable for the gaming establishment operator to configure every aspect of a tournament to create a new and unique tournament based on one or more gaming establishment operator selectable tournament configurations or tournament elements.

Figure 6:
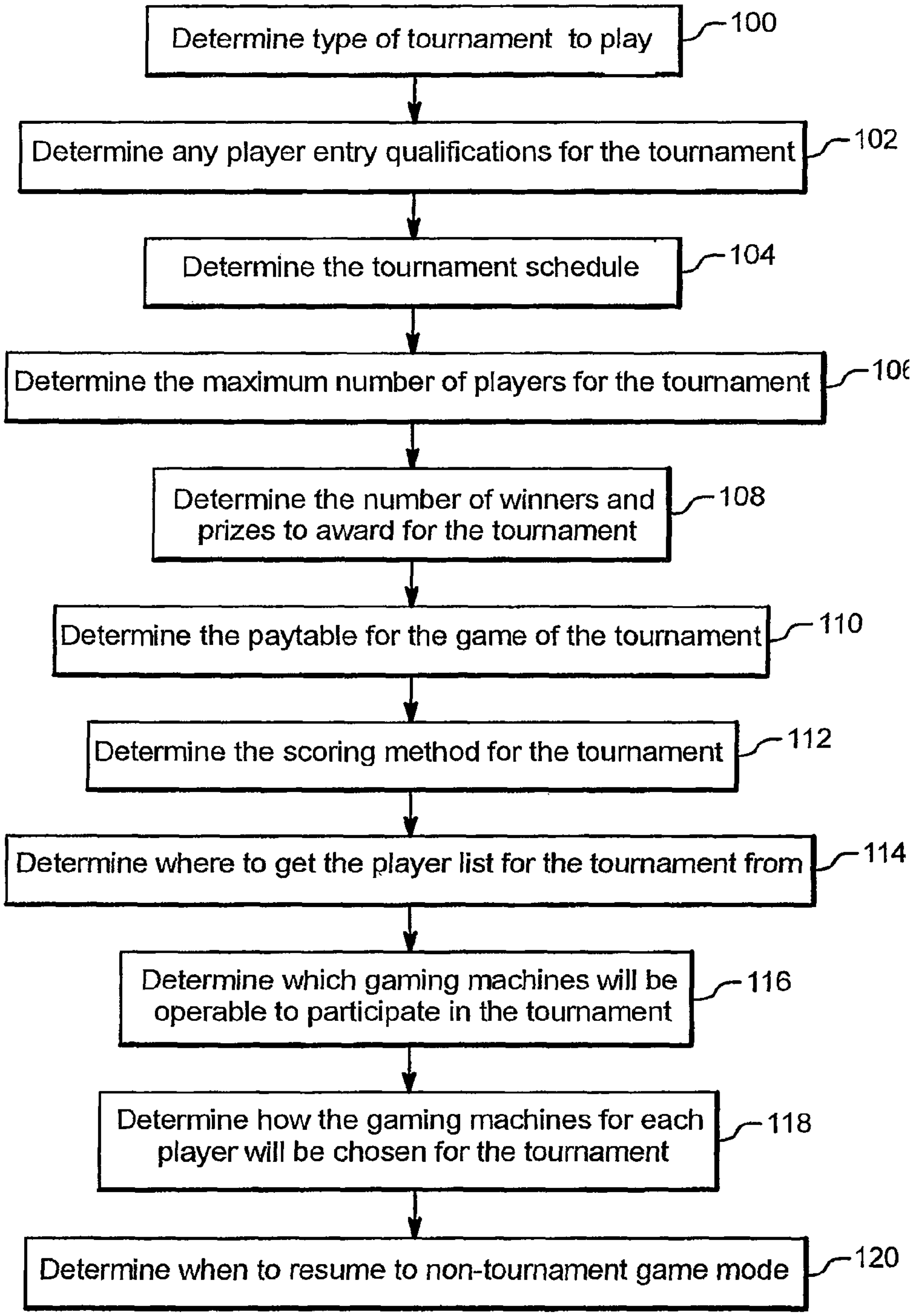
FIG. 6 is a flow chart of one method of one embodiment of tournament configuration.

FIG. 6 illustrates one embodiment of the method of configuration of a tournament of the present disclosure. The gaming system makes the decisions of how to run the tournament based on information input into the gaming system via uploading a game program and/or via input from a gaming establishment operator.

As illustrated in block 100, one of the tournament parameters is the type of tournament to play. It should be appreciated that the tournament may be any suitable type of tournament, such as an invited guest tournament, an automatic tournament or an on-demand tournament. The invited guest tournament is a tournament that has a predetermined list of players that may play in the tournament. Only players on the guest list may play in the tournament but in some embodiments, players may quickly be added to the guest list. In this embodiment, the guest list is uploaded into the gaming system or manually entered into the gaming system. For an automatic bonus tournament, any number of players may play the automatic tournament upon meeting certain eligibility or qualification requirements, which are further discussed below. In an on-demand tournament, a player may request to play in a tournament. That is, a player may request to play in a tournament.

The gaming system determines whether the tournament will be manually started by a gaming establishment operator or if the gaming system will automatically start the tournament. In one embodiment, the central controller is operable to send a signal to each participating gaming machine to automatically start and end the gaming tournament. In another embodiment, the start and end times of the tournament are encoded into the game program downloaded by each of the participating gaming machines and each of these gaming machines execute the game program at the encoded times.

In one embodiment, the gaming system determines what type of sessions and rounds the tournament will include. In a synchronized tournament a plurality of players each play the tournament at the same time, frequently in a relatively same location. If there are more players for a round than the number of designated gaming machines, that round of a tournament is played in multiple sessions, with a certain number of players simultaneously playing each session. For example, if three hundred players are participating in a round of the synchronized tournament and the tournament includes 100 gaming machines, the tournament must include three sessions of the tournament for each round (300/100) to enable each participating player to participate in the round. Therefore, 100 players will simultaneously participate in the gaming tournament during each session. In one embodiment, the gaming system has appropriate checks to make sure a player is not allowed to play more than one session per round.

In another embodiment, the tournament is a self-scheduled tournament. The self-scheduled tournament includes a plurality of players participating in a round of a tournament according to the tournament parameters that determine a time to play the tournament within a range of designated times. That is, a player can individually participate in the tournament at a different time than the other players. If a tournament has more than one round, the gaming system may provide the participating players with a certain date/time to complete each of the rounds. The self-scheduled tournament provides players the flexibility of deciding when to play the tournament and what gaming machine to play the tournament on. In one embodiment, each round includes a plurality of different sessions. In one embodiment, each of the sessions are at different times which enable players more flexibility in playing the tournament.

In one embodiment, the central controller, one or more gaming machines and/or other devices stores each of the scores of each game played in the tournament. For example, the central controller stores each score of each tournament game for each player. In another embodiment, each player's player tracking account or player tracking card stores that player's score for one, a plurality or each game played by that player or the player's round scores. In another embodiment, the gaming system only stores the scores of a certain number of players. For example, the top five ranked players. In another embodiment, the gaming system only stores a total score or a round score for some or all of the players. It should be appreciated that the gaming system may store any suitable tournament scores or ranks in any suitable manner.

In another embodiment, the tournament is a bonus tournament. The bonus tournament is immediately provided to the player as an award in a primary game and/or as an award in a bonus game. In one embodiment, the bonus tournament automatically begins. That is, when the player wins the tournament, that gaming machine requires the player to immediately play the tournament. The gaming system then determines the winner based on all of the players that played the bonus tournament in a certain time period, such as a 48 hour time period.

In another embodiment, the tournament is a second type of bonus tournament. The bonus tournament is provided to the player as an award in a primary game and/or as an award in a bonus game. The bonus tournament does not automatically begin, but is stored for later entry into a tournament. At a later time, the player can use the entry to play in the tournament and compete with others in any given tournament mode.

As illustrated in block 102, the gaming system determines the qualifications for the player to play in the tournament. It should be appreciated that any suitable qualifier or qualification or combination of qualifications may be employed to determine eligibility for tournament play. FIG. 7 includes a table that illustrates a plurality of possible player entry qualifications for a tournament.

As illustrated in FIG. 7, in certain types of tournaments, a method or characteristic of a player's game play qualifies the player for tournament entry. In one embodiment, the amount a player wagers determines whether the player is qualified for the tournament. The wager qualification amount may be measured in any suitable manner.

In certain types of tournaments, the wager qualification amount is determined by the amount a player wagers (i.e., a player's coin-in or wagers in) on a single gaming machine during uninterrupted game play. In another embodiment, the wager qualification amount is determined by the amount the player wagers at any linked gaming machine in an allotted time period, such as 24 hours. In another embodiment, the wager qualification amount is determined by the amount wagered on particular gaming machines or at particular gaming establishments. In another embodiment, the tournament qualifier is based on the average wager per spin of the reels or play of the game.

In one embodiment, the amount a player wins determines whether the player qualifies for the tournament entry. The qualification win amount may be measured in any suitable manner. In one type of tournament, the qualification win amount is determined by the amount a player wins on a single gaming machine during uninterrupted game play. In another embodiment, the qualification win amount is determined by the amount the player wins in an allotted time period, such as 24 hours. In another embodiment, the qualification win amount is determined by the amount the player wins at a certain type of game for a certain amount of time, such as the amount in slot games over a week.

In one embodiment, the amount of jackpot awards won by a player or winning a particular jackpot award determines whether the player qualifies for the tournament entry. In one embodiment, winning a designated jackpot qualifies the player for tournament entry. In another type of tournament, winning a certain amount from one or more jackpots qualifies the player for tournament entry. It should be appreciated that a jackpot qualifier may be determined in any suitable manner.

In one embodiment, the total amount lost by a player over a certain time period determines whether the player qualifies for the tournament entry. In one embodiment, losing a designated amount qualifies the player for tournament entry. In another type of tournament, losing a certain number of spins in a row qualifies the player for tournament entry. This creates a type of "loser's tournament" and provides players incentive to continue playing after hitting a period of bad luck. It should be appreciated that a tournament qualifier may be determined in any suitable manner.

In various types of tournaments, certain or designated games qualify the player for entry into the tournament. In one embodiment, achieving a certain game score qualifies the player for tournament entry. In another embodiment, playing a game for a certain amount of time qualifies the player for tournament entry. In one embodiment, the gaming system provides the player a tournament entry as a bonus. In another embodiment, a player may win a tournament qualifier in a bonus game. That is, a player wins tournament qualification based on the outcome of a triggered bonus or secondary game. In another embodiment, the gaming system provides the player a tournament entry fee as an award in a primary or bonus game. That is, a player may win a free entry into a tournament as an award in a game. In one such embodiment, the entry fee award is only available to players that have previously qualified for a tournament. In another embodiment, a player may win the tournament entry fee when they are not qualified for a tournament but may then attempt to either win tournament qualification or play a tournament not requiring tournament qualification, such as an on-demand tournament. It should be appreciated that the gaming system may determine tournament qualification based on any element or combinations of elements in any game.

In certain tournaments, the gaming system determines a designated time period that a player can qualify for the tournament. For example, the gaming system may determine a certain day for tournament qualification which may be advertised to players. In one embodiment, the gaming system determines particular days and/or time periods in certain days where one or more of the player qualifications count or accrue for player entry into a tournament.

In one embodiment, the qualifier is determined based on one or more characteristics from a player tracking system or account. For example, all players of a certain rank or level may qualify for tournament entry. In another embodiment, all new members to a player tracking system or gaming establishment receive an automatic tournament entry. In another embodiment, upon a player's birthday, the gaming system provides the player a tournament entry. In another embodiment, upon a player's anniversary in the player system, the gaming system provides the player a tournament entry. In one embodiment, a player tracking system includes point intervals and each time a player reaches a point interval, the player receives entry into a tournament.

In another embodiment, qualification for a tournament is based on a score or win in a previous tournament. That is, a player may win entry into a tournament from previous tournament play.

In one embodiment, the gaming system determines when the tournament will be available to a player. For example, upon tournament qualification, the gaming system may enable the player to immediately play a tournament, participate in a tournament a certain number of hours after qualifying for the tournament or participate in a scheduled tournament.

As illustrated in block 104, the gaming system determines the date or dates of the tournament. The gaming system determines the start date and end date of the tournament. In order to determine the dates of the tournament, the gaming system determines the number of rounds of the tournament. If the tournament is a synchronized tournament, the gaming system determines a date and time for each round of the tournament. Additionally, if the tournament is a synchronized tournament, the gaming system determines a maximum number of sessions a round may have. If there are multiple sessions, the gaming system determines a time and date for each session of each round. If the tournament is a self-scheduled tournament, the gaming system determines certain days and times that the players may play the tournament rounds.

As illustrated in block 106 of FIG. 6, the gaming system determines maximum number of players for the tournament. When the maximum number of players either register for the tournament or accept the offer for the tournament, the tournament closes. The gaming system determines the maximum number of gaming machines to participate in the tournament or which gaming machines will participate in the tournament.

In certain tournaments, the gaming system determines the entry fee of the tournament for the player. In one embodiment, the gaming system requires the player to pay a certain amount of money or credits to enter the tournament. It should be appreciated that the entry fee may be any suitable form of payment. In one embodiment, the gaming system requires the player to pay a certain amount of promotional credits which are gaming establishment funded wagering credits to enter the tournament. In one embodiment, these promotional credits are automatically credited to a player account and that player may use the promotional credits for any purpose that the player account may be used for. In another embodiment, the gaming system requires the player to pay a certain amount of coupons, which are redeemable and offered to the general public to enter the tournament. For example, in the hotel affiliated with the gaming establishment, players receive coupons to enter the tournament. In another embodiment, the gaming system requires the player to pay a certain amount of gift certificates to enter the tournament. In another embodiment, the gaming system requires the player to pay a certain amount in vouchers to enter the tournament. Vouchers are a more secure form of credit than coupons that gaming machines accept. In another embodiment, a player may use player tracking points to enter a tournament instead of paying a fee to enter the tournament. In one embodiment, player tracking points are they only way to enter a tournament. It should be appreciated that the player may pay the entry fee for the tournament at one of the gaming machines directly prior to the tournament, for example, by using a credit card.

In another embodiment, the player is not required to pay an entry fee.

It should be appreciated that the gaming system may implement any buy in or entry fee for the tournament in any suitable manner. It should also be appreciated that in one embodiment, some players must pay an entry fee but other players do not. In one embodiment, the amount of the tournament entry fee is based on the player's rank in a player tracking system. For example, a player of a platinum rank in a player tracking system does not have to pay an entry fee and a player of a gold rank must use 50 player points to enroll in the tournament.

In one embodiment, the entry fee for the tournament may change over time based on tournament enrollment. For example, when the gaming system opens up a tournament for registration, the entry fee is $50. If the tournament is not half full within a week, the gaming system lowers the entry fee to $40.

In one embodiment, the entry fee or buy in is not required to pay in advance of the tournament. Rather, the fee is automatically deducted from the player's account upon the play of the tournament. In one embodiment, this automated buy in is an option that a player may select when registering for the tournament.

In one embodiment, the player is not required to make a separate buy-in or pay an entry fee to play the tournament. In one such embodiment, the player's account has a separate account used for the buy-in of tournaments. In one such embodiment, a certain percentage, such as 1%, of all credits wagered by a player or coin-in for a certain time period is dedicated to this tournament credit account. For example, if the time period is a year and the player wagers $5000 over the year, the player will have a $50 tournament credit account. In one such embodiment, the buy in for the tournament is deducted from this tournament credit account. For example, if the entry cost to the tournament is $25, that amount is automatically deducted from the tournament credit account upon registration. In another embodiment, the amount in the tournament account affects the player's qualification for the tournament. For example, only if the player has $100 or more in the tournament credit account is the player eligible to play in the tournament.

It should be appreciated that the qualifications and entry fees of the tournament may be based any suitable elements and may be configured in any suitable manner.

As illustrated in block 108 of FIG. 6, the gaming system determines the number of winners and the prizes to award each winner. It should be appreciated that the prizes for the tournament may be any suitable prize including but not limited to cash, a physical prize, such as a car or different type of prize, such as a vacation or a free night at the gaming establishment's hotel. In another embodiment, the prize or the award for the tournament is not disclosed to the players. That is, the prizes are a mystery to the players. In one embodiment, the top prize of the tournament is a mystery. In another embodiment, the tournament includes a mystery secondary prize. In another embodiment, a player may win player tracking points. In another embodiment, the gaming system provides gaming establishment money to a player. That is, the player receives a certain amount of money that may only be spent at the gaming establishment or at affiliates of the gaming establishment. In one embodiment, instead of cash, the prize is a gift certificate for a certain amount of money to be played at the gaming establishment hosting the tournament. In one embodiment, the player may use the gaming establishment money at other venues, such as hotels and restaurants, affiliated with the hosting gaming establishment.

In one embodiment, an award for a tournament is a game function or enhancement that may be saved and used in non-tournament games. For example, in an instant tournament, the players may win a multiplier to apply to a designated number of non-tournament games. It should be appreciated that the gaming system may provide any tournament player an award of a non-tournament game function in any suitable tournament. In one embodiment, the gaming system requires the player to immediately use the game function after the tournament. In another embodiment, the game function is stored in the gaming system or in a player account. The player may make an input to use or apply the game function at a later date for any suitable non-tournament game. In another embodiment, the gaming system requires the player to use the game function at a later date, requiring a return visit from the player. In another embodiment, the gaming system requires the player to use the game function on a certain date, requiring a return visit from the player. For example, the gaming system provides the player 10 free games that must be redeemed the day after winning the free games.

In one embodiment, each session and/or round includes prizes for the players; therefore the tournament includes multiple award levels. That is, an award or a prize is awarded to other players in addition to the overall tournament winner. In one embodiment, the tournament is a synchronized group tournament which includes multiple rounds and multiple sessions for each round. In one embodiment, the tournament provides awards for each session and each round. That is, for each session, one or more players receive an award based on the session score. Each session can thus be viewed as a sub-tournament of the larger tournament. In another embodiment, the gaming system provides a prize for each round winner. In another embodiment, the player with the lowest score receives a prize, such as an entry into another tournament.

In one embodiment, the tournament is funded by wagers placed for a certain time period. For example, a percentage of the wagers at a plurality of designated gaming machines fund a tournament pool that provides the prize for the tournament. In one such embodiment, the gaming system messages the current tournament award levels to the players. For example, a large sign displays the tournament jackpot and changes as more money is added to the tournament jackpot.

As illustrated in FIG. 6 at block 110, the gaming system determines the payout table for the tournament game. In one embodiment, the paytable is the same for each player. In another embodiment, the paytable may be different for players. For example, in a live money embodiment, if players are wagering on gaming machines of different denominations, the paytables may be different. The paytables may be different for players for any suitable reason, such as but not limited to, player tracking status, player tracking points, time of tournament entry, for a bonus won in a primary or bonus game, or any other suitable reason. Additionally, the gaming system determines any applicable bonus modes for the games of the tournament system.

The gaming system determines the method of scoring for the tournament as illustrated in FIG. 6 at block 112. Any appropriate scoring method may be used to determine the outcome of the tournament. In one embodiment, the gaming system determines if the tournament is based on points or credits. In one embodiment, the gaming system determines a tournament score for each participating player based on the score of each game played by the player in the tournament. In another embodiment, the gaming system determines a tournament score for each participating player based on the best game score for each round. In another embodiment, the gaming system determines a tournament score for each participating player based on a certain number of game scores, such as the top three game scores for the entire tournament. In another embodiment, one or more scores of a round qualify the players for a final round. In one such embodiment, the winner of the final round wins the tournament.

It should be appreciated that the gaming system may display or provide the players points or non-redeemable credits in any suitable manner during the tournament. The gaming system may include predetermined paytables or enable a gaming establishment operator to customize the paytables. In one embodiment, the gaming system enables the gaming establishment operator to determine the awards associated with the winning tournament game outcomes. In one embodiment, the gaming system enables the gaming establishment operator to determine the probabilities of the gaming machines and/or the central controller generating each of the winning game outcomes. In one embodiment, the tournament game outcomes, the awards associated with the tournament game outcomes and/or the probabilities of generating the tournament game outcomes remain constant throughout the tournament. That is, the gaming system sends a tournament game program to each participating gaming machine. The tournament game program includes or is associated with a paytable which includes a plurality of tournament game outcomes, probabilities of generating the tournament game outcomes and awards associated with the tournament game outcomes. In one embodiment, the paytable does not change through-out the tournament.

In another embodiment, one or more tournament game outcomes, the awards associated with one or more tournament game outcomes and/or the probabilities of generating one or more tournament game outcomes are configured to change one or more times throughout the tournament. That is, in one embodiment the gaming system employs a first tournament game program for a part of the tournament and a second tournament game program for another part of the tournament to change the odds of generating one or more tournament game outcomes, the awards associated with one or more tournament game outcomes and/or the probabilities of generating one or more tournament game outcomes.

In one embodiment, the gaming system changes a percentage of that tournament game outcome being generated by changing the symbols of one or more reels of a gaming machine and/or changing the percentage associated with one or more symbols of one or more reels of one or more gaming machine. For example, in a slot game, the gaming system may use any suitable virtual reel mapping to add a symbol of one of the winning symbol combinations to the reels, increasing the chance that the symbol will be generated or to remove a symbol that is not part of a winning symbol combination to increase the chance of generating a winning symbol combination.

More specifically, in one embodiment, the gaming system changes one or a probabilities of generating a tournament game outcome in one or more tournament game programs using any suitable virtual reel strips or any suitable virtual mapping. In one embodiment, the gaming system weights modifies or changes one or more virtual reel strips to change the probabilities of generating one or more tournament game outcomes. In one such embodiment, a first tournament program is different from a second tournament program based on the modification of one or more virtual reel strips including a number of stops or positions.

In one such embodiment, each of the gaming machines includes one or more symbol generators. Each of the symbol generators includes a number of stop positions or symbol positions. One or a plurality of numbers are assigned to each stop position for each of the symbol generators of each gaming machine. For each tournament game played, the gaming system randomly selects a number for each of the symbol generators of that game. In one embodiment, the numbers are entered into a random number generator. A random number generator selects a number for each of the symbol generators for each tournament game. The gaming system stops the symbol generator at the stop position associated with the selected number. For each symbol generator, each number may be entered one or more times to control the odds of each of the stop positions being selected. Thus, it should be appreciated that the odds of generating a designated tournament game outcome or a tournament game outcome associated with a designated award on one or more gaming machines may thus change based on the programming of the virtual reel strip without changing the physical appearance of any of the symbol generators. It should be appreciated that the gaming system may change the probabilities of generating a tournament game outcome in any suitable manner.

In one embodiment, the gaming system sends a tournament game program to each participating gaming machine. The tournament game program includes or is associated with a paytable which includes a plurality of tournament game outcomes, probabilities of generating the tournament game outcomes and awards associated with the tournament game outcomes. In one such embodiment, the tournament game outcomes of the paytable include a winning game outcome that is associated with a maximum award, jackpot award or a large amount of points or credits. The tournament is configured such that at least one participating gaming machine of the tournament will generate the winning game outcome associated with this maximum award during the tournament. The gaming system displays or otherwise indicates the maximum award to the player during the tournament and accumulates the awards associated with the game outcomes generated for that player. At the end of the tournament, the gaming system determines a tournament winner based on the overall tournament scores or credits accumulated for each player.

Figure 21:
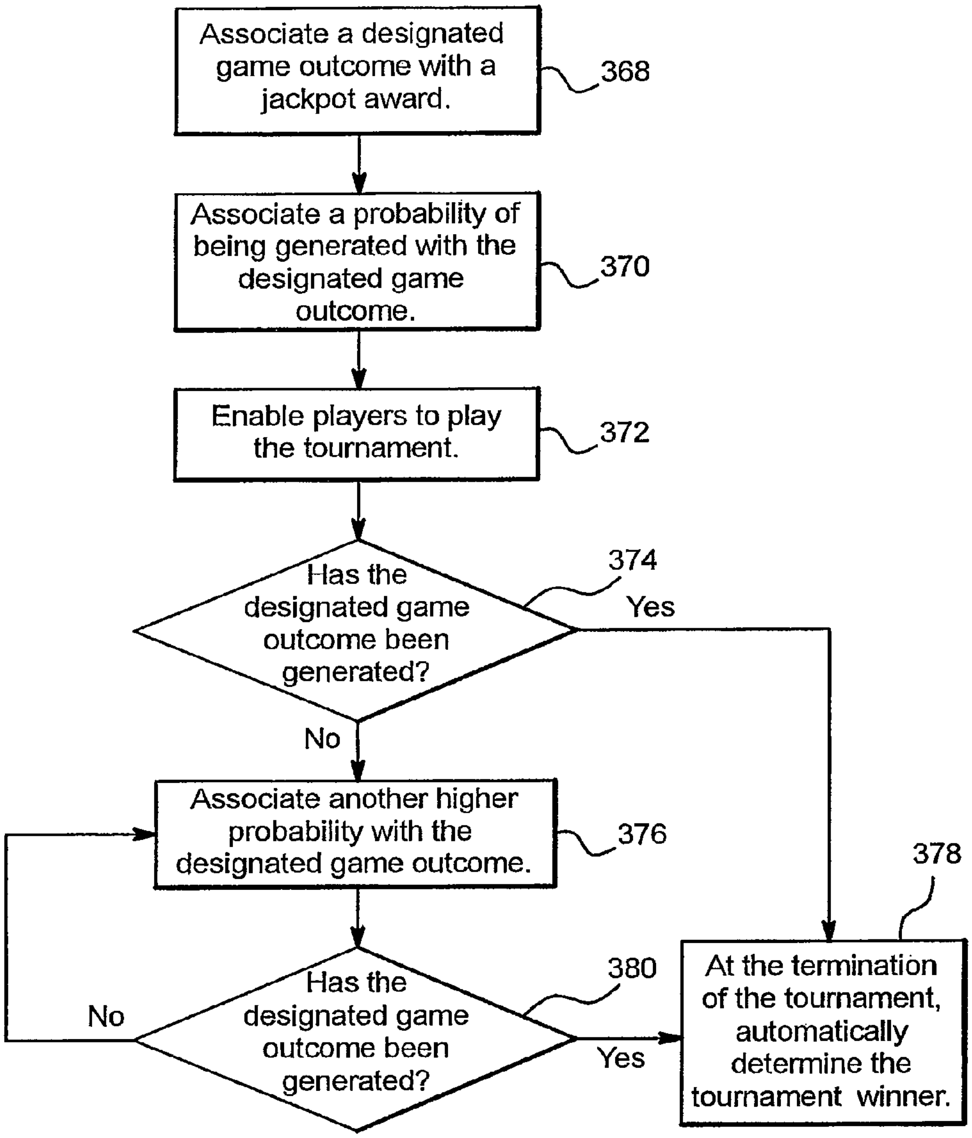
FIG. 21 is a flow chart illustrating one embodiment of increasing a probability of generating a designated symbol combination associated with a maximum award.

As illustrated in FIG. 21, in one embodiment, the gaming system associates a game outcome with a jackpot award or a maximum award amount as illustrated in block 368. It should be appreciated that the gaming system may choose one or more designated winning game outcomes to associate with a maximum award or a jackpot award. The gaming system associates a probability of being generated with the designated game outcome as illustrated in block 370. The gaming system determines or enables any other tournament configurations. The gaming system enables the players to play the tournament as illustrated in block 372. The gaming system determines if the designated game outcome has been generated as illustrated in diamond 374. In one embodiment, each of the gaming machines send each generated game outcome and/or displayed award to a central controller upon an occurrence of a triggering event or after a play of a game. In another embodiment, the central controller determines each generated game outcome and/or award and therefore continually stores the game information. If the designated game outcome has been generated, at the termination of the tournament, the gaming system automatically determines the tournament scores and the tournament winner as illustrated in block 378. If the designated game outcome has not been generated, the gaming system associates another higher probability with the designated game outcome as illustrated in block 376. It should be appreciated that the gaming system may associate another higher probability with the designated game outcome based on any suitable factor. In one embodiment, upon a triggering event, the gaming system associates another higher probability with the designated game outcome. The gaming system continually evaluates the generated game outcomes of the tournament to determine if the designated game outcome has been generated as illustrated in diamond 380. If the designated game outcome has not been generated, the gaming system associates another higher probability with the designated game outcome as illustrated in block 376. In one embodiment, once the designated game outcome has been generated, the gaming machine sends a signal to the central controller that the designated game outcome has been generated. In one embodiment, once the designated game outcome has been generated, the gaming system does not associate any more probabilities with that designated game outcome. In another embodiment, once the designated game outcome has been generated, the gaming system associates a new lower probability of being generated with the designated game outcome. In one such embodiment, the gaming system associates a probability of zero with the designated game outcome. That is, in one embodiment, the designated game outcome is only generated once during the tournament. In another embodiment, upon generation of the designated game outcome, the gaming system associates a new award with the designated game outcome such that only one player may achieve the jackpot award or maximum award. In another embodiment, during a tournament, the gaming system enables a plurality of players to achieve a designated outcome associated with the jackpot award or maximum award.

That is, the maximum award may be displayed to a plurality of different players during the tournament.

In one such embodiment, the maximum award is associated with a single tournament winning game outcome. The winning game outcome has an initial probability of being generated in the tournament. As the tournament progresses, if that winning game outcome has not been generated, the probability associated with that winning game outcome increases as the tournament progresses such that the probability of a gaming machine generating the winning game outcome by the end of the tournament is close or near to 100%.

For example, as illustrated in FIGS. 22A, 22B, 22C and 22D the tournament game is a slot game and a maximum award, 100,000 credits, is associated with the game outcome of 7 7 7 7 7. The tournament duration is 5 minutes. Initially, the probability of one of the tournament gaming machines generating the symbol combination 7 7 7 7 7 is 0.001% as illustrated in FIG. 22A. As illustrated in FIG. 22B, after 2 minutes, at time 2, if one of the tournament gaming machines has not generated the symbol combination 7 7 7 7 7, the probability associated with the symbol combination 7 7 7 7 7 increases to 0.05%. As illustrated in FIGS. 22A through 22D, in one embodiment, the probabilities of achieving other symbol combinations remain constant while the probability associated with a designated winning symbol combination increases. After 4 minutes, if one of the tournament gaming machines has not generated the symbol combination 7 7 7 7 7, the percentage that the symbol combination 7 7 7 7 7 increases to 1% as illustrated in FIG. 22C. In one embodiment, as the probability of generating the designated symbol combination 7 7 7 7 7 increases, the percentage of generating other symbol combinations decreases. In one embodiment, after the designated symbol combination has been generated, the probability of generating the designated symbol combination decreases to 0% as illustrated in FIG. 22D. In one embodiment, the probability of generating other winning symbol combinations increases once the designated symbol combination has been generated and decreases to 0%.

The gaming system may increase the probability of being provided or selected associated with a designated tournament game outcome in any suitable manner. In one embodiment, the gaming system employs a plurality of paytables to increase the probability of generating a designated tournament outcome. For example, at the beginning of a tournament, a central controller messages a first tournament game program to a plurality of gaming machines for a tournament, the first tournament game program including a first paytable. The first paytable includes a plurality of tournament game outcomes including a designated tournament game outcome. The tournament game outcomes are each associated with a probability of being provided during the tournament. The designated tournament game outcome is associated with a first probability of being provided during the tournament. The gaming system enables each of the gaming machines to download the first tournament game program. The gaming system enables each of a plurality of players to play tournament games associated with the first tournament program. For each tournament game played, the gaming system determines a tournament game outcome to provide based on the first paytable, provides the determined tournament game outcome and displays any award associated with the determined tournament game outcome. In one embodiment, the gaming machines send the determined tournament game outcome to a central controller upon a triggering event or at the end of each game.

Upon an occurrence of a triggering event, the central controller determines if the designated tournament game outcome has been provided. If the designated tournament game outcome has not been provided, the central controller messages a second tournament game program to a plurality of the gaming machines for the tournament which includes a second paytable. The second paytable includes a plurality of the tournament game outcomes including the designated tournament game outcome. The tournament game outcomes are each associated with one of the probabilities of being provided during the tournament. Each of the tournament game outcomes may be associated with the same probabilities as the first paytable or probabilities that are different from the first paytable. The designated tournament game program is associated with a second probability of being provided. The second probability of being provided is higher than the first probability of being provided. The gaming machines enable each of a plurality of players to play tournament games associated with the second tournament program in the tournament. For each the tournament game played, the gaming machine determines one of the tournament game outcomes to provide based on the second paytable, provides the determined tournament game outcome and displays any award associated with the determined tournament game outcome. The gaming machine sends the determined tournament game outcome to the central controller. This process of employing new paytables that have a higher probability of being generated associated with a designated award continues until the designated award is generated.

At the end of the tournament, the central controller determines a tournament winner based on the displayed awards. It should be appreciated that the tournament outcomes and the awards may be determined by the central controller which messages the determined game outcomes to the gaming machines which display the game outcomes and awards determined by the central controller. The central controller may continue to employ new paytables in the tournament that have a higher probability of being generated associated with a designated award until the designated award is generated in the tournament. It should also be appreciated that the central controller may message a plurality of paytables to the gaming machines or the gaming machines may store a plurality of paytables. The central controller then messages the gaming machines regarding which paytable to employ at different points in the tournament.

In one embodiment, the gaming system centrally determines the game outcomes or awards and guarantees that the jackpot or maximum award will be displayed to a player during a tournament and that the maximum award is only displayed to one player during a single tournament. Certain central determination gaming systems have been implemented wherein the central system maintains one or more predetermined pools or sets of random number or game play seeds. In these systems, the central processor selects a game play seed and the selected game play seed is communicated to an individual gaming machine. The gaming machine utilizes the communicated game play seed to determine the predetermined game outcome. In one embodiment, the tournament has a predetermined pool of tournament game outcomes and/or tournament awards that include all available tournament game outcomes and/or tournament awards. In one embodiment, the central controller selects one of the tournament game outcomes. One of the gaming machines displays the selected tournament game outcome. During a tournament, once that tournament game outcome has been selected, it is unavailable to be selected and displayed again in a tournament or a round of the tournament or for a designated time period. In this embodiment, as each game outcome is provided to one of the players, the gaming system flags or removes the provided game outcome from the predetermined set or pool. Once flagged or removed from the set or pool, the specific provided game outcome from that specific pool cannot be provided again. It should be appreciated that a pool may include game outcomes or awards.

In another embodiment, the gaming system includes a designated tournament game outcome in a predetermined pool. This designated tournament game outcome is associated with a maximum award. The gaming system randomly determines the tournament game outcomes that are not in the predetermined outcome pool. Upon the occurrence of a triggering event, the gaming system selects and provides the designated tournament game outcome to the player and displays the maximum award to the player. That is, in one embodiment, a predetermined outcome pool includes one or more tournament game outcomes or tournament game awards but not all of the available tournament game outcomes or tournament game awards. In this embodiment, the game outcomes in the pool of outcomes are provided to one or more players during the tournament upon an occurrence of a triggering event or at a certain point in time in the tournament and the other game outcomes are randomly provided to the players through-out the tournament.

Figure 23:
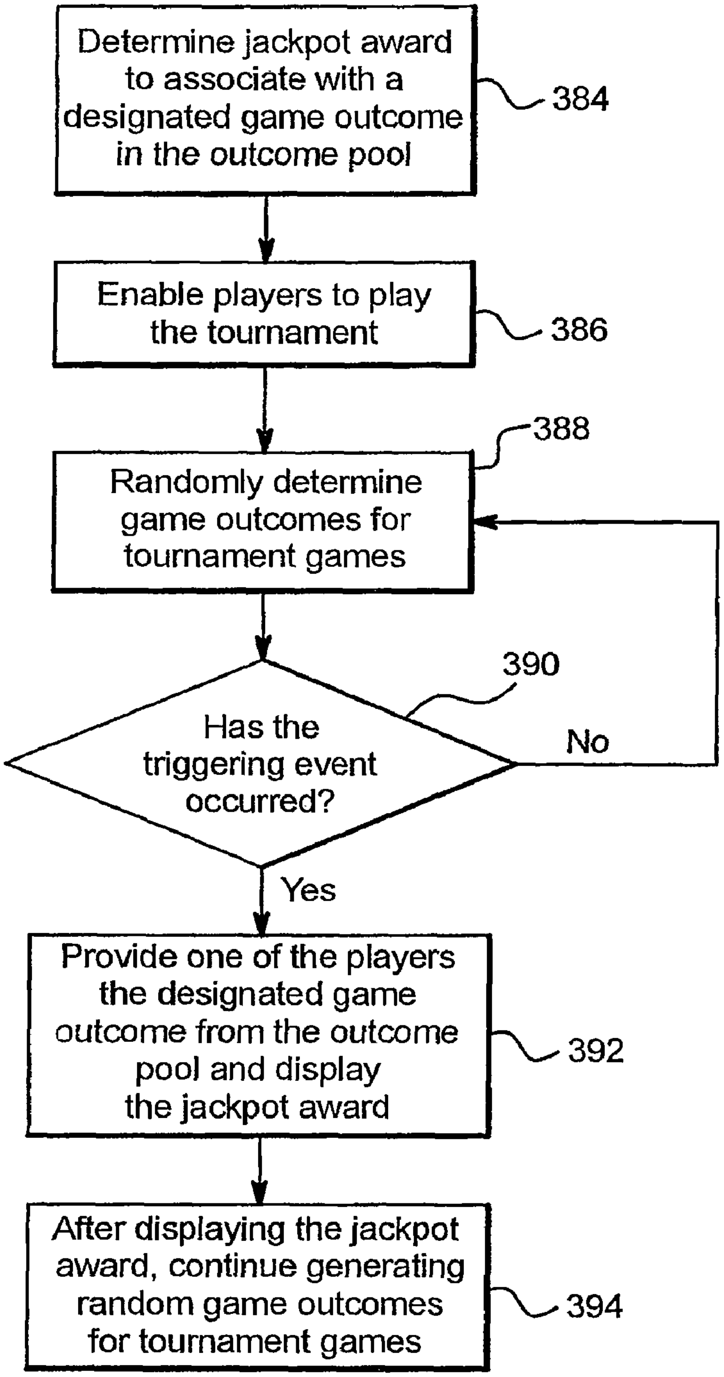
FIG. 23 is a flow chart illustrating one embodiment of a tournament that includes providing the determined tournament jackpot award from an outcome pool upon an occurrence of a triggering event and randomly determining other tournament awards.

As illustrated in FIG. 23, in one embodiment, the gaming system randomly determines game outcomes for tournament games and upon an occurrence of a triggering event, the gaming system provides a player with a designated game outcome associated with a jackpot award or a maximum award. As illustrated in FIG. 23, in one embodiment, the gaming system determines a jackpot award to associate with a designated game outcome for an outcome pool as illustrated by block 384. It should be appreciated that a tournament may include one or more jackpot awards. The gaming system enables the players to play the tournament as illustrated in block 386. The gaming system randomly determines game outcomes for tournament games as illustrated in block 388. The gaming system determines if the triggering event has occurred as illustrated in diamond 390. In one embodiment, if there is an occurrence of the triggering event, the gaming system provides one of the players of the tournament the designated game outcome from the outcome pool and displays the jackpot award to that player as illustrated in block 392. If the triggering event has not occurred, the gaming system randomly determines game outcomes for the tournament games as illustrated in block 388. After providing one of the players the jackpot award, the gaming system continues to generate random game outcomes as illustrated in block 394. At the end of the tournament, the gaming system determines the winner of the tournament. It should be appreciated that an outcome pool may include one or more tournament game outcomes that are associated with a maximum award.

It should be appreciated that the gaming system may use pools in any suitable manner. In one embodiment, the gaming system centrally determines the game outcomes or awards and guarantees that the jackpot or maximum award will be displayed to a player during a tournament. In one such embodiment, the outcome pool includes all of the possible outcomes of the tournament. In one such embodiment, the gaming system associates a designated award with one of the tournament game outcomes based on an additional factor. For example, the tournament game outcome of bar bar bar in the first five minutes of the tournament is associated with an award of 0 non-redeemable credits. In a next five minutes, the tournament game outcome of bar bar bar is associated with the designated award. In a last five minutes of the tournament, the tournament game outcome of bar bar bar is associated with an award of five non-redeemable credits. It should be appreciated that any tournament game outcome may be associated with any suitable award based on any suitable factor including but not limited to previous tournament game outcomes generated in the tournament, a number of total tournament games played, a passage of time, a generation of a certain one of the tournament game outcomes, an operator input and a tournament score.

In one embodiment, the gaming machines determine or generate the tournament game outcomes. In one such embodiment, the central controller sends or messages a command to at least one of the gaming machines to not provide the tournament game outcome determined by the gaming machine and to provide the designated tournament game outcome. For example, a gaming machine generates a tournament game outcome of the symbols: orange bell orange. The central controller, randomly or upon an occurrence of a designated event or triggering event, messages the gaming machine to not provide the tournament game outcome of orange bell orange and to provide a designated tournament game outcome.

It should be appreciated that the triggering event may be any suitable event. In one embodiment, the triggering event is a passage of time. For example, at the end of a time period, such as 12 minutes into a 15 minute tournament, the gaming system provides the player who receives the next generated game outcome with a designated game outcome associated with the jackpot or designated award. In another embodiment, the triggering event is a game outcome. In another embodiment, the triggering event is a game outcome generated in a designated time period. In another embodiment, the triggering event is an operator input. In another embodiment, the triggering event is a number of game outcomes, such as a certain number of consecutive winning game outcomes. In another embodiment, the triggering event is a point total. In another embodiment, the triggering event is an accumulating event. In one embodiment, the accumulating event is accumulated tournament wide. For example, the triggering event is the occurrence of the symbol combination bar bar bar ten times by any of the gaming machines of the tournament. The triggering event may be based on individual player accumulation. For example, the triggering event is any player individually obtaining three designated game outcomes.

It should be appreciated that the probability of one or more tournament game outcomes being generated, selected or provided may increase due to any suitable factor or combinations of factors evenly for the group gaming machines, including but not limited to: (a) time in a time based tournament; (b) number of games played in a number of games based tournament; (c) total amount wagered in a gaming session in a live money tournament; (d) a player ranking and (e) any other player card statistic. It should be appreciated that the probability of one or more tournament game outcomes being generated, selected or displayed by one or more gaming machines may increase variably for one or more gaming machines due to any suitable factor or combinations of factors, including but not limited to: (a) an amount of time in a time based tournament; (b) number of games played in a number of games tournament; (c) total amount wagered in a gaming session in a live money tournament; (d) the location of a gaming machine; and (e) player tracking statistics.

It should be appreciated that the maximum award or jackpot award may be any suitable award. In one embodiment, the maximum award is a number of points. In another embodiment, the maximum award is a number of non-redeemable credits. In another embodiment, the maximum award is a number of player points that apply to the player tracking accounts.

It should be appreciated that the maximum award may be provided to any suitable number of players during a course of a tournament.

It should be appreciated that the gaming system may indicate the tournament game awards to the players in any suitable manner. In one embodiment, the gaming system displays one or more of the tournament game awards to the players. In another embodiment, the gaming system auditorily indicates one or more tournament game awards to the players. In another embodiment, the gaming system individually indicates each of the tournament game awards to the players. In another embodiment, the gaming system indicates each of the tournament game awards to the players at a certain point in the tournament. That is, the gaming system does not individually indicate every individual tournament game award to a player but summarizes the tournament game awards and indicates them to the player upon a triggering event.

It should also be appreciated that the server based tournament system disclosed herein enables the tournament to be based on criteria other than most accumulated points or credits. In one such embodiment, the gaming system determines a tournament score or standing for each participating player based on occurrences of a designated event during the tournament. The tournament scoring in one embodiment is completely based on one or more designated outcomes or events. For example, the player with the most occurrences of scatter pays wins the tournament. It should be appreciated that the tournament score may be based on any suitable event or combination of events. In one embodiment, the player with most occurrences of a single symbol wins the tournament. For example, the gaming system determines the winner of the tournament based on which player has generated the most wild symbols during play of the tournament. In another embodiment, the player with the most occurrences of one or more designated groups of symbols wins the tournament. For example, the gaming system scores the tournament based on which player generated the most flushes in a video poker tournament. In another embodiment, the designated event or outcome is generating a symbol in a specific location. For example, the gaming system scores the tournament based on the cherry symbols in the first column or on the first reel. That is, whichever player generates the most cherry symbols in the first column of the gaming machine is the winner of the tournament. In another embodiment, the winner of the tournament is based on the greatest number of total winning combinations. In another embodiment, the winner of the tournament is based on the most occurrences of winning outcomes in a row. In another embodiment, the winner of the tournament is based on the most occurrences of losing outcomes in a row. In another embodiment, the winner of the tournament is based on the highest single payout of the players. In another embodiment, the winner of the tournament is based on the highest average payout of the players. It should be appreciated that the designated outcome or event may be any suitable outcome or event. In another embodiment, the tournament is based on the least occurrences of a designated outcome or event. For example, the tournament winner is the player who generated the fewest blank symbols in the slot tournament. It should be appreciated that the designated award or event may be any suitable event, including but not limited to: (a) a game outcome; (b) a point total; (c) a credit total; (d) a bonus event; (e) a game event; or (f) any combination thereof.

It should be appreciated that the tournament may have any suitable number of winners. In one embodiment, the tournament winners are determined through one or more different methods of scoring. For example, the prizes for the tournament are three $1000 prizes. The player with the most accumulated credits wins $1000, the person with the most wins on payline #2 wins $1000 and the person with the first occurrence of the symbol combination of bar-bar-bar-bar wins $1000. It should be appreciated that the gaming system may determine the tournament winners based on any suitable number of methods.

In one embodiment, the gaming system provides awards to a plurality of players in addition to providing an award to the overall tournament winner. In one such embodiment, the gaming system determines the tournament winner based on a first method of scoring, such as the player with the most points or credits. The gaming system additionally determines one or more players to provide an award or prize based on another method of scoring, such as the person with the most occurrences of a designated outcome or an event.

In another embodiment, the player with the most occurrences of a designated outcome or event in a certain time period during the tournament is the tournament winner or wins a prize. In one embodiment, upon the occurrence of a triggering event, the gaming system monitors a designated outcome or event for a certain time period to determine a tournament winner. For example, upon a player achieving a certain symbol combination, the player with the most occurrences of a wild symbol for the next 10 minutes during the tournament wins a prize. In another example, upon a player reaching a certain point level, every time a player gets a 7 symbol in the next two minutes during the tournament, the gaming system provides that player with a point. It should be appreciated that the triggering event may be any suitable triggering event, including but not limited to: (a) a game outcome; (b) a point total; (c) a credit total; (d) a time period; (e) an input from a gaming establishment operator; (f) a bonus event; (g) a game event; or (h) any combination thereof.

Figure 19A:
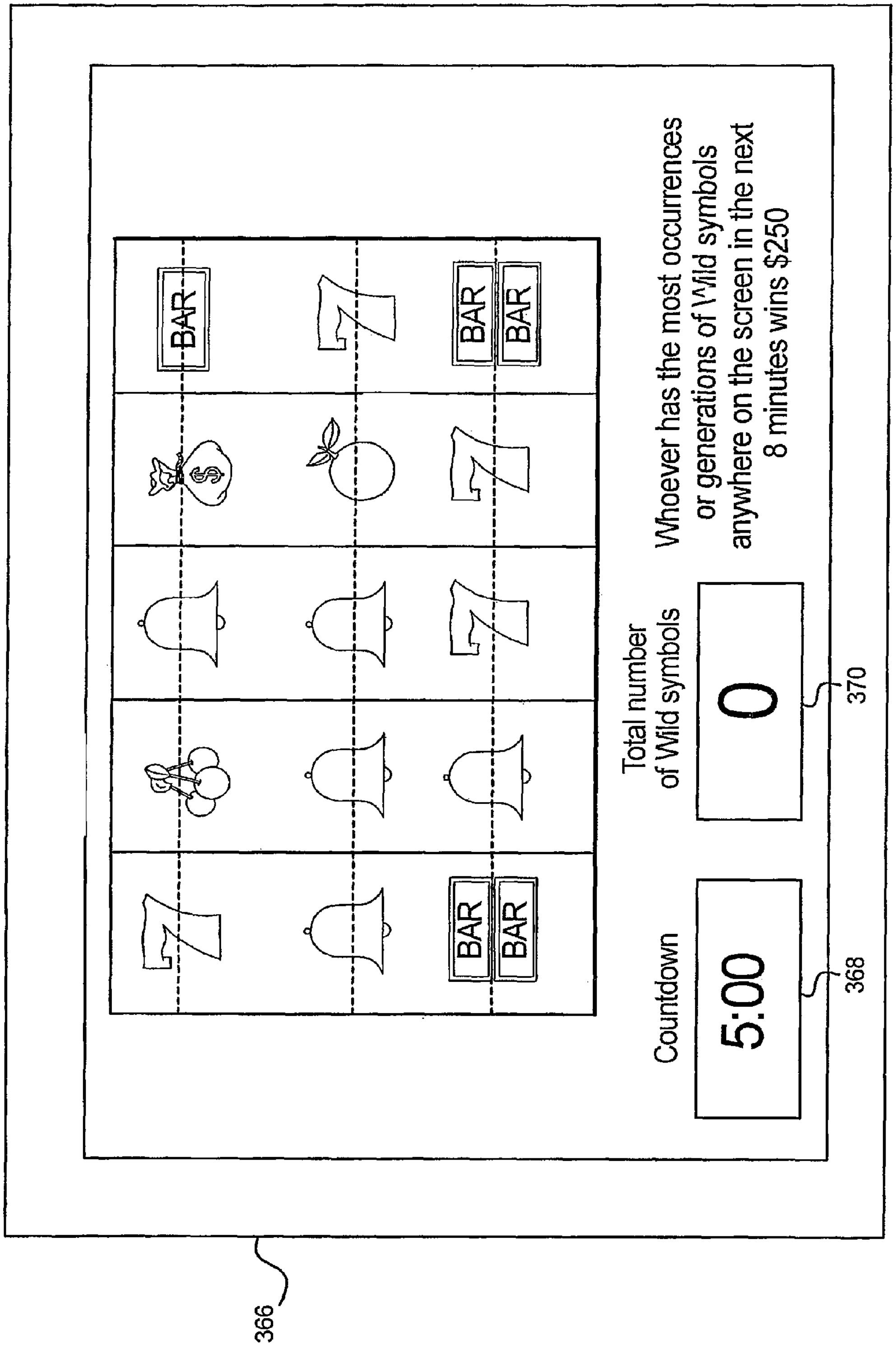
FIGS. 19A and 19B are enlarged views of one embodiment of a display device of a gaming machine displaying to the player the beginning and end of a sub-tournament.

For example, as illustrated on FIG. 19A, in one embodiment, randomly or upon an occurrence of a triggering event during a tournament, the gaming system holds a contest or a sub-tournament to provide one or more players with the greatest number of occurrences of a designated event a prize. For example, in a synchronized tournament, the gaming machines of the gaming system display messages to the players during the play of the tournament that whichever player generates the most wild symbols anywhere on the display devices in an 8 minute period wins $250, as illustrated on the display device 366 of a gaming machine in FIG. 19A.

As illustrated in FIG. 19A, in one embodiment, one or all of the gaming machines display suitable information regarding the contest or sub-tournament. For example, the gaming machine display device displays a countdown of time in a time display meter 368 and a total number of wild symbols in a wild symbol display 370.

Figure 19B:
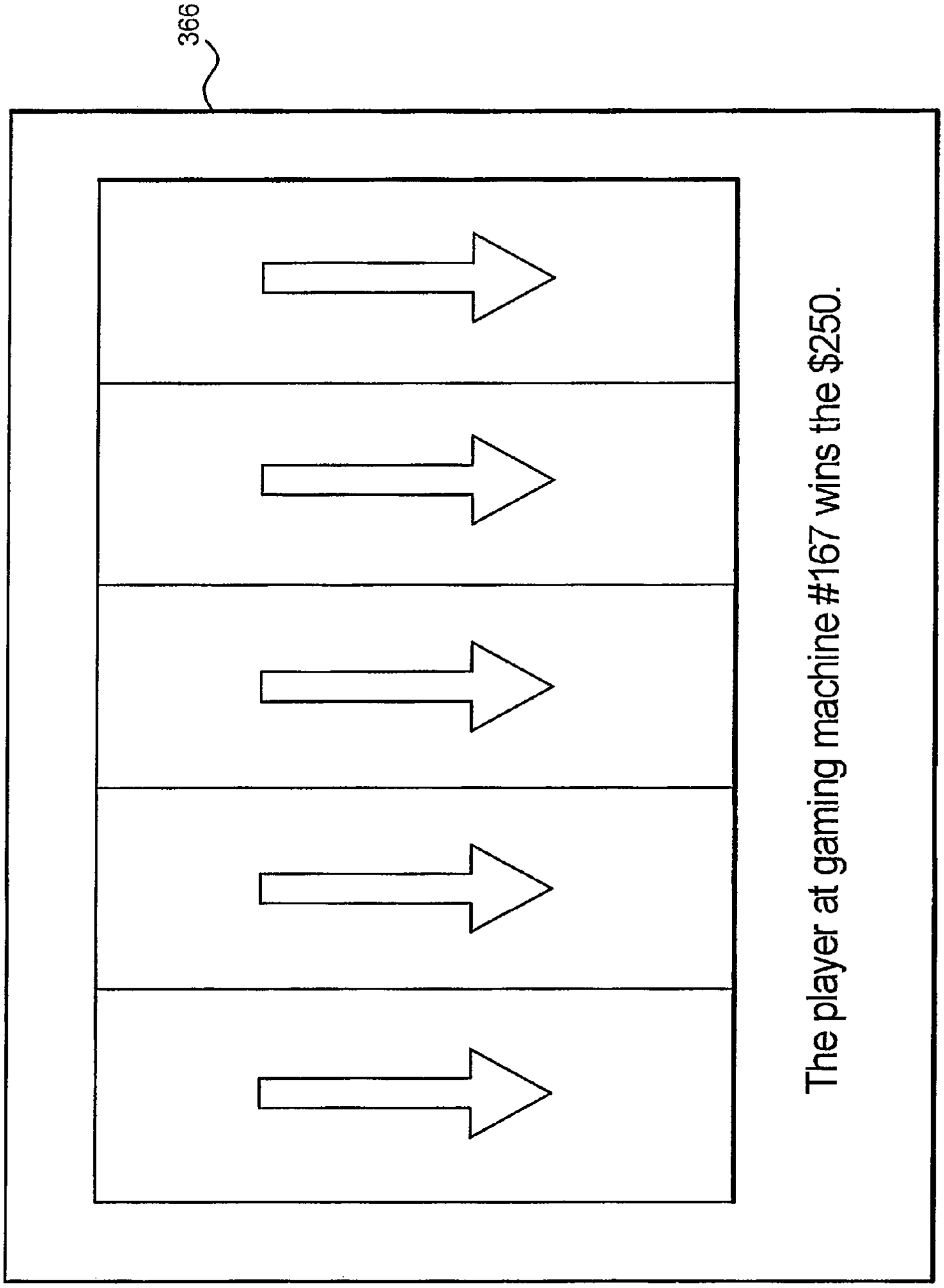

As illustrated in FIG. 19B, in one embodiment, the gaming system notifies the players of the tournament which player won the $250. In another embodiment, the gaming system only notifies the winner of the contest or sub-tournament. In another embodiment, the winner of the contest or sub-tournament is announced at the end of the tournament, round or session of the tournament.

It should be appreciated that intermittent or intermediate awards in a tournament may be determined based on any suitable tournament or game parameters or criteria which can be measured by the server based system. In one embodiment, one or more intermittent awards are based on designated symbol occurrences on a designated payline. In another embodiment, the player with the first occurrence of a designated event wins a prize. For example, the first player who achieves a royal flush in a video poker tournament wins an award or prize. The gaming system may provide any suitable number of players awards or prizes based on any suitable criteria. It should be appreciated that the designated award or event may be any suitable event, including but not limited to: (a) a game outcome; (b) a point total; (c) a credit total; (d) a bonus event; (e) a game event; or (f) any combination thereof.

In one embodiment, the gaming system requires a player to wager a certain amount or to buy into the sub-tournament. In another embodiment, the gaming system does not require the players to wager certain amounts or to buy into the sub-tournament.

In one embodiment, the gaming system enables certain tournament players to participate in the sub-tournament or be eligible for intermittent awards. For example, only players playing at a first bank of gaming machines are eligible to win the intermittent award. In another example, only players of a certain level, such as gold player status level players, are eligible to player for the award. In another embodiment, only the players with the 10 lowest scores are eligible to win the intermittent award. It should be appreciated that eligibility to participate in the sub-tournament and to win intermittent awards may be determined by or based on any suitable criteria.

In an alternative embodiment, players actively playing on the gaming machines of the gaming system but not participating in a tournament are eligible to play in the sub-tournament or to win an intermittent award. In one such embodiment, when a tournament is occurring at one or more of the gaming machines, the gaming system enables other, non-tournament players to compete for an award. It should be appreciated that the gaming system may determine the eligibility of non-tournament players in any suitable manner. In one such embodiment, the gaming system enables every non-tournament player currently playing a gaming machine to play in the sub-tournament. In another embodiment, the gaming system only enables certain non-tournament players, such as gold level players, to participate in the sub-tournament. In another embodiment, the gaming system determines which non-tournament players are eligible based on the locations of gaming machines. For example, the non-tournament players of gaming machines 1 to 50 are eligible to play in the sub-tournament.

In one embodiment, the gaming system requires a non-tournament player to wager a certain amount or to buy into the sub-tournament. In one embodiment, the gaming system only requires non-tournament players to wager a certain amount or to buy into the sub-tournament. In one embodiment, tournament players may automatically participate in the sub-tournament but there is some form of entry barrier for non-tournament players. In another embodiment, the gaming system does not require any players to wager certain amounts or to buy into the sub-tournament.

In another embodiment, an event in or associated with one or more player's games affects an aspect of one or more other player's game or one or more other player's tournament. For example, a player's game outcome affects one or more of the games, points or credits or tournament duration of other players. That is, when a player achieves an outcome or a designated event during a tournament, the gaming system changes one or more aspects of another player's game or credit total.

Figure 20A:
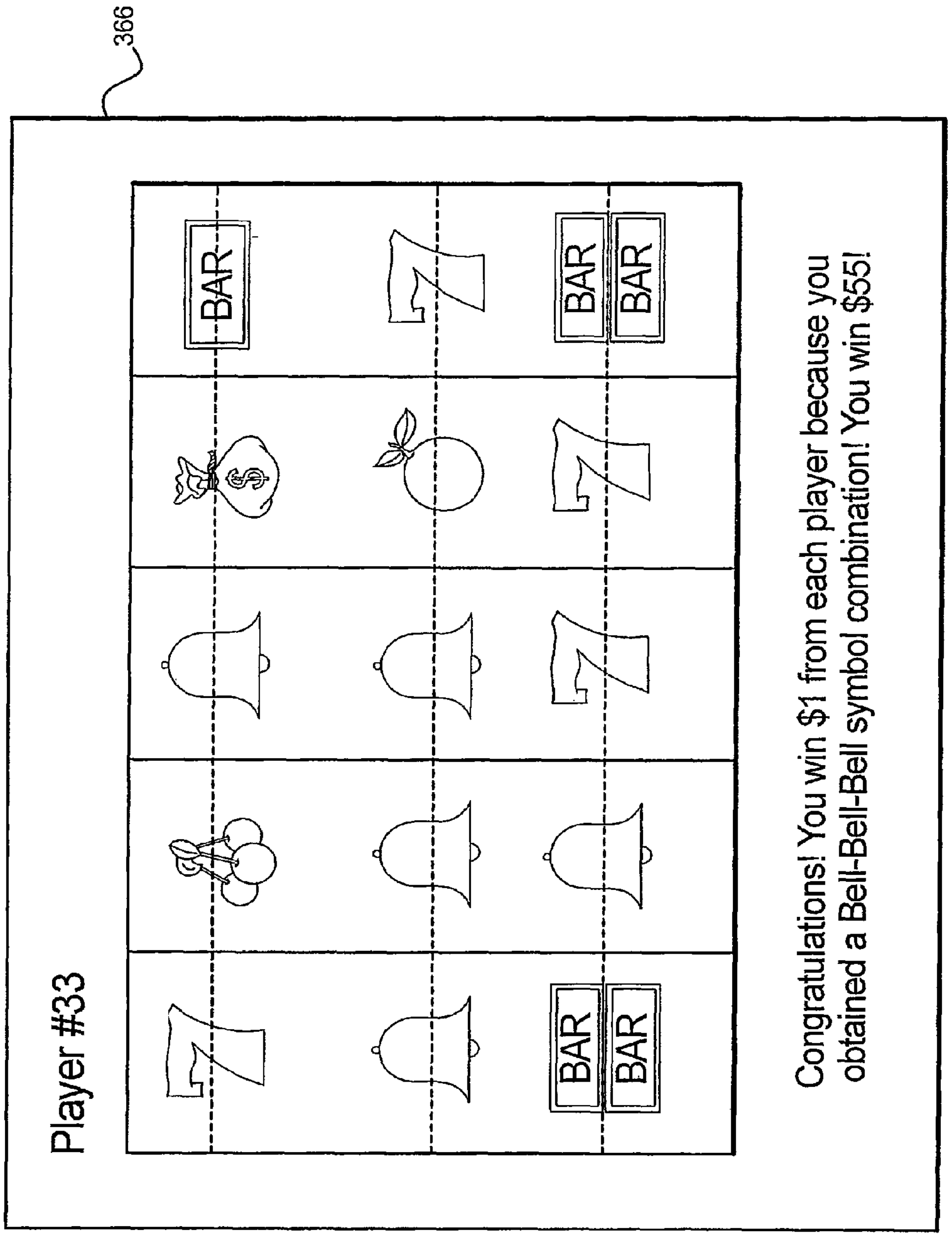
FIGS. 20A and 20B are enlarged views of one embodiment of a display device of a gaming machine displaying to the player the beginning and end of a sub-tournament.

As illustrated in FIG. 20A, in one embodiment, upon the occurrence of one or more designated events, the gaming system provides a player an award funded by the other tournament players. For example, if a player triggers the symbol combination of bell-bell-bell on an active payline, the gaming system automatically subtracts that amount from the accounts or credit meters of each of the other tournament players and provides the total to the triggering player. During a tournament, every time a player achieves a certain symbol combination, the gaming system provides that player an award funded by each of the other players. This could alternatively occur, only one time or a designated number of times. This can also be player specific such that a player can only have this occur in favor of them a designated number of times or against them a designated number of times.

Figure 20B:
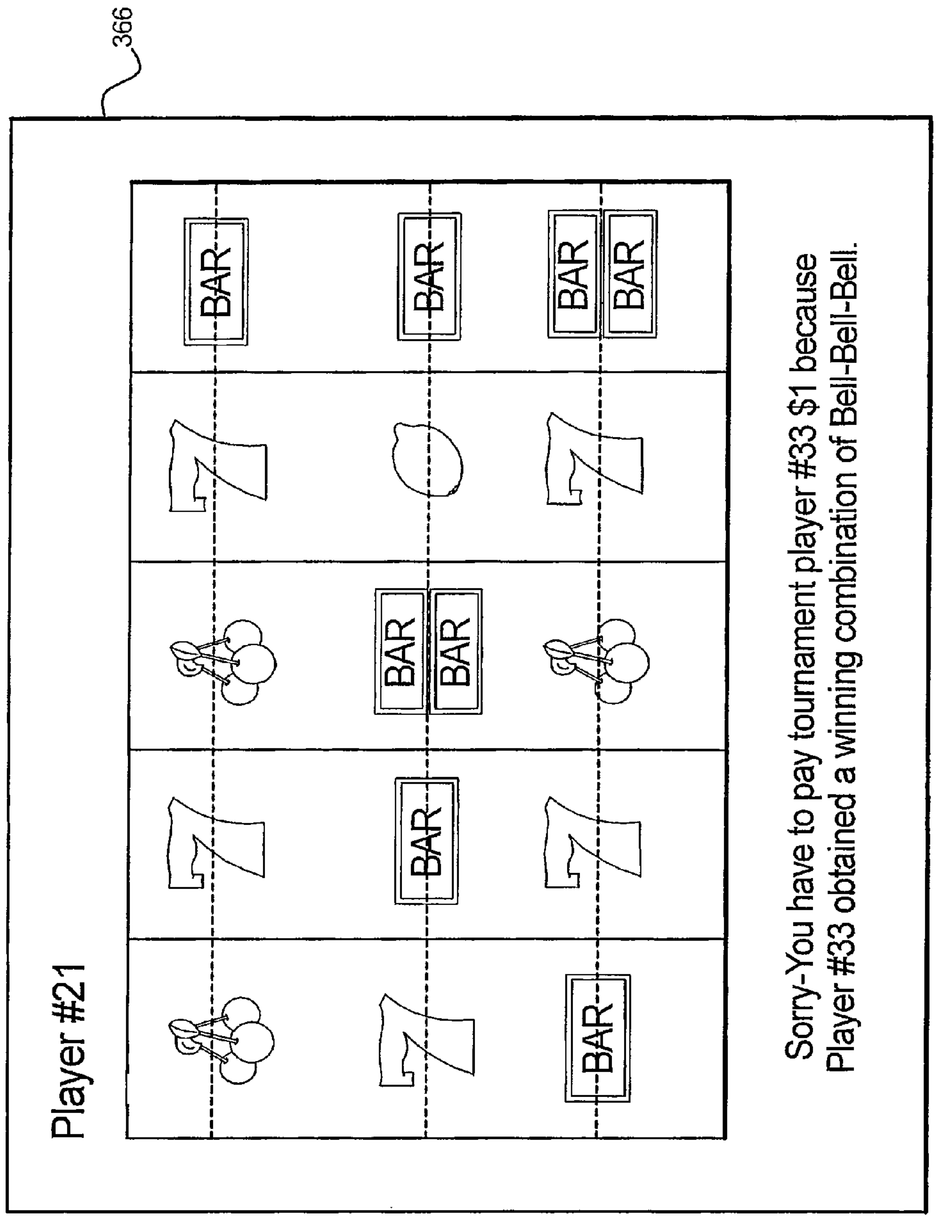

As illustrated in FIG. 20A, a first player, player #33, achieves the designated symbol combination of bell-bell-bell. The gaming system then subtracts $1 from the accounts or meters of each non-triggering tournament player and provides this total to trigging player #33. As illustrated in FIG. 20A, the gaming device provides player #33 a win of $55. As illustrated in FIG. 20B, the gaming system subtracts a $1 from one of the non-triggering players.

It should be appreciated that a player may actively choose to participate in another player's game affecting their game. For example, in one embodiment, the tournament is a poker tournament, where every player makes a wager against their own hand. The winner of the hand would receive a percentage of this wager from every other player.

It should be appreciated that an amount provided to another player funded by tournament players may be funded in any suitable manner. For example, the tournament is a slot tournament where paylines #3, #9 and #12 pay out the value of winning the combination on the payline. Additionally, for paylines #3, #9 and #12, in addition to the paytable win, the player receives a credit from every player in the tournament.

It should be appreciated that one or more player's games may change any suitable aspect of the other players' games or tournament. In another embodiment, when a player achieves a designated outcome during a tournament, the tournament play of one or more non-triggering players stops for a certain time period. For example, when a triggering player achieves a certain number of designated symbol combinations, the gaming system stops tournament game play for a period of 30 seconds on the other non-triggering gaming machines. That is, the other players have less time to play the tournament and are not scoring points or winning credits during this time period. In another embodiment, when a player achieves a designated outcome during a tournament, the tournament play for triggering players increases for a certain amount of time. In another embodiment, when a player achieves a designated outcome during a tournament, the gaming system removes time from non-triggering players and provides such time to the triggering player. For example, when a player achieves a designated event, the gaming system takes a minute from the tournament time of each non-triggering participating player and provides it to the triggering player. For example, if there is one triggering player and 20 non-triggering players, the triggering player's tournament game time is extended by 20 minutes and each of the 20 non-triggering tournament players' tournament time decreases by one minute. It should be appreciated that any suitable aspect of one or more player's game play may affect one or more aspects of other players' tournaments. An occurrence of one or more designated events by a player may change any suitable aspect of one or more player's games, such as but not limited to one or more other player's: (i) credit meter; (ii) number of winning symbol combinations; (iii) points; (iv) length of tournament; (v) number of games in the tournament; and (vi) any combination thereof.

In one embodiment, the gaming system requires players to be playing simultaneously. That is, a triggering player must be playing at the same time as the affected player. In another embodiment, the players may be playing their tournaments at different times. For example, for the tournament, each player is provided a number of games to play. At 11:00 am, a first player receives a tournament game outcome of orange orange orange. In this tournament the tournament game outcome of orange orange orange results in the subtracting of 3 tournament games from the player that received the game outcome orange orange orange. The gaming system provides the three tournament games to the next player with a tournament game outcome of bar bar bar. The next player may be playing simultaneously with the player that received the tournament game outcome of orange orange orange or may play at a different time as that player. In one embodiment, the gaming system ensures that a later player receives a tournament game outcome of bar bar bar and provides that player an extra three games for the tournament.

It should also be appreciated that an occurrence of one or more designated events may not affect all players equally. In one such embodiment, all of the players are not affected negatively equally. For example, if a triggering player achieves a certain symbol combination, only players who are not members of a player tracking system have to fund the triggering player's award. In one such embodiment, all of the players are not affected positively equally. For example, only certain players are eligible to win awards funded by other players. It should be appreciated that the gaming system may determine which players are affected by an event in another player's game or in their own game in any suitable manner.

In an alternative embodiment, the gaming system requires players in a tournament to compete with their own money in the competition. For example, a player is given a tournament time limit of an hour. During that hour, a player may try to win the most points possible using the player's own money. In one embodiment of a live money tournament and a player is required to wager throughout the entire tournament. The wager may be a set wager. In this instance, players are ranked by total winnings at the end of the tournament. Alternatively, if players are enabled to choose their wager, a weighting may be used in ranking in order to ensure equality among participants in their performance.

In one embodiment of a tournament, the gaming system surveys each player's non-tournament game results and stores one or more of the results which combined form a tournament result or score. For example, the gaming system saves the top five scores of each player's games that the player wagers on during a 24 hour period as a tournament score. For example, the gaming system requires players to identify themselves at a gaming machine and enables the players to wager and play non-tournament wagering games. For each game played, the gaming system provides a game outcome and provides any credits associated with each played game outcome. The gaming system stores the top five credit amounts won by that player for the games as a tournament score. In another embodiment, instead of storing the awards, the gaming system converts the awards into points to store for a tournament score. In one embodiment, the gaming system only stores scores for certain games for certain tournaments. For example, the gaming system only stores poker scores for the tournament. In another embodiment, the tournament includes any suitable game in the casino. It should be appreciated that the gaming system may monitor, survey or store any suitable game scores or awards based on any suitable factors for a tournament.

It should be appreciated that a live money tournament may be grouped by any suitable wagering factor or determined in any suitable manner. For example, gaming machines frequently have different wagering denominations such as $1, and $2. For a live money tournament, in one embodiment, the tournament is grouped by the denominations of the gaming machines. For example, all of the $1 gaming machines are grouped together for a first group of awards and the $2 gaming machines are grouped together for a second group of awards. In another embodiment, gaming machines of different denominations are not separated, and the player playing the higher denomination gaming machine therefore has a benefit over a player playing a lower denomination gaming machine. In another embodiment, the tournament includes an equalizer such as a suitable math model or algorithm to even out the point distribution between gaming machines of different denominations. For example, if a first player is playing a $1 gaming machine and a second player is playing a $2 gaming machine, the tournament includes a point multiplier for the player of the $1 gaming machine to even the chances of achieving points in the tournament. In another embodiment, the tournament includes another equalizer or mechanism to create substantially equal competition in a live money tournament which includes different denomination machines. For example, a $1 gaming machine includes fifteen winning symbol combinations and a $2 gaming machine includes only twelve winning symbol combinations. Therefore, while a player at the $2 gaming machine may receive more points for a winning symbol combination than a $1 gaming machine, the player at the $1 gaming machine may have a higher probability of triggering a winning symbol combination.

In another embodiment, the gaming system enables the player to select the tournament game to play from a plurality of tournament games. In one embodiment, each of the tournament games available to the player is equal in statistical analysis to ensure parity in the tournament. For example, if the player is given the choice of Game A and Game B, both games have a 95.7% payout to ensure neither player is advantaged or disadvantaged by their choice. As discussed above, the tournament games use any suitable equalizer such as a suitable math model to ensure equality in a game such as increasing winning symbol combinations, providing multipliers, turbo or bonus mode availability or any other suitable method.

Turning back to FIG. 6, in block 114, the gaming system determines where to get the player list from. The list of players may be stored in the gaming system for an invited guest tournament. In one embodiment, the gaming establishment operator determines the player list and enters the player list into the gaming system. In another embodiment, the list of players is established as each player plays the tournament, such as in an automatic tournament. In another embodiment, the players determine the list of players, such as in a challenge tournament.

As illustrated in FIG. 6, in block 116, the gaming system determines which gaming machines will participate in the tournament. In one embodiment, all of the gaming machines in a gaming establishment are operable to participate in the tournament. In another embodiment, only certain of the gaming machines are operable to participate in the tournament. It should be appreciated that as describe above, any server based gaming machine may be configured to participate in the tournament via one or more commands from the central server.

As illustrated in FIG. 6, in block 118, the gaming system determines how the gaming machines for each player will be chosen. In one embodiment, the gaming establishment operator enters all of the players and the gaming system randomly determines and assigns a tournament eligible gaming machine to that person. That is, the gaming system determines and assigns a gaming machine for each player of the tournament. In another embodiment, the gaming establishment operator enters all of the players and the gaming establishment operator determines and enters a gaming machine for each player. That is, the gaming establishment operator determines and assigns a gaming machine for each player of the tournament. In another embodiment, a participating player may determine or choose that player's gaming machine. For example, in a synchronized tournament, a player may enter a player card into the gaming machine the player wants to play on. In a self-scheduled play tournament, a player may enter a user card into any participating gaming machine and play the tournament during the specified time period. In one embodiment, a set order is used to determine how players are able to choose their tournament gaming machine. The order may be first come, first served. Alternatively, the order may be based on player ranking with higher ranking players given priority in choosing their gaming machines. In one embodiment, it is preferred that the assignment process keeps a "touch and see" feel. A gaming establishment may implement any appropriate gaming machine determining randomization process. Players may choose to witness the assignment of the gaming machines. For example, a name of a registered player may be drawn by a gaming establishment employee and a drawing may be held to determine the gaming machine for that player. For example, ping pong balls with gaming machines numbers are drawn from a cage to match each player to a gaming machine.

Figure 15:
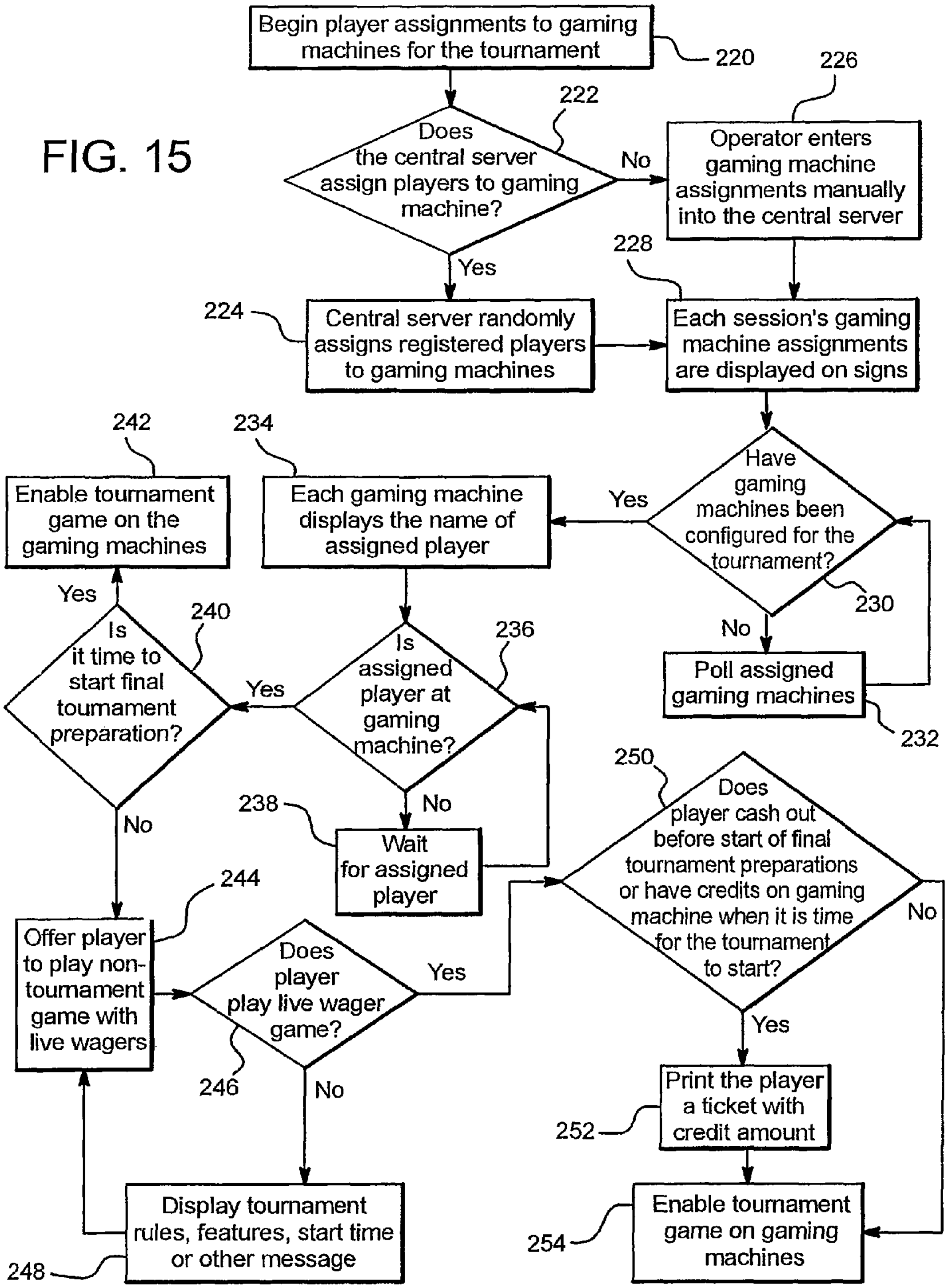
FIG. 15 is a flow chart of one method of one embodiment disclosed herein, illustrating the assignment of gaming machines for a tournament.

FIG. 15 illustrates one embodiment of a method of player assignment to gaming machines with the participation of the gaming system operator. As illustrated in FIG. 15, block 220, the operator begins the player assignments to gaming machines for the tournament. The gaming system enables the system operator to determine whether the central server assigns players to gaming machines for the tournament, as illustrated in diamond 222. If the gaming system is going to assign players to the gaming machines, the central server randomly assigns the registered players to the gaming machines, as illustrated in block 224. If the central server does not assign the gaming machines to players, the gaming system enables the operator to manually enter the gaming machine assignments into the central server as illustrated in block 226. Regardless of whether or not the central server randomly assigns the player's gaming machines, the gaming system displays the gaming machine assignments for each session on signs or display devices to inform players of their assigned gaming machine, as illustrated in block 228.

The gaming system determines if the gaming machines have been configured for the tournament, as illustrated in diamond 230. If the gaming machines have not been configured for the tournament, the gaming system continues to poll the assigned gaming machines, as illustrated in block 232 to see if they have been configured or need to be configured. If the gaming machines have been configured, each gaming machine displays the name of the assigned player, as illustrated in block 234. The gaming system determines if the assigned player is at their assigned gaming machines, as illustrated in diamond 236. In one embodiment, if the players are not at the assigned gaming machines, the gaming system waits for the player, as illustrated in block 238. It should be appreciated that the gaming system may only wait a designated time or until a designated number of players are at their assigned gaming machines before continuing to the next step. If each of the players are at their assigned gaming machines, the gaming system determines if it is time to start the final tournament preparation, as illustrated in diamond 240. If it is time to start the final tournament preparation, the gaming machine enables the tournament games on the gaming machines as illustrated in block 242. If it is not time to start the final tournament preparation, the gaming machine instructs the gaming machines to offer players non-tournament game play with live wagers, as illustrated in block 244. It should be appreciated that in one embodiment, the central server only instructs gaming machines that have the assigned player at the gaming machine to offer non-tournament game play. The gaming system determines if each of the players plays the live wager game, as indicated in diamond 246. If the players do not play the live wager game, the gaming machine displays tournament rules, features, tournament start times and/or any other suitable messages to the player, as illustrated in block 248. The gaming machine continues to offer player the non-tournament games with live wagers as indicated in block 244.

If the player plays non-tournament game play with live wagers, the gaming system determines if the player has cashed out before it is time to start the tournament or of the player has remaining credits on the gaming machine when it is time to start the tournament, as indicated in diamond 250. If the player has not cashed out when it is time for the player to begin the tournament, the gaming machine prints a ticket to the player with a credit amount, as illustrated in block 252.

The gaming machine then enables the tournament game on the gaming machine, as illustrated in block 254.

As illustrated in FIG. 6, block 120, one of the tournament parameters is when to return each gaming machine to non-tournament mode. The gaming machines may change back instantly or upon a signal from the central controller. If there are a number of tournament sessions in a row at a gaming machine, that gaming machine may stay in tournament mode for a certain amount of time or until each session is completed.

The gaming system is operable to communicate all of the tournament parameters to the players in any suitable manner. The gaming system may register players for the tournament, invite players to the tournament in any suitable manner and display the scores and outcomes of the tournament in any suitable manner. The gaming system enables the gaming establishment operator to determine what messages are communicated to the players and the times that messages for the tournament are communicated to the players.

Upon the configuration of the tournament, players are invited to be in the tournament based on the configured qualification criteria. In one embodiment, the gaming system informs the player of a tournament qualification on the internet, such as by posting a list of eligible tournament players or sending the eligible players an email informing them of their invitation to join a tournament. In another embodiment, upon qualification due to a game outcome or bonus game, the gaming machine immediately invites a player to the tournament.

In one embodiment, the gaming system is operable to track player's trends to determine how many players that are invited to the tournament will actually play in the tournament. For example, in one embodiment, the gaming system uses player tracking information, such as the players' sex, home town, wagering information and other suitable information to estimate how many players will show up for a given tournament. The gaming system would use a suitable mathematical model or algorithm, such as regression analysis, to predict how many players will play the tournament. Using such math models, the gaming system can determine who to invite, how many players to invite and market the tournament to the actual, potential players. In one embodiment, the gaming system has an automated process for estimating who will come to the tournament and how to invite the players. It should be appreciated that tournament participation predictions may be completed by the gaming system in any suitable manner.

Figure 8:
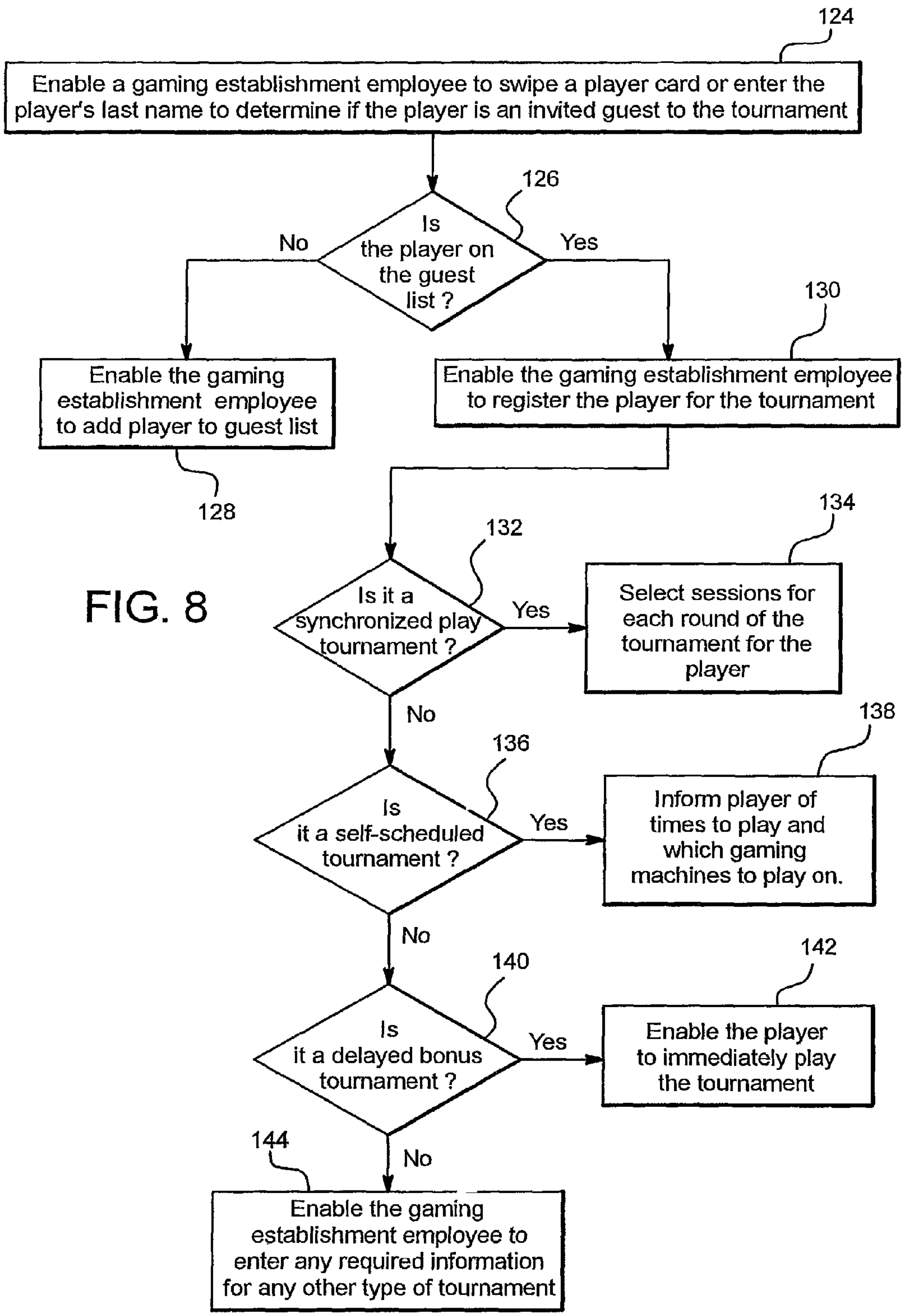
FIG. 8 is a flow chart of the method of one embodiment disclosed herein, illustrating that the gaming system enables a gaming establishment employee to register a player for the tournament.

In one embodiment, the tournament qualification is based on a game outcome or a bonus game. As illustrated in FIG. 8, in one embodiment, the gaming system enables a gaming establishment employee to register the guests of an invited guest tournament.

As illustrated in FIG. 8, the gaming system enables a gaming establishment employee to swipe a player card or enter a player's name to determine if the player is on the guest list for the tournament as illustrated in block 124. The gaming system determines if the player is on the guest list, as illustrated in diamond 126. If the player is not on the guest list, in one embodiment, the gaming system enables the gaming establishment employee to add the player to the guest list, as illustrated in block 128. If the player is on the guest list, the gaming system enables the gaming establishment employee to register the player for the tournament as illustrated in block 130. If the player is on the guest list, the gaming system determines if the tournament is configured as a synchronized tournament, as illustrated in diamond 132. If the tournament is a synchronized tournament, the gaming system enables the employee to select the sessions for each round of the tournament for the player as illustrated in block 134. If the tournament is not a synchronized tournament, the gaming system determines if the tournament is configured as a self-scheduled tournament as illustrated in diamond 136. If the tournament is a self-scheduled tournament, the gaming system informs the gaming establishment employee and/or the player of the dates and times for the tournament, as illustrated in block 138. In one embodiment, if the tournament is a self-scheduled tournament, the gaming system informs the gaming establishment employee and/or player of the gaming machines that are operable to participate in the tournament as illustrated in block 138. If the tournament is not a self-scheduled tournament, the gaming system determines if the tournament is configured as a delayed bonus tournament, as illustrated in diamond 140. In one embodiment, if the tournament is a delayed bonus tournament, the gaming system enables the player to immediately play the tournament, as illustrated in block 142. Alternatively, if the tournament is a delayed bonus tournament, the gaming system enables the player to play the tournament upon an appropriate bonus trigger. If the tournament is not a self-scheduled tournament, a synchronized tournament, or a delayed bonus tournament, the gaming system enables the gaming establishment employee to enter any required information for any other type of tournament as illustrated in block 144.

Figure 9:
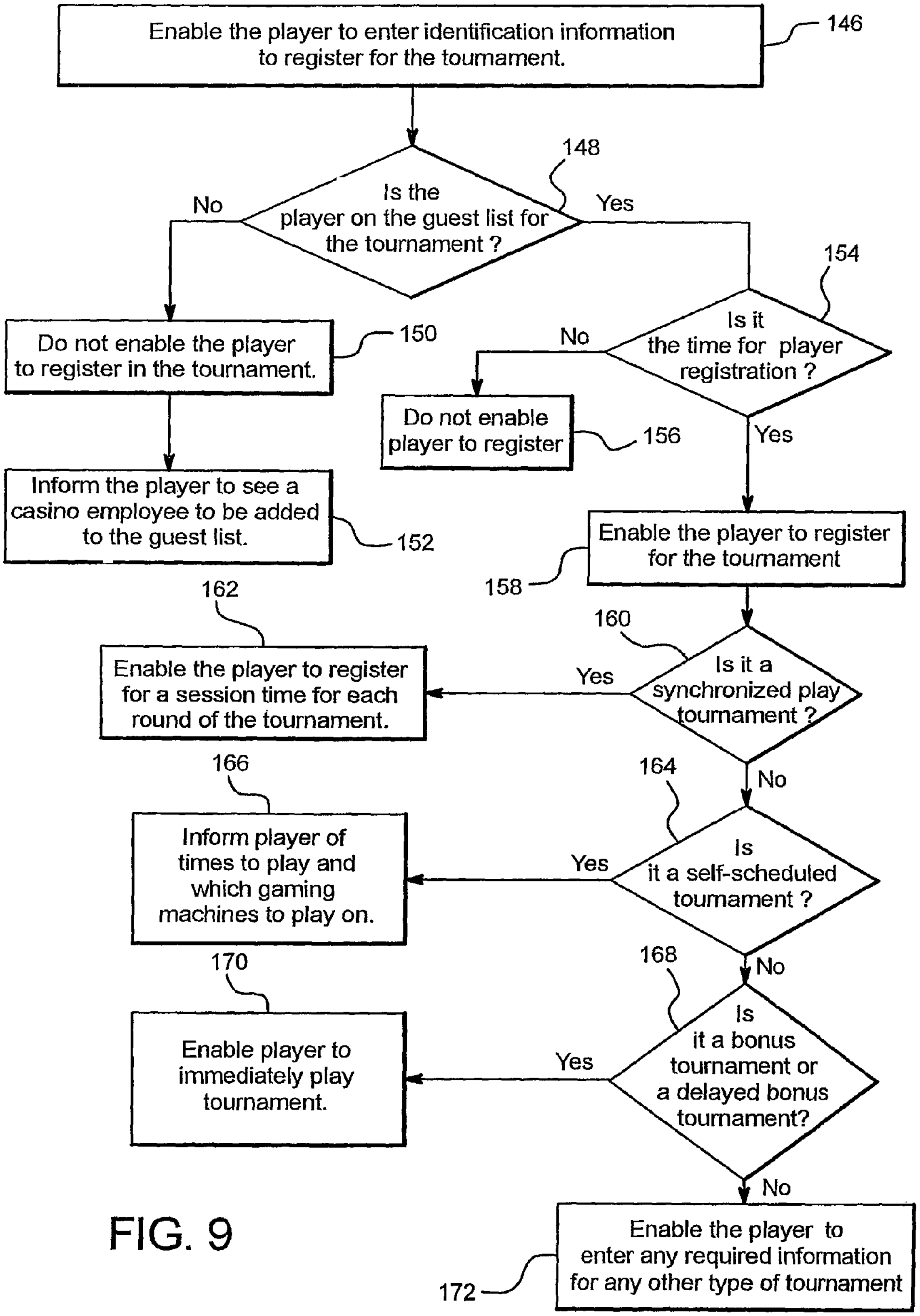
FIG. 9 is a flow chart of the method of one embodiment disclosed herein, illustrating the gaming system enabling player self-registration for the tournament.

In one embodiment, the gaming system enables a player to self-register for a tournament at a kiosk, at a gaming machine or on the internet, without the aid of a gaming establishment worker for a guest list tournament. FIG. 9 illustrates one embodiment of a method of self-registration for a tournament. As illustrated in FIG. 9, the gaming system enables the player to enter a tournament using an input device. The gaming system enables the player to enter identifying information, as illustrated in block 146. In one such embodiment, the gaming system enables the player to swipe a player card to enter the tournament.

The gaming system determines if the player is on the guest list for the tournament, as illustrated in diamond 148. If the player is not on the guest list, in one embodiment, the gaming system does not enable the player to register for the tournament, as illustrated in block 150. In one embodiment, the gaming system informs the player to see an employee to be added to the guest list, as illustrated in block 152. If the player is on the guest list, the gaming system determines if it is the time period configured for player registration, as illustrated in block 154. In one embodiment, one of the configuration requirements for the tournament is setting a time period (e.g., dates and times) for the player to accept an invitation by registering for the tournament. If it is not the time period configured for player registration, the gaming system does not enable the player to register for the tournament, as illustrated in block 156. It should be appreciated that the gaming system may provide the player with any other appropriate messaging. In one embodiment, if the player is registering at the wrong time, the gaming system informs the player of the correct time for registration. The gaming system may provide any messaging to a player such as how to enter the tournament, how to register the tournament, information about future tournaments, the tournament location and times and any other suitable information.

If it is the time period for configuration, the gaming system enables the player to register for the tournament, as illustrated in block 158.

In one embodiment, the gaming system determines the configured type of play of the tournament. As illustrated in diamond 160, the gaming system determines if the tournament is a synchronized tournament. If the tournament is a synchronized tournament, the gaming system enables the player to register for a session time for each round of the tournament, as illustrated in block 162. The gaming system determines if the tournament is a self-scheduled tournament as illustrated by diamond 164. If the tournament is a self-scheduled tournament, the gaming system informs the player of the times the player may play and which gaming machines the player may play on, as illustrated in block 166. If the tournament is not a self-scheduled tournament, the gaming system determines if the tournament is configured as a bonus tournament, as illustrated in diamond 168. In one embodiment, if the tournament is a bonus tournament, the gaming system enables the player to immediately play the bonus tournament upon registration as illustrated in block 170. Therefore, the player may immediately register for the tournament upon the bonus tournament win at a gaming device and then immediately play the tournament. Additionally, if the player decides to delay the play of the bonus tournament and play the tournament a different date, upon registration for the tournament at a gaming machine on the subsequent date, the player immediately plays the bonus tournament on that gaming machine. That is, in one embodiment upon registration, a player may automatically use the bonus entry to play the tournament. In another embodiment, the gaming system enables the player to register for a delayed bonus tournament and pick at time to play the bonus tournament. If the tournament is not a self-scheduled tournament, a synchronized tournament, or a bonus tournament, the gaming system enables the gaming establishment employee to enter any required information for any other type of tournament as illustrated in block 172.

Figure 10:
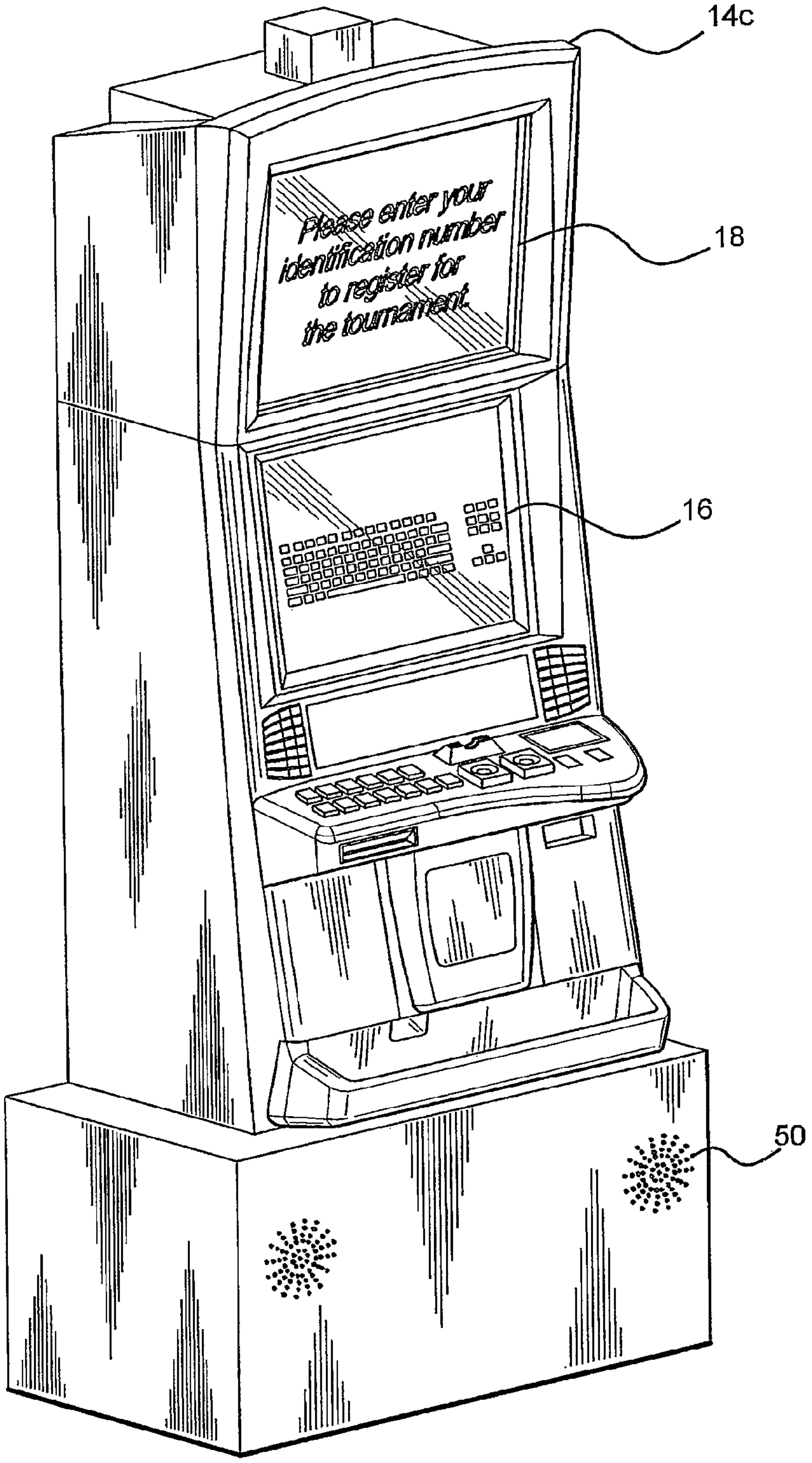
FIG. 10 is front perspective view of an alternative embodiment of a gaming machine of the gaming system disclosed herein enabling player self-registration for the tournament.

FIG. 10 illustrates one embodiment of self-registration. An apparatus such as a gaming machine 10*c* enables the player to self-register by entering pertinent information into a gaming machine. In the illustrated embodiment, the gaming machine enables the player to enter information via display device 16 including a touch screen keyboard. The gaming system enables the player to enter any information for registration for the tournament, such as a player name, player nickname, an identification number, a player tracking number or any other information. In one embodiment, the gaming system also enables the player to submit other information at the gaming machine during player registration. For example, the player may select which future tournaments to receive information on, how they want information displayed to them during the tournament, or any other suitable information. In another embodiment, the gaming system enables the player to select how to receive reminders for the tournaments. For example, a player may select to be emailed a reminder or immediately print a reminder.

In another embodiment, the player registers for the tournament using biometric registration, such as by a finger print or hand print. In another embodiment, the tournament is an anonymous tournament where registration is based on some factor that is not matched to a player. For example, a non-logged in player at a gaming machine wins a tournament entry and the gaming machine provides the player an identification number to register for the tournament. The player can therefore register for the tournament without revealing his or her identify.

It should be appreciated that the gaming system is operable to cause a tournament triggering gaming machine to print a ticket with any pertinent information on it upon registration. For example, if the player is assigned an identification number for the tournament, the gaming system may print a ticket including the information. In one embodiment, if the player registers for the tournament on a gaming machine or at a kiosk, the gaming machine or kiosk prints a reminder such as the date and time of the tournament. It should be the player may register for the tournament and be reminded of the tournament in any suitable manner.

It should be appreciated that during registration, a player or a gaming establishment employee may enter any information necessary or required by the tournament. The gaming system may be operable to receive a nickname or name for the player to display on a scoreboard for the tournament or any player card information for the tournament. In one embodiment, the gaming system is operable to upload and display a scanned image or an icon for the tournament. In one embodiment, the player enters a nickname and an icon which represent the player on one or more of the display devices during the tournament. In one such embodiment, a gaming establishment worker and/or the gaming system may scan and/or sensor nicknames and icons that will be displayed to the general public. Additionally, if the tournament is conducted over the internet or other data network, the gaming system may include a program to ensure that information displayed during the tournament conforms to current industry censorship standards.

It should be appreciated that the gaming system may be used to reschedule, cancel and add players to the tournament in any suitable manner. For example, if a player is late to a tournament the player may register for another session or another tournament through any appropriate method. Additionally, if a player wants to join a tournament when the player is not registered, the gaming system may enable the player to quickly join the tournament through self-registration or registration through a gaming establishment employee. The gaming system enables a player who has not yet started playing the tournament, to change session times or to cancel participation in the tournament.

In one embodiment, a number of gaming machines in synchronized tournaments are reserved for each tournament. When the session for the synchronized tournament is full, the gaming system enables the player to use a reserved seat. In one embodiment, this option to use a reserved seat is limited to certain players, such as players at a certain rank or level.

Figure 11:
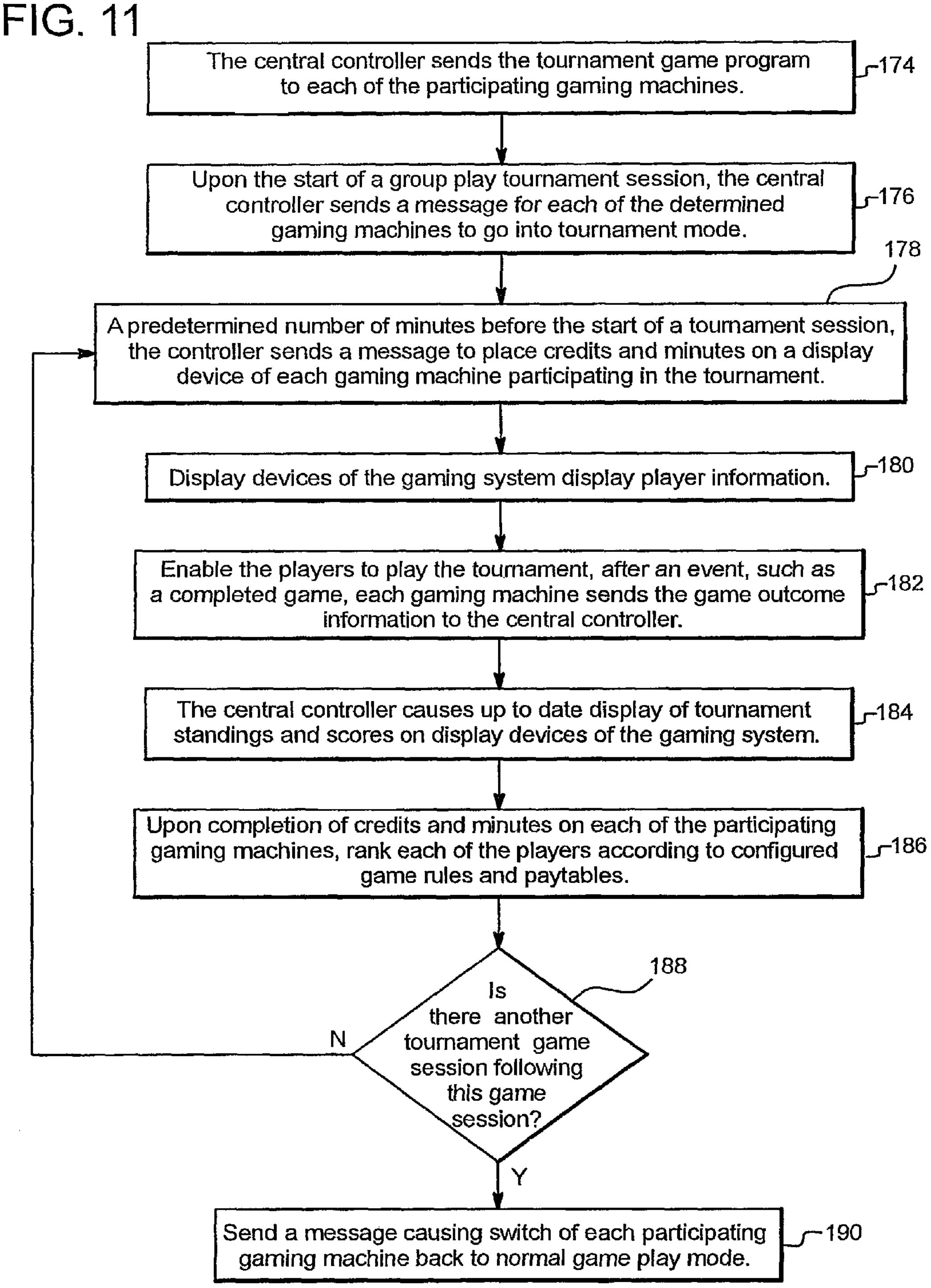
FIG. 11 is a flow chart illustrating one method of synchronized tournament game play.

FIG. 11 illustrates one embodiment of a method of synchronized tournament mode of the present disclosure. As illustrated in block 174, the central controller sends the tournament game program to each of the participating gaming machines. It should be appreciated that the central controller may send the gaming machine the game program at any point prior to the start of the tournament. It should also be appreciated that the gaming machine may store the tournament game and the central controller may send a command to execute the game program. As illustrated in block 176, a certain time period prior to the start of the tournament session, the central controller sends a message to place the available tournament credits and/or tournament minutes on the display device of each gaming machine participating in the tournament. The gaming system displays player information on one or more display devices as illustrated in block 178. The player information may include but is not limited to the participating player's name and player rank. The gaming system begins the tournament and enables the players to play the tournament, as illustrated in block 180. The gaming system provides each of the players the selected tournament game and the same paytable. Upon a certain event, each gaming machine sends the player's information and scores to the central server. The event may be any suitable event such as an amount of time, such as every second or every minute, the ending of each game on that gaming machine, or any other triggering event.

The central server causes the display of the player information on one or more display devices in the gaming establishment and/or on one or more display devices of the participating gaming machines, as illustrated in block 182. This method enables the central server to provide scoring information for the tournament while the tournament is occurring. The central controller continues to cause the display of up to date tournament information on the display devices of the gaming system 184. For example, the messaging system and sign manager may provide the tournament standings, broadcast live tournament camera coverage, advertisements, information about future tournaments, or any other suitable information across the entire gaming establishment on individual gaming device display devices and/or on separate displays. Additionally, the messaging may be broadcast over the internet or any other suitable medium.

Upon completion of the tournament, the central controller determines a rank for each of the players according to the configured game rules and paytable, as illustrated in block 186. The central controller determines if there is another tournament game session following the played tournament session, as illustrated in block 188. If there is another tournament session scheduled immediately following the previous tournament session, the gaming system begins the process over again. If there is not another synchronized tournament session, the gaming system sends a message to each of the participating gaming machines causing the gaming machines to switch back into non-tournament play mode, as illustrated in block 190. The gaming machines then are operable to accept wagers and resume non-tournament game play. The gaming system is operable to track the player's tournament play during the sessions to determine the winners.

In one embodiment, the gaming system pays out prizes to the player directly at the gaming machine. Instead of having to leave the gaming machine to redeem a prize, the player can automatically switch back to non-tournament game play. The gaming device and gaming system may credit the player's account for the win or provide the player a ticket to redeem the prize.

It should be appreciated that any suitable messages may be provided to the players before, during and after the tournament. For example, if the player tries to register but is not qualified, the gaming establishment employee, kiosk or gaming machine may inform the player as to why that player is not qualified. In various tournaments, the gaming system includes a plurality of central display devices or signs that are operable to display the requirements and qualifications for tournament entry, the times of the tournament, and marketing, promotional and advertising information. In another embodiment, if the player has a pending tournament, upon identification at the gaming machine, the gaming machine reminds the player of the upcoming tournament.

In various tournaments, the central controller broadcasts performance messaging to one or more devices in the gaming system. In one embodiment, the central controller is incorporated with a sign manager which integrates with the central controller to display any suitable information.

By utilizing of the central server to communicate with each sign controller, the gaming system presents a wealth of information to the player about not only tournaments the player is participating in, but also other tournaments or jackpot awards that may be available to the player. Furthermore, the central server and sign controller configuration enables for the signs to be custom tailored to the player who is playing each gaming machine to provide the player with information that will be most beneficial to their gaming session. The messaging system facilitates complete customization of the tournament at the gaming establishment level and tournament level. Additionally, the display of the tournament may be customized to the player level, displaying the persons name and/or icon on that player's gaming device.

The sign controller is central to the sign integration used with the tournament system. This sign integration provides players with important information regarding the tournaments. A sign module in the central server communicates with the sign controllers of selected display devices/signs (determined by any number of factors) on the gaming floor. For example, if a tournament is available only from gaming machines in a specific section of a gaming establishment, only signs and display devices in that specific section provide and display tournament information.

The signs/display devices may broadcast information such as player scores or standings. The signs/display devices can provide real time tracking to the player as to the status of the tournament. The signs/display devices help a player determine their standing in the tournament, what the player needs to try to achieve to win, as well as specific tournament information, such as when the tournament is over and what is required to participate in the tournament. Frequently, to broadcast tournament information, gaming establishments employ constant audio announcements through out the gaming establishment regarding the tournament information. The ability to provide this information over a sign controller provides stream lined and non-invasive tournament messaging.

The gaming system of the present disclosure is operable to store the information from each tournament session. That is, in one embodiment, each tournament session is stored as a long term storable item. The gaming system may store information for each player including the player identification, the player card encoding, the player name, the date and time of the beginning and the end of the tournament sessions and rounds, the number of credits played, the number of games won, and the number of credits or points won.

For various tournaments, the gaming system permanently stores and records information regarding the winners of the tournament including, but not limited to, the player identification, the player name, the player encoding, the tournament name and identifier, the tournament place and the prize awarded to that winner.

Figure 12:
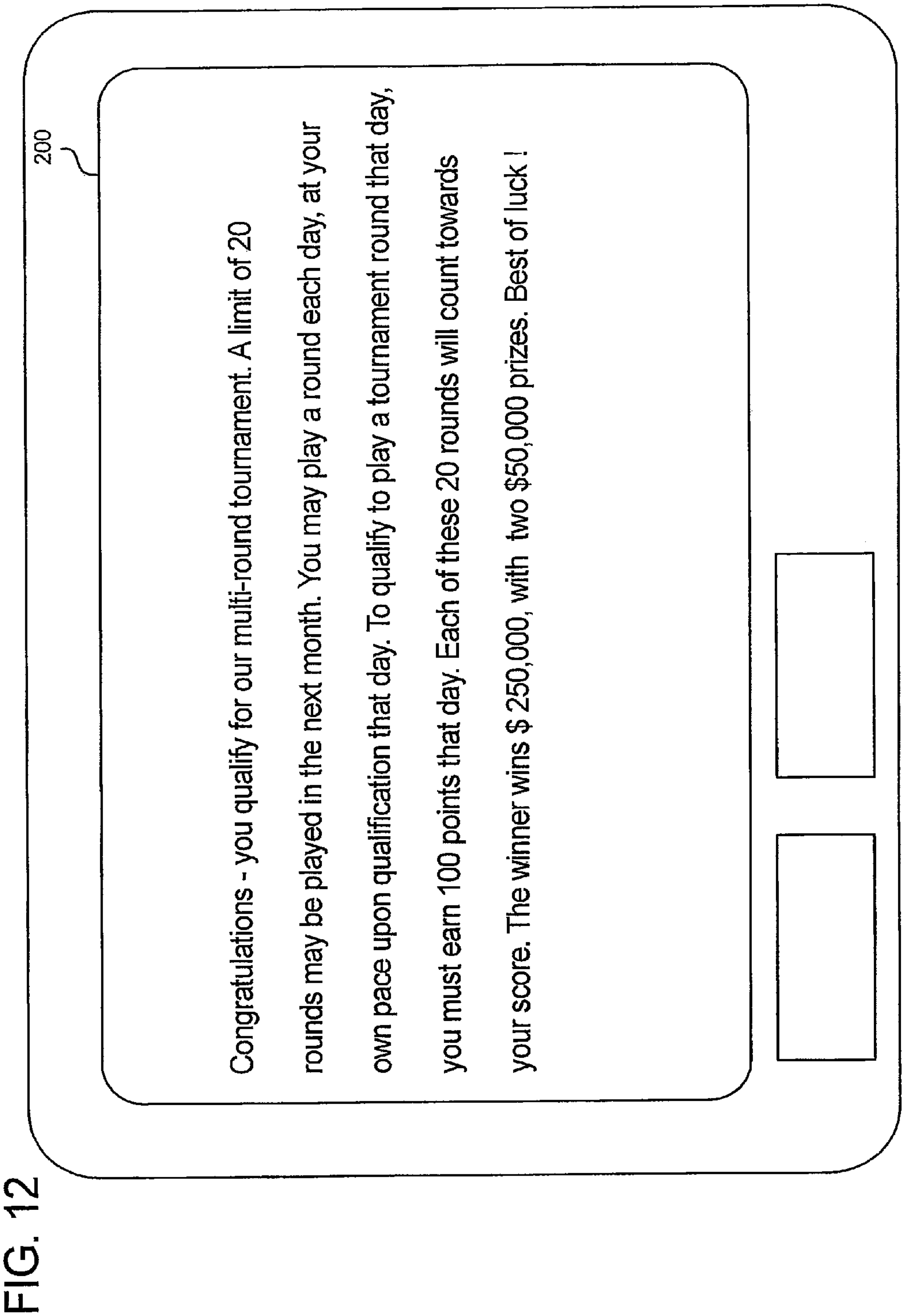
FIG. 12 is an enlarged view of one embodiment of a display device of a gaming machine upon a player's invitation to play one of the embodiments of a multi-round synchronized tournament.

In one type of tournament, the tournament is a self-scheduled multi-round tournament where the score for each round of the tournament counts towards a final score. FIG. 12 illustrates a screen shot of a player receiving an entry into this cumulative multi-round tournament. The tournament may include any number of rounds and the tournament may be configured using any suitable specifications. In the illustrated embodiment, the tournament is for the duration of a month. During that month, the player may play any number of rounds. In the illustrated embodiment, the player may play a limit of 20 rounds. The player may play only one round a day or any other criteria assigned by the operator. To qualify to play a tournament round that day, the player must earn 100 points that day. Any suitable gaming machine in communication with the central controller (i.e. server based gaming machine) is operable to enable the player to play the tournament. For example, in one embodiment, each of these 20 sessions will count towards the player's final tournament score. Alternatively, only a set number of the player's best sessions will count towards their final tournament score. In the illustrated embodiment, the winner wins $250,000 and the players in second and third each win an award of $50,000.

Figure 13:
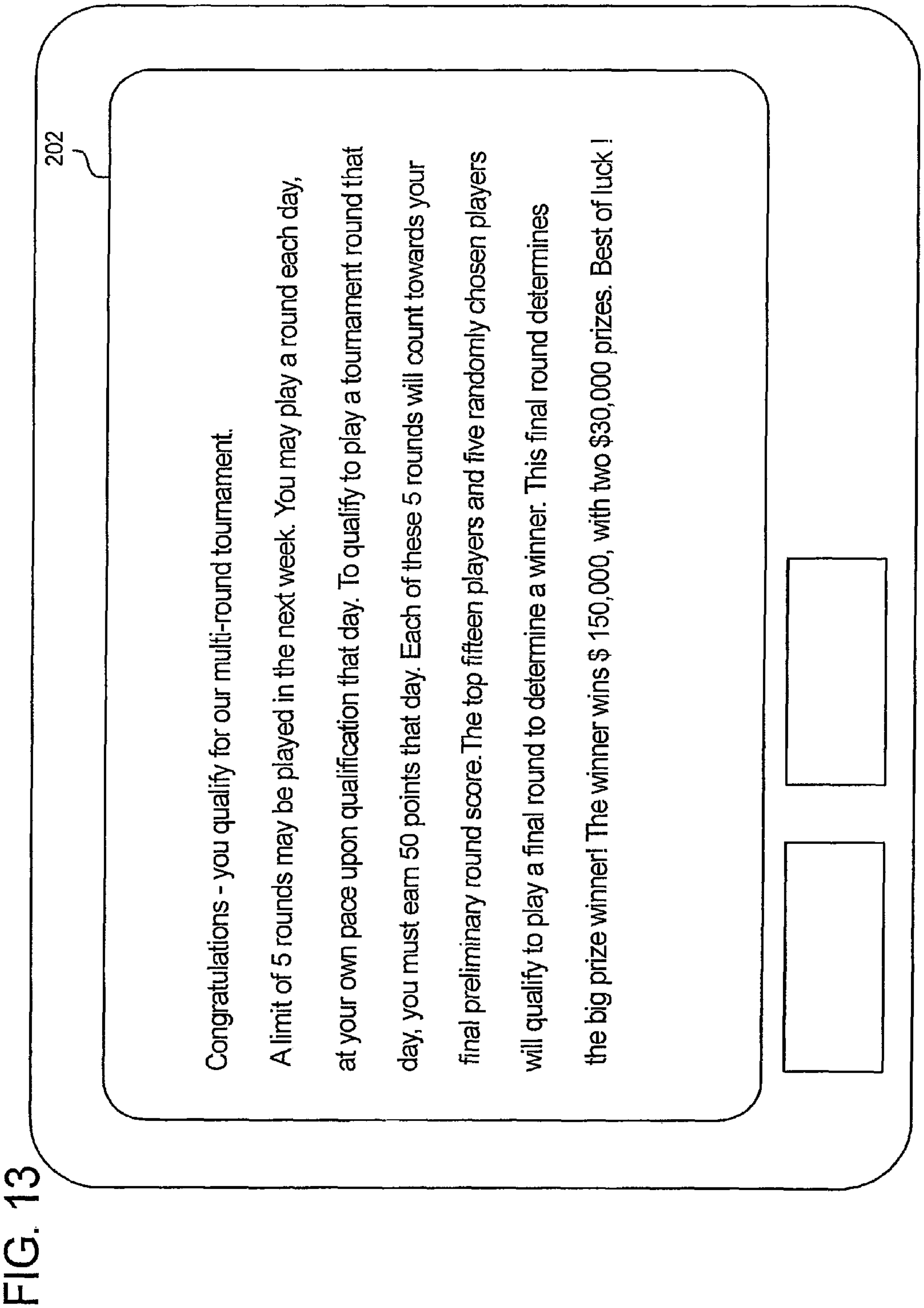
FIG. 13 is an enlarged view of one embodiment of a display device of a gaming machine upon a player's invitation to play one of the embodiments of a multi-round synchronized tournament.

In another self-scheduled multi-round tournament, as illustrated in FIG. 13, the tournament rounds include a plurality of preliminary tournament rounds and a final round. These preliminary tournament rounds qualify the player to play a final round to determine the tournament winner(s). In the illustrated embodiment, additional players are selected at random to participate for the final round of the multi-round tournament. This self-scheduled multi-round tournament lasts for a certain duration, such a week. The player has a limited number of rounds that the player may play in the time period, such as five. The player plays the tournament at the player's leisure upon qualification that day. To qualify to play a tournament round that day, a gaming establishment may set and determine any suitable required tournament entry fee, such as paying money for an entry fee or paying with player points. In the illustrated embodiment, the player must earn 50 points that day. Any server based gaming machine is operable to enable the player to play in the tournament round. Each of these 5 rounds will count towards a final preliminary round score. The top fifteen players and five randomly chosen players will qualify to play a final round to determine a winner based on the final preliminary round scores. This final round determines the big prize winner. The winner wins $150,000, with two $30,000 prizes provided to the round winners.

It should be appreciated that this final round may be any suitable type of tournament. In another embodiment, the final round is in the synchronized tournament format. That is, the final round is a synchronized tournament where all players play at a certain time and a certain location and enables spectators to watch the final tournament.

It should be appreciated that in these multi-round embodiments, each score of each round does not always count towards the player's final tournament score or round score. For example, in one embodiment, only the top score of the all of the player's rounds count towards the final score. In another embodiment, only the top three scores count towards a final preliminary round score to compete in a final tournament session. It is possible for a player to play as few as three different rounds and still be able to submit a final score (or preliminary round score). However, a player increases their chance of getting a better score by playing more rounds and submitting up to the limit of twenty scores (of which their top three will be entered).

An example of one embodiment of this type of tournament is as follows. A player is informed that a tournament will run from May $1^{st}$ to May $31^{st}$ and a final score will comprise the top three tournament entries from a limit of up to twenty tournament entries. A player is allowed to play once a day during the tournament run. Upon being qualified, a player may make an entry into the tournament up to twenty times. The following chart illustrates an example of the play of three players, with each player's top three best scores indicated in bold.

| | SCORES | | |
|---|---|---|---|
| DATE | PLAYER A | PLAYER B | PLAYER C |
| May 1st | 20 | | |
| May 2nd | | | 54 |
| May 3rd | 65 | | |
| May 4th | | 90 | 67 |
| May 5th | 59 | | |
| May 6th | | | 58 |
| May 7th | 41 | | |
| May 8th | | 45 | 95 |
| May 9th | 28 | | |
| May 10th | | | 110 |
| May 11th | 36 | 156 | |
| May 12th | 58 | | |
| May 13th | 68 | | 50 |
| May 14th | | 25 | |
| May 15th | | | 45 |
| May 16th | 11 | | |
| May 17th | 12 | 87 | 13 |
| May 18th | 98 | | |
| May 19th | | | |
| May 20th | 5 | | 12 |
| May 21st | 125 | | |
| May 22nd | | | |
| May 23rd | 60 | | 29 |
| May 24th | 54 | | |
| May 25th | 28 | | |
| May 26th | | | |
| May 27th | 45 | | |
| May 28th | | | |
| May 29th | 67 | | |
| May 30th | 18 | | |
| May 31st | 15 | | 79 |
| SCORE | 291 | 333 | 284 |

As can be seen, even though Player A made the twenty maximum number of entries into the tournament, Player A's score was lower by Player B's score who only made five tournament entries. Thus, Player B wins the tournament.

It should be appreciated that the above tournament may include multiple rounds. Additionally, the above tournament may include a top number of qualifying players advancing to a final tournament round.

In another embodiment, the gaming system is operable to conduct a synchronized instant tournament one, a plurality or every day of the week. The instant tournament creates spontaneous excitement. In one embodiment, any carded player or logged on player can qualify to be a contestant by meeting specific tournament criteria and will instantly be entered into a tournament. Alternatively, any player can qualify by meeting specific tournament criteria. As illustrated in FIGS. 14A, 14B, 14C, and 14D the instant tournament may provide a player a chance to play in a tournament on that day upon qualification.

As illustrated in FIGS. 14A, 14B, 14C, and 14D, in one embodiment, the gaming machines 208*a*, 208*b*, and 208*c* are in banks or groups 204 which include one or more large, group display devices 206. In one embodiment, each gaming machine 208*a*, 208*b*, and 208*c* includes a primary display 210*a*, 210*b*, and 210*c* to display the tournament game, in tournament mode and any suitable primary or secondary game in non-tournament game play mode. The gaming machines each include at least one secondary display device 212*a*, 212*b*, and 212*c* to display the tournament information and rankings in tournament mode and any suitable primary or secondary game in non-tournament game play mode. The primary and secondary display devices may display any suitable information.

Figure 14A:
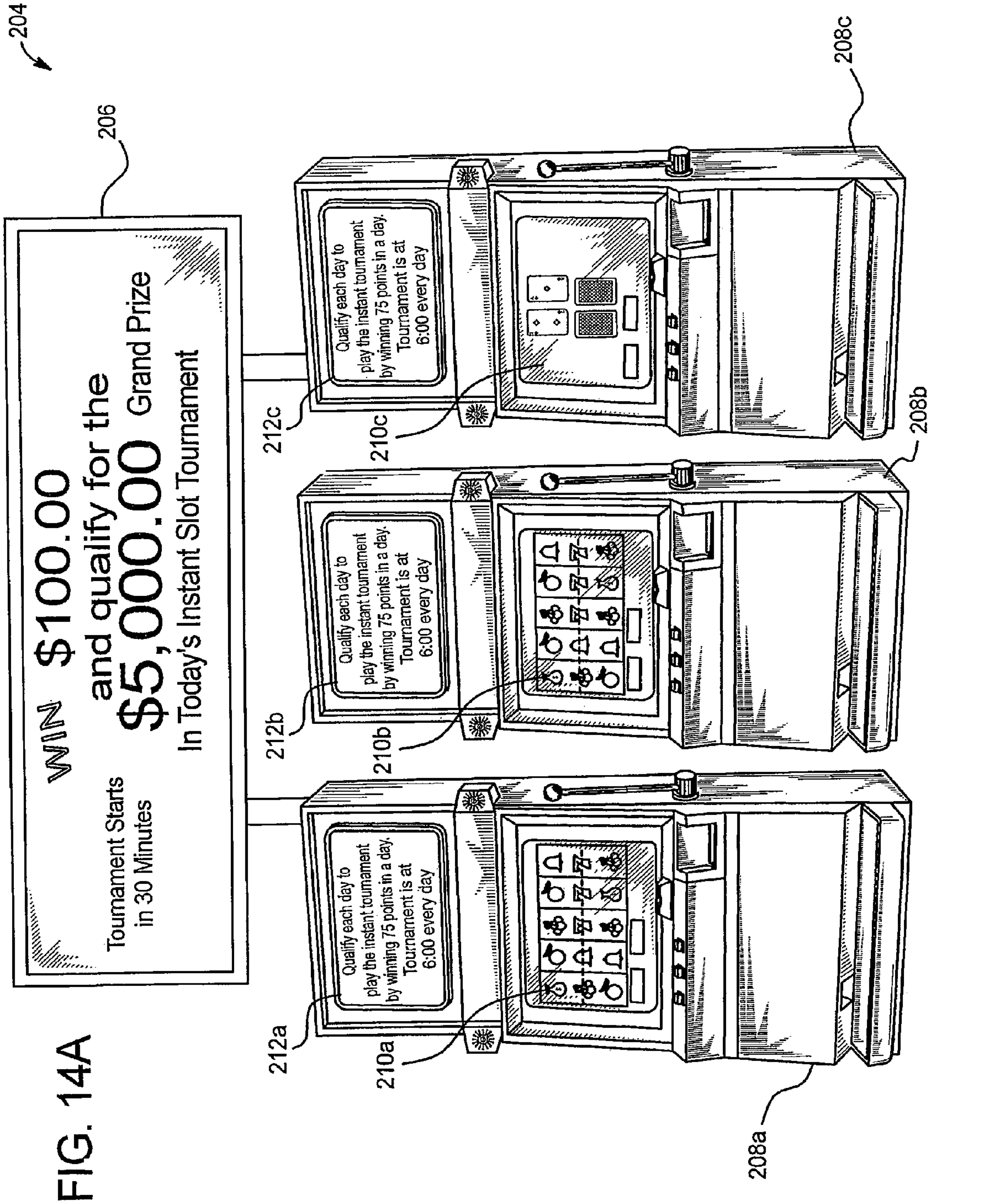
FIGS. 14A, 14B, 14C and 14D are perspective views of one embodiment of an instant synchronized tournament.

As illustrated in FIG. 14A, in one embodiment, the qualifier is winning or earning 75 points on the day of the tournament. Each day the tournament is at 6:00. Upon qualification, the player may register for the tournament and play the tournament at 6:00 that day.

Figure 14B:
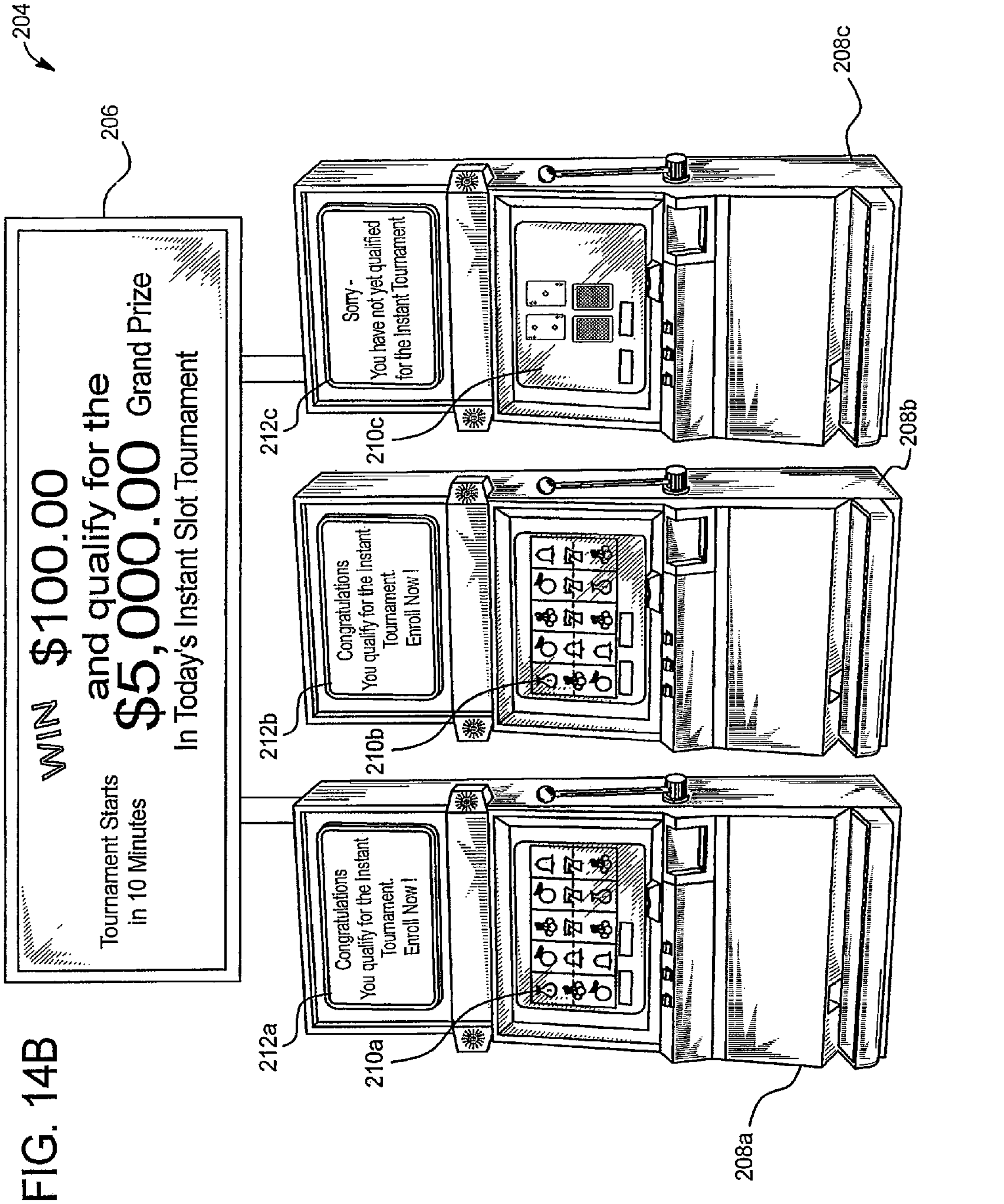

As illustrated in FIG. 14B, players at the first two gaming machines 208*a*, and 208*b* qualify to play the tournament. In this illustrated embodiment, the gaming system enables the qualifying players to self-enroll or self-register for the tournament, as illustrated on the upper display devices 212*a* and 212*b* of the first two gaming machines 2008*a* and 208*b*, respectively.

As illustrated in FIG. 14B, the player at the third gaming machine is not qualified to play the instant tournament.

Figure 14C:
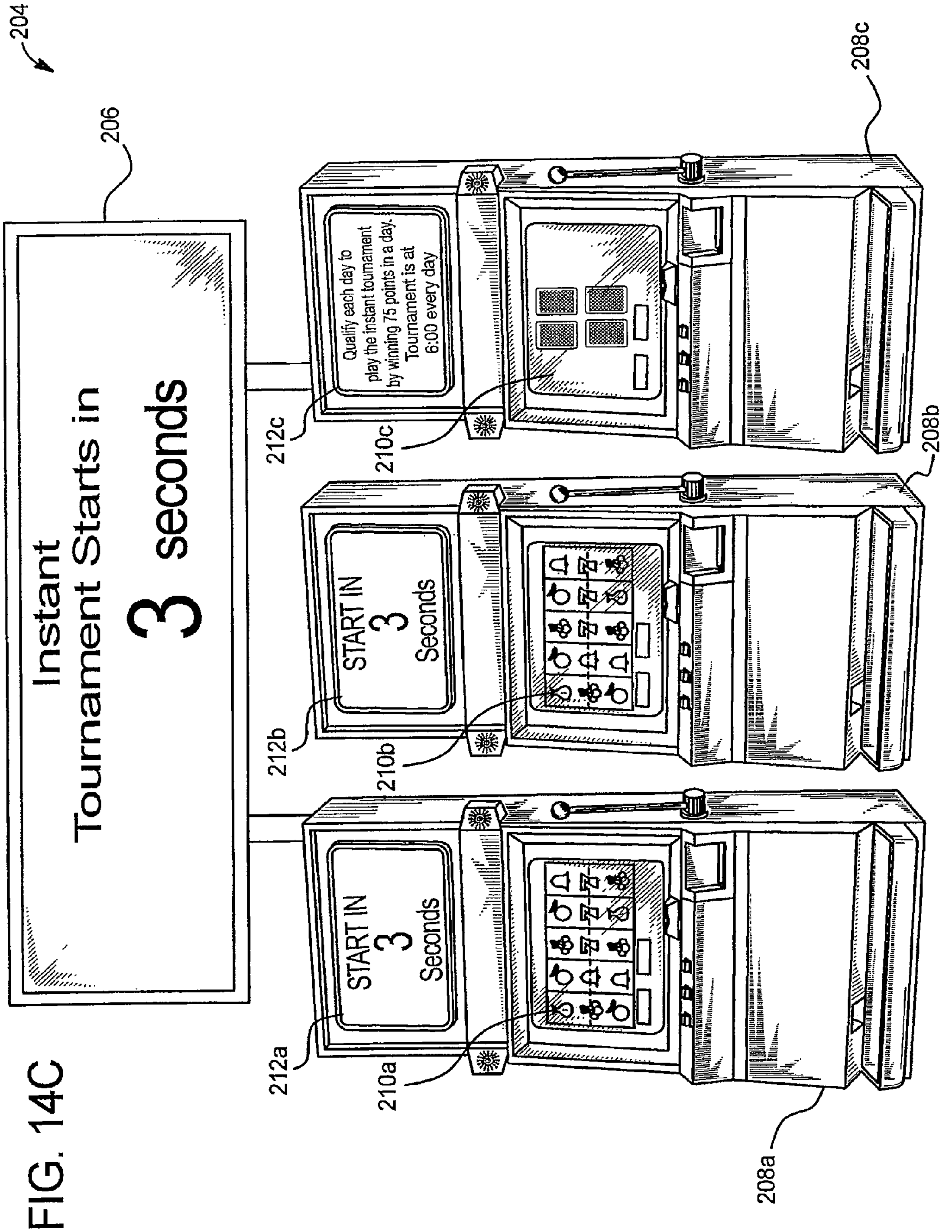

As illustrated in FIG. 14C, the gaming system enables the players who qualify for the tournament to play the tournament at their respective gaming machines. That is, each of the server based gaming machines has the tournament game program and parameters loaded on the gaming machine. The gaming machine then executes that tournament game program upon a tournament qualified player playing at that gaming station at the tournament start time. The first two gaming machines 208*a* and 208*b* provide the player a countdown to the play of the tournament and are in tournament mode. The third gaming machine 208*c* remains in non-tournament play mode and enables players to keep playing games on the gaming machine while the tournament is in progress.

Figure 14D:
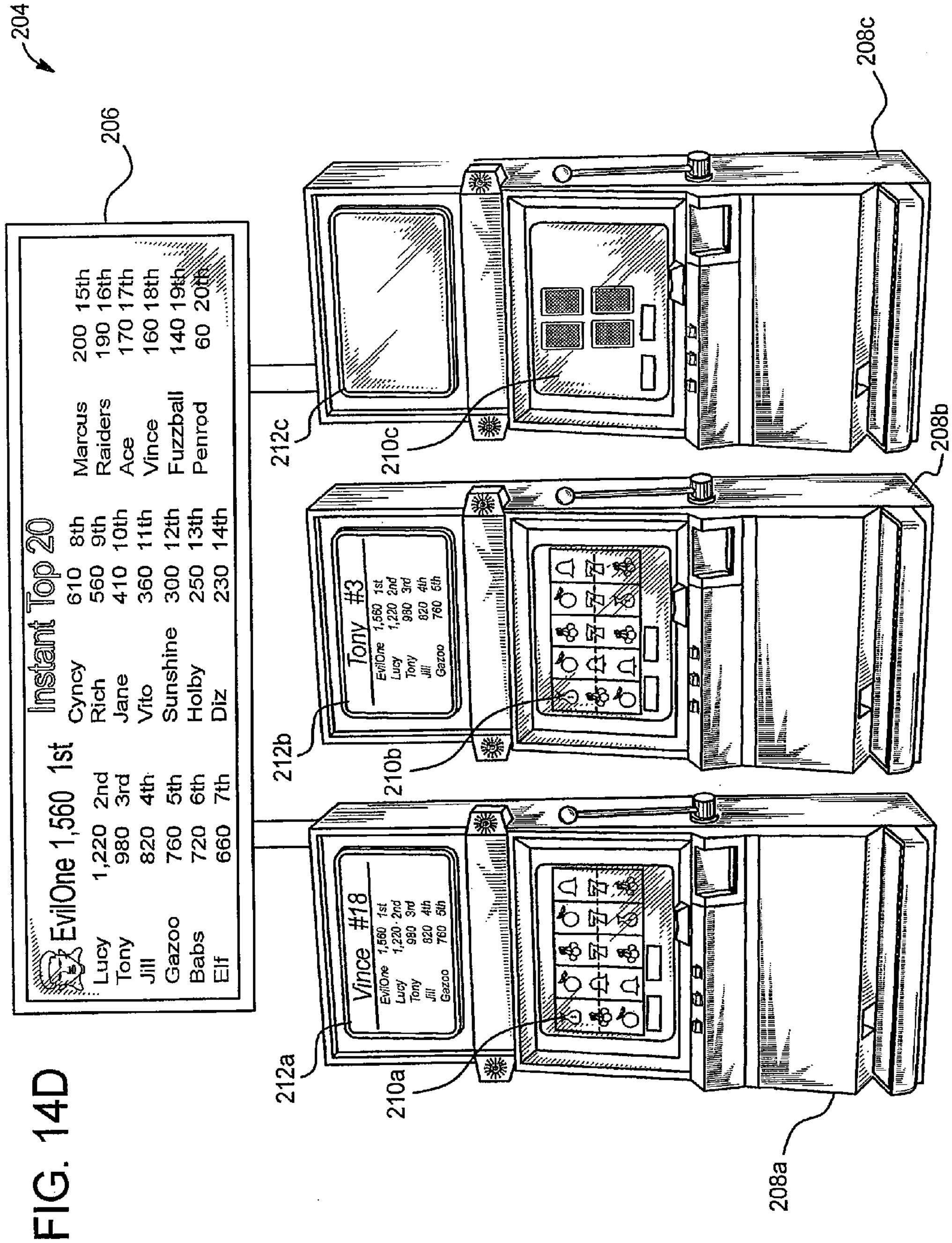

As illustrated in FIG. 14D, upon completion of the tournament, the gaming system displays tournament information and rankings to the player. In this illustrated embodiment, the gaming machines participating in the tournament, 208*a* and 208*b* each display the name or nickname of the player and a ranking of the top players. As illustrated in FIG. 14D, the central display 206 displays the ranking of the top 20 players for that tournament. It should be appreciated that any of the display devices may display any suitable tournament information. The gaming machine then switches the gaming machines back into non-tournament mode and enables the players to keep playing on the same gaming machine.

It should be appreciated that instant tournaments may be offered in any suitable number at any suitable time of the day. For example, a gaming establishment may offer an instant synchronized tournament every two hours, increasing the likelihood that a player will continue playing on that gaming machine until the next tournament. In another embodiment, a gaming establishment offers instant tournaments based on a predetermined triggering event or a random determination. That is, the gaming system notifies any currently eligible players by displaying information or making an audio announcement that a tournament will begin in a certain number of minutes. At that time, the gaming system initiates the instant synchronized tournament.

In another embodiment, the initiation of the instant tournament is based on when an amount of a tournament jackpot. For example, the tournament jackpot is a progressive jackpot where a portion of each wager funds the tournament jackpot which is displayed to the players. When the jackpot reaches a certain amount, such as $1000, an instant tournament begins. The display of the jackpot amount creates anticipation for players waiting to play the tournament.

In one embodiment, the initiation of the instant tournament is based on the current number of eligible players. For example, when fifty players join the tournament, the tournament begins. In one such embodiment, the instant tournament is funded through a progressive jackpot system. In one such embodiment, the gaming system initiates the tournament only when the number of players reaches a designated number and when the tournament jackpot reaches a designated amount. In another embodiment, the player may have to pay an entry fee to enter the tournament. The timing of an instant tournament may also be based on the gaming establishment's data trends, such as having a tournament when the gaming establishment is known to have a "low traffic" lull, such as Tuesday mornings.

For example, upon a certain trigger, an instant tournament is initiated. Any qualified player, based on any suitable of qualifying criteria, is alerted about the tournament initiation. In one embodiment, a message appears on the eligible player's gaming machine prompting the player to join the tournament. The player may then be given the opportunity to enroll and register in the tournament. Upon a second trigger, the tournament will begin and all qualified and registered players play in the tournament instantly. This type of tournament creates spontaneous excitement across the floor by offering instant, high frequency tournaments.

In another embodiment, the tournament is a multi-round, self-scheduled tournament, where upon qualification and registration, the gaming system informs the players of the number of rounds of the tournament and dates and times for each round. The gaming system enables qualified players to play the rounds at the player's leisure within scheduled times. For example, a self-scheduled tournament first round is between 9 am and 12 pm on Saturday, the second round is between 1 pm and 3 pm on Saturday and the third round is between 4 pm and 6 pm on Saturday. In this self-scheduled tournament mode, the gaming system enables the player to play games in non-tournament mode at a gaming machine, make an input to play the tournament at that same gaming machine, to play the tournament at that same gaming machine and then switch back to non-tournament mode and continue playing regular games at that same gaming machine. This setup provides for the player privacy to play the tournament without having to leave a gaming machine to go to a tournament area.

For example, in one embodiment, the operator sets up a day or dates for the tournament times. Players are qualified based on any number of determined criteria. Qualified players are alerted of their status and can play rounds at their leisure within the set up time parameters. For example, a first player may play round one at 9 am, round two at 1 pm, and round three at 5 pm. A second player may player round one at 12 pm, round two at 3 pm and round three at 4 pm. This setup gives players the flexibility to play when they want and how they want. This self-scheduled setup also provides them with the ability to play in the player order they want in the tournament (i.e., one of the first players or one of the last players). In an alternative embodiment, a final round may also be played with the top contestants (and possibly random wild cards) from the prior rounds.

In one embodiment, the player may enroll in a tournament by selecting a tournament game from a gaming machine menu. For example, in a self-scheduled tournament, the gaming machine enables the player to play non-tournament games. The gaming machine enables the player to select a tournament game from a tournament menu and then play a tournament. In one embodiment of an on-demand tournament, the player may selectively request to play a tournament via a game menu on a gaming machine. It should be appreciated that the gaming system may enable players to select a tournament game in any suitable manner and through the use of any suitable input device.

It should be appreciated that any tournaments may be completed in the self-scheduled format. That is, instead of a same time where every player is required to play the tournament, select times and dates may be offered to the player to complete rounds of the tournament. In one embodiment of the self-scheduled tournament, a player may play at the player's decided time after a certain increment of time, such as 45 minutes after qualifying to play in the tournament. Each day, the gaming system determines one or more winners and awards one or more prizes.

In various types of tournaments, the gaming system enables the player to play an individual tournament. The gaming system enables a single player to play a tournament round and provides that player a tournament result based on a paytable. For example, if a player reaches a certain number of points in the tournament round, that player could qualify for a multi-player tournament, a promotional prize, a monetary prize, or merchandise. The player is not competing against other players in this type of tournament. It should be appreciated that this individual tournament may be played as a bonus tournament or a self-scheduled tournament.

In another embodiment, the tournaments are smaller, micro-tournaments that take less time to play. The micro-tournament is a tournament with a shorter duration than a regular or typical tournament. For example, the micro-tournament may last less than a minute, less than five minutes or less than 10 minutes. In the micro-tournaments, upon a suitable triggering event, such as a time of day or a number of players joining the tournament, the gaming system initiates a tournament. The micro-tournament may be synchronized and played as a group or individually played. That is, other players may play the micro-tournament at the same time or individually. In one embodiment, these micro-tournaments are regularly scheduled and the prizes are smaller than for the regular tournaments. In one embodiment, upon a triggering event, such as the generation of a symbol combination, the gaming device switches to tournament mode for a micro-tournament. At a micro-tournament end triggering event, such as a time period, the gaming system determines a winner (instantly or upon an end event for a synchronized tournament or upon an end event for an individual tournament) and provides the winner an award. If the player is still logged on to a gaming machine, the gaming system directly provides the player the credits or a ticket for the award. If the player is no longer playing at the gaming machine, the gaming system messages the player, such as via mail or email, regarding the player's win. In one embodiment, a player is not limited to a single micro-tournament entry but may participate in a play of the micro-tournament after each occurrence of the triggering event. Thus, players may have multiple entries into the micro-tournament.

In another embodiment, any tournament may be played as an on-demand self-scheduled tournament. In one embodiment of an on-demand tournament, the players do not have to qualify for the tournament but may register to play a tournament. In one such embodiment, the players may immediately play a tournament and the scores are compiled over a certain time period, such as a week. At the end of the time period, the gaming system determines the tournament winner. In another embodiment, upon registration for an on-demand tournament, the player has to wait for a certain number of players to register to play in that tournament. For example, a tournament does not begin until 40 players have registered for the tournament. In one such embodiment, the winner is chosen from those 40 players and a prize is awarded. In one such embodiment, the players must pay an entry fee for the tournament. If entry is free, pending players may leave the gaming establishment off-setting the number of tournament players. The tournament in one embodiment provides an incentive to participate in the tournament.

In another embodiment, the player may challenge another player to a tournament. For example, a player may type in a player's name or nickname to challenge the player to the tournament.

It should be appreciated that any tournament may include any suitable number of turbo or bonus modes during tournament game play.

In some tournaments with a number of sessions, players sometimes believe that if they have a bad first round, they have no chance of actually winning the tournament. Thus, the player may stop playing the tournament.

The gaming system may implement a turbo mode for any suitable reason or upon any suitable triggering event. A turbo mode may be used to help a player make up ground if the player is trailing. For example, the gaming system provides one or more turbo modes to a player for a limited time period, such as when that player ranks in the last five players of the tournament. In one embodiment, the turbo modes are triggered upon a game event, such as a symbol combination. In another embodiment, turbo modes are randomly awarded to players during the tournament. It should be appreciated that one or more turbo awards may be awarded to the same player at the same time. In one embodiment, the turbo modes include or are triggered based on a math model or suitable algorithm that is favored to help a player make up ground if they are trailing and keep the tournament more interesting. Various embodiments of a turbo mode include: extra symbol wilds, locked expanding wilds, scatter pays or extra scatter pays, random multipliers, higher paytables, extra points, additional winning combinations, faster play, auto play, extra paylines or extra ways, extra reels, or any other desired features.

In one embodiment, the player's primary display device has meters showing the player's current position in the standings and what turbo mode they are playing. Turbo modes may also be displayed and highlighted when active in the tournament game. In an alternative embodiment, the gaming machine messages the player whether or not the player may go into a turbo mode, such as "you are in last place, you are going into turbo mode." In one embodiment, each of the players begins the tournament with one or more turbo modes. The gaming system enables the player to selectively activate the turbo modes at any point in the tournament. In one such embodiment, the gaming system enables the player to choose the type of turbo mode to activate.

In one embodiment the turbo modes are configured to be more likely to be awarded to the players with lower scores than the players with the higher scores. In this instance, the gaming system is more likely to award turbo modes to lower ranked players.

In another embodiment, the gaming system randomly determines one or more gaming machines or players to provide a turbo mode. It should be appreciated that the gaming system may randomly change any one of a tournament player's game during play of the tournament. For example, the gaming system may randomly provide a tournament player a bonus such as multiple jackpots for a designated period of time, an arbitrary bump or increase in the player's score, a special prize, or the opportunity for a point bonus if a certain game outcome occurs (such as designated scatter pays, particular poker hand, three blank symbols, etc). In certain embodiments, this turbo mode "bounces" around from player to player either at random, or based on one or more triggering events. That is, the gaming system randomly provides one tournament player a turbo mode and then the gaming system provides the next tournament player a turbo mode. This can rotate to each tournament player or to less than all of the tournament players.

It should be appreciated that the gaming system may notify a player of a turbo mode in any suitable manner. In one embodiment, the gaming system causes the secondary display of the gaming device that the player is playing to display a message, such as an animation, to alert the player they are playing in a turbo mode or a turbo mode for a designated period of time. In one embodiment, the gaming system causes an auditory alert. For example, the secondary display of the gaming machine begins to flash colorful animation wildly and additionally provides an appropriate audio message and/or jingle or song signifying to the player and those around the player, that the player's tournament game is now in turbo mode. The messaging to the player may change during the turbo mode in any suitable manner. For example, in the embodiment where the turbo mode moves randomly from tournament gaming machine to tournament gaming machine, lighting and/or sound may be used to alert the player that the turbo mode is about to terminate and move to another gaming machine.

One turbo mode includes a locked expanding wild. In this embodiment, at least one of the reels of the slot game stops spinning for a certain time period, a game or a number of games. A wild symbol then expands creating a wild symbol at all or a plurality of the symbol locations on that stopped reel. This locked expanding wild increases the chance of a winning combination for the player.

Another turbo mode includes an extra symbol being wild. That is, upon a triggering event, an extra symbol acts as a wild symbol. The extra symbol may act as the wild symbol for that game, for a limited time period or may require credits to be wagered to maintain the extra wild symbol.

In another turbo mode, all pays are evaluated as scatter pays in a slot game. That is, instead of the gaming machine evaluating symbols along a payline, any combination of generated symbols count towards the win.

In another turbo mode, upon a triggering event, the player's scores are multiplied by multipliers. These multipliers may be randomly determined or may be determined based on some other game event. The multiplier may multiply a single game score or multiple game scores.

In another turbo mode includes a random point increase or point increment. In one such embodiment, the gaming system adds an amount to the player's score to increase the player's points.

In another turbo mode, the gaming machine changes the paytable to provide the player with extra points. For example, in one such embodiment, the gaming machine provides one or more extra winning combinations. For example, a symbol combination that does not normally result in a payout, results in a payout. In another such embodiment, the amount associated with a winning symbol combination increases. In another embodiment, a symbol becomes a special symbol that provides an award to the player.

In another turbo mode, the gaming machine enables the player to play the game faster. That is, the time it takes the gaming machine to generate a game result is reduced, enabling the player to play more games. In one such example, the gaming machine goes into auto play mode, therefore, the player does not have to press a button to initiate game play, speeding up the rate of play.

In another turbo mode, the gaming device changes the number of paylines or ways to win. For example, instead of having three paylines, the player is awarded five paylines during turbo mode. In another embodiment, the player is awarded more ways to win. In another embodiment, the turbo mode includes scatter pay.

In another embodiment, the gaming machine (with or without instruction from the central server) automatically selects the turbo mode for the player and automatically begins the tournament mode.

In one embodiment, the turbo feature is awarded randomly by a mystery mechanism that is checked once per spin (such as a flag). Certain weighting factors can change throughout the tournament, such as a player's point standing. These weighting factors determine whether or not the player receives a turbo mode and can include variables such as position, leader's position, time, or any other variable. These weighting factors are used in a calculation to determine the likelihood of the player receiving a turbo mode.

It should be appreciated that a turbo mode may be implemented based off of any suitable factor. In one embodiment, the gaming system implements a turbo mode for a player based on a player ranking. For example, platinum level players receive at least one turbo mode per tournament round. In another embodiment, the gaming system implements a turbo mode for a player based on an extra wager made for the tournament. In another embodiment, the gaming system implements a turbo mode for a player based on a random determination. In another embodiment, the gaming system implements a turbo mode for a player based on time. The odds of providing a player with a turbo mode may change as the tournament progresses.

In another embodiment, when the game is set to trigger a turbo mode, the gaming system (either the gaming device or the gaming system) randomly determines which type of turbo mode to award to the player according to a weighted table. The weights of the type of turbo modes may be static (remain the same throughout the tournament) or dynamic (change the weights over time with respect to certain factors, such as player performance).

In another embodiment, the gaming machine determines the turbo mode without weighting. Alternatively, the gaming device enables the player to determine which turbo mode to implement. In one embodiment, due to the time-sensitive nature of tournaments, this choice may be required to have been previously stored (such as in the player's account preferences) and requires no player interaction. It should be appreciated that these special bonus or turbo features may occur in a tournament game in any combination concurrently or alone. In one embodiment, the player has the option of selecting which turbo option or bonus option to employ in the game, lending more strategy to the competition. In one such embodiment, the player selects a turbo mode prior to tournament game play. In this embodiment, the player does not have to slow down game play to select the turbo mode. Upon receiving a turbo mode, the gaming machine automatically goes into the turbo mode selected by the player without requiring any player entry or input during tournament game play. That is, the gaming system saves the player's turbo mode preferences and selectively activates one or more of the turbo modes based on any suitable event, such as a triggering game event or a random determination.

For example, a number of players compete in a timed tournament which lasts for ten minutes. At the end of the first fifteen minutes, Player A is winning and Player B is drastically behind. With each spin, the gaming system makes a determination as to whether each player will receive a turbo mode. With the current standings in the tournament, it is determined that Player A has a 30% chance of receiving a turbo mode with each spin and Player B has a 90% chance.

After continuing play with turbo mode for two more minutes, Player B has received a greater number of turbo modes than Player A. Accordingly, the players are nearly tied. At this time, the evaluations of whether or not the players will receive a turbo mode are aligned with the current standings (i.e. both players have a 50% chance or receiving the turbo mode). Additionally, the gaming system weights the types of turbo modes the players can receive and changes the weights of one or more types of turbo modes throughout the tournament.

Players may join a synchronized tournament at the same time. Alternatively, in one embodiment, the gaming system includes a frenzy mode where the gaming system enables players to elect to join the tournament at particular times, in addition to the tournament start time. The gaming system may communicate the times to the players in any suitable manner, such as display the times on one or more display devices or signs, make an announcement in the gaming establishment, or through player tracking. This mode enables players to enter the tournament at multiple times.

The gaming system may create equivalence for players joining the tournament at a later time to enable the players to catch up in points to the earlier joined tournament players in any suitable manner. In one embodiment, a later player receives faster games to achieve more points. In another embodiment, all of the points are doubled for the later joining players. In another embodiment, the gaming system enables the later joining player to place a higher wager, increasing possible points for winning combinations. In another embodiment, one or more game outcomes are multiplied for the later joining players. In another embodiment, the gaming system provides the later joining player one or more extra reels. Such reels may be displayed next to the originally displayed reels. In another embodiment, the gaming system provides the later joining player a second set of reels, which may be displayed on a secondary display device. In another embodiment, the gaming system provides extra paylines for the later joining player. In another embodiment, the gaming device doubles all of the game outcomes based on the original paylines for the later joining player. The gaming system may employ any suitable method to create parity for the later joining tournament players.

In one type of tournament, the gaming system enables players to choose a tournament game from a list of plurality of tournament games. That is, a plurality of the games are programmed to have the same odds and a plurality of different games may be included in the tournament.

Figure 24:
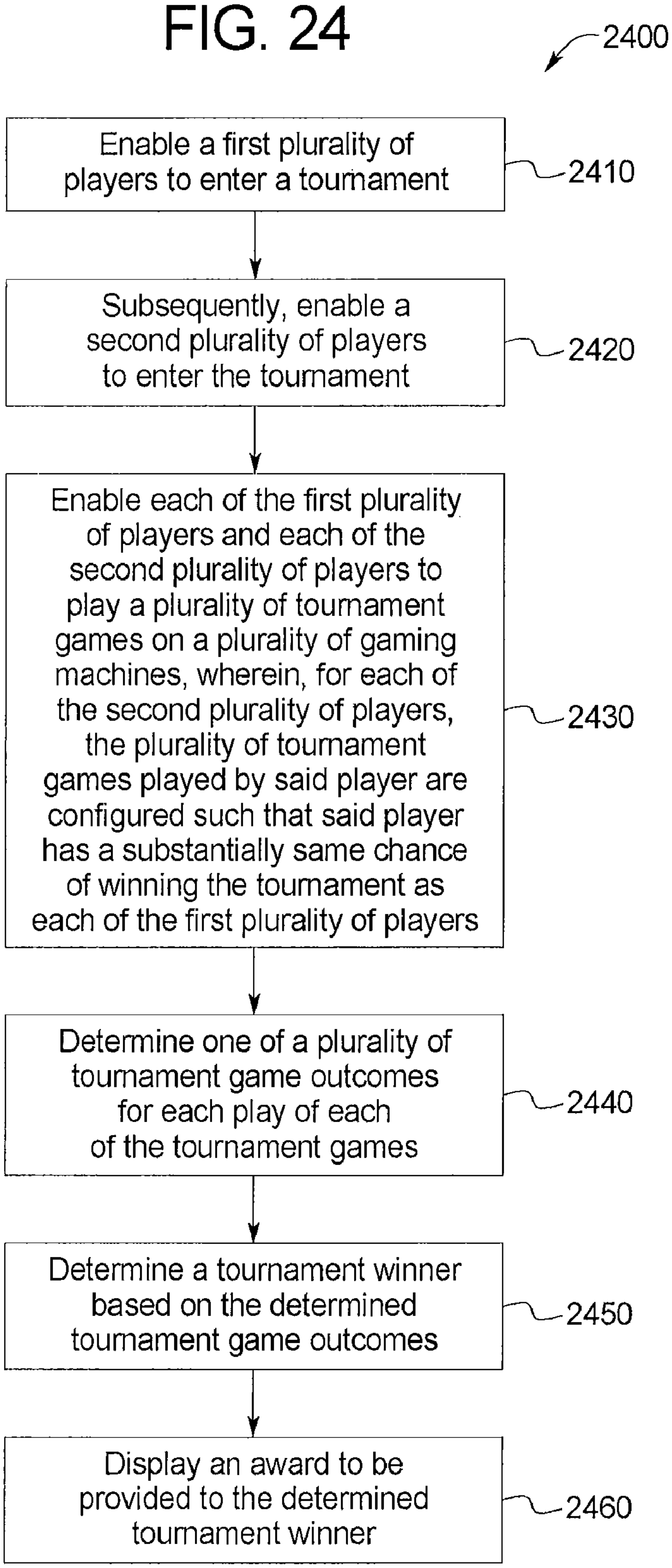
FIG. 24 is a flaw chart illustrating one embodiment of a method of operating the tournament gaming system of the present disclosure that includes enabling a first plurality of players to enter the tournament, subsequently enabling a second plurality of players to enter the tournament, and configuring the tournament games played by the second plurality of players such that each of the second plurality of players has a substantially same chance of winning the tournament as each of the first plurality of players.

FIG. 24 illustrates a flow chart of one example embodiment of a method or process 2400 for operating the tournament gaming system of the present disclosure. In operation, the tournament gaming system enables a first plurality of players to enter a tournament, as indicated in block 2410. Subsequently, the tournament gaming system enables a second plurality of players to enter the tournament, as indicated in block 2420. The tournament gaming system enables each of the first plurality of players and each of the second plurality of players to play a plurality of tournament games on a plurality of gaming machines, wherein, for each of the second plurality of players, the plurality of tournament games played by said player are configured such that said player has a substantially same chance of winning the tournament as each of the first plurality of players, as indicated in block 2430. The tournament gaming system determines one of a plurality of tournament game outcomes for each play of each of the tournament games, as indicated in block 2440. The tournament gaming system determines a tournament winner based on the determined tournament game outcomes, as indicated in block 2450. The tournament gaming system displays an award to be provided to the determined tournament winner, as indicated in block 2460.

In one embodiment, the gaming system enables teams to play tournaments. That is, a plurality of players either form a team to play a tournament or are assigned as a team by the gaming establishment operator or randomly by the central controller. Team play may be incorporated into the scoring of the tournament by utilizing (a) each player's score in the tournament team rank determination; (b) a player's highest score for each team in the tournament team rank determination; or (c) only select scores from one or more of the players for each team in the tournament team rank determination.

In one embodiment, the gaming system enables players at different locations or gaming establishments to compete against each other. In one such embodiment, the players compete against every other player in the tournament to win the prize. That is, the player plays against other players in the gaming establishment the player is playing in, and additionally plays against other players at other gaming establishments.

In another multi-property embodiment, teams are formed by the player's locations. These teams then compete against each other for the tournament prize. For example, five players are on a team and six gaming establishment locations have a team. Each of the six teams competes against each other for a prize.

In another team tournament embodiment, the tournament is a multi-round tournament. In the first round, each of a plurality of players plays on a same team in a preliminary round. In the final round, each member of the qualifying teams plays individually to win the grand tournament prize. For example, Team A includes Players 1, 2, and 3 and Team B includes players 4, 5, and 6. For the first round, the players of Team A compete against the players of Team B to advance to the final round of the tournament as a team. Team A advances to the final round. In the final round, the players of Team A, Players 1, 2, and 3, individually play the tournament. That is, each of the players competes against each and is no longer on a team.

In another embodiment, the tournament makes game pays from tournament wins. That is, upon a tournament win, the gaming system credits the player's tournament account or credit meter and immediately switches the gaming machine back to non-tournament mode. The gaming system then enables the players to use the tournament win to wager on non-tournament games at the same gaming machine.

It should be appreciated that the gaming system of the present disclosure may operate over a wireless gaming system. The gaming machines of the gaming system may be hand held or wireless devices that enable players to play non-tournament and tournament games at a variety of different locations. Any aspect or step of the tournament or regular game play may be accomplished through wireless game play, including the functions of the gaming establishment operator. For example, the gaming establishment operator may start the tournament round or session from a wireless apparatus or a player may play a round or session from a wireless apparatus. Wireless apparatuses may display any suitable type of information to the players, to the public and/or to the gaming establishment operators such as, a list of qualified players, the scores of a tournament, the rules of the tournament and any other suitable information.

In one embodiment, the gaming system enables one or more players to make one or more side bets on one or more player's tournament performance. In this embodiment, the player is enabled to place a side bet, or side wager on the outcome of one or more tournament players' games. Once the player places a side bet for a designated player performance, the gaming system provides the player an outcome based on that side wager or side bet. In one embodiment, the gaming system enables the player to wager on his or her own performance. In one embodiment, the gaming system enables non-tournament player's to place side wagers. In one embodiment, the gaming system only enables players to wager on player performance prior to the start of the tournament. In another embodiment, the gaming system enables players to wager on player performance while the tournament is occurring but stops the wagering upon a triggering event. In this embodiment, the system is constantly recalculating odds and associated payout based on current performance.

Such side wagers may be used in any sort of proposition wagering. For example, side wagers may be made on where a certain player is going to finish (i.e., the lower half or the upper half of the tournament players). The side wagers may be made on a final point total for a player (i.e., point total over 1000 points). Additionally, the side wagers may be placed on the age of the winner, whether the winner may be male or female or any other type of proposition betting.

In one embodiment, the tournament offers insurance to a player that they will make it to a final round or win a prize in the tournament. That is, for a monetary fee, a player can win money for not winning the tournament. For example, a player may buy insurance for a set fee, $5, and if the player does not win an award in the tournament, the player receives a certain award, such as $10 back. However, if the player wins the tournament, the player does not receive the insurance back. It should be appreciated that insurance may be used in any suitable aspect of tournament play.

The points earned in a tournament may be used by the gaming system in any suitable manner. In one embodiment, the tournament points are added to a player's account. In another embodiment, tournament points qualify players for one or more other tournaments. In another embodiment, collecting a certain number of tournament points within a specified time period enters the player in a drawing for a prize.

In one embodiment, the gaming machines available for a tournament or enrolled in a tournament identify themselves to potential tournament players and gaming establishment workers. This identification may be completed in any suitable manner.

In one embodiment, the gaming machines each include lights around at least one of the display devices. The gaming machine illuminates the lights to indicate that the gaming machine is either available for a tournament, in tournament mode or is in pre-tournament mode. It should be appreciated that the primary display and/or the secondary display may include lights to indicate one or more gaming machine states.

In another embodiment, the gaming establishment causes the gaming machine to be illuminated by a spotlight to indicate that the gaming machine is either available for a tournament, in tournament mode or is in pre-tournament mode.

In another embodiment, one or more sides or parts of each gaming machine is clear and the gaming machine illuminates the part of the gaming machine to indicate a gaming machine state. For example, the top box or top part of the gaming machine includes glass panels to the left of the secondary display and the right of the secondary display. The gaming machine illuminates one or both of the glass panels to indicate that the gaming machine is either available for a tournament, in tournament mode or is in pre-tournament mode. For example, the gaming machine illuminates the left panel to indicate that the gaming machine is available for a tournament and the right panel to indicate that the gaming machine is in tournament mode.

In one embodiment, a plurality or all of the gaming machines of the gaming system include a candle. A candle is a light that is typically located on the top of the gaming machine. In one embodiment, the candles are round so that an attendant or gaming establishment worker can see the lit candle from any direction. It should also be appreciated that the candle and may be any suitable size and any suitable shape. The candle may be lit for any suitable reason. In one embodiment, when a gaming machine enters a tournament mode, the candle of that gaming machine is lit to indicate to the gaming establishment operator that the gaming machine is in tournament mode.

It should be appreciated that the candles of a gaming machine may be lit for any number of reasons. In one embodiment, the gaming machine illuminates the candle if a player attempts to cash out an amount that is too large for the machine to pay or the machine runs out of money so that an attendant can make a hand payment to the player. In one embodiment, the candles are also lit if the player requests service such as bar service. In any case, the candle informs the gaming establishment operator that the gaming device or player needs attention so that an attendant or operator can respond efficiently.

In one embodiment, the gaming system illuminates the candles of the gaming machines differently for different purposes. That is, the gaming system may illuminate the candle differently depending on a particular problem that needs to be addressed or the gaming mode that needs to be indicated. It should be appreciated that the different gaming machine conditions or modes may be indicated by a candle in any suitable manner.

For example, if an attendant is needed by a player at a gaming machine, the gaming system causes the candle to be illuminated a certain color, such as yellow. When a gaming machine causes the gaming machine to switch to tournament mode, the gaming machine causes the candle to be illuminated in another color such as red.

In another embodiment, the candle is structurally able to signal different problems or gaming modes to the operator simultaneously. For example, in one embodiment, the candle includes two openings for light to permeate. That is, in one embodiment, the candle has a lower slit and an upper slit. The gaming system illuminates the lower slit when a gaming operator is needed at a gaming machine and the gaming system illuminates the upper slit when the gaming machine is in tournament mode.

In another embodiment, instead of a physical marker on a gaming machine to indicate tournament mode, such as the candle, the gaming system includes a graphical marker, such that the gaming system has the capability to indicate tournament machines. For example, the gaming system includes a graphic representation of the floor. That is, the gaming system includes a layout representing all of the gaming machines on a gaming establishment floor. In one embodiment, this graphical representation is displayable via a kiosk, personal computer or a gaming machine to a gaming establishment operator. This graphical representation may be used in any step of the tournament process. In one embodiment, a marker/flag is associated and displayed with the gaming machines in tournament mode to enable the gaming establishment operator to quickly identify which gaming machines are in tournament mode and so that the operator may perform various queries relating to them. For example, the gaming system enables the gaming establishment operator to view only the occupied tournament gaming machines, only view the unoccupied tournament gaming machines view the winning tournament gaming machine or any other suitable sorting of the gaming machines.

Figures 16, 16A:
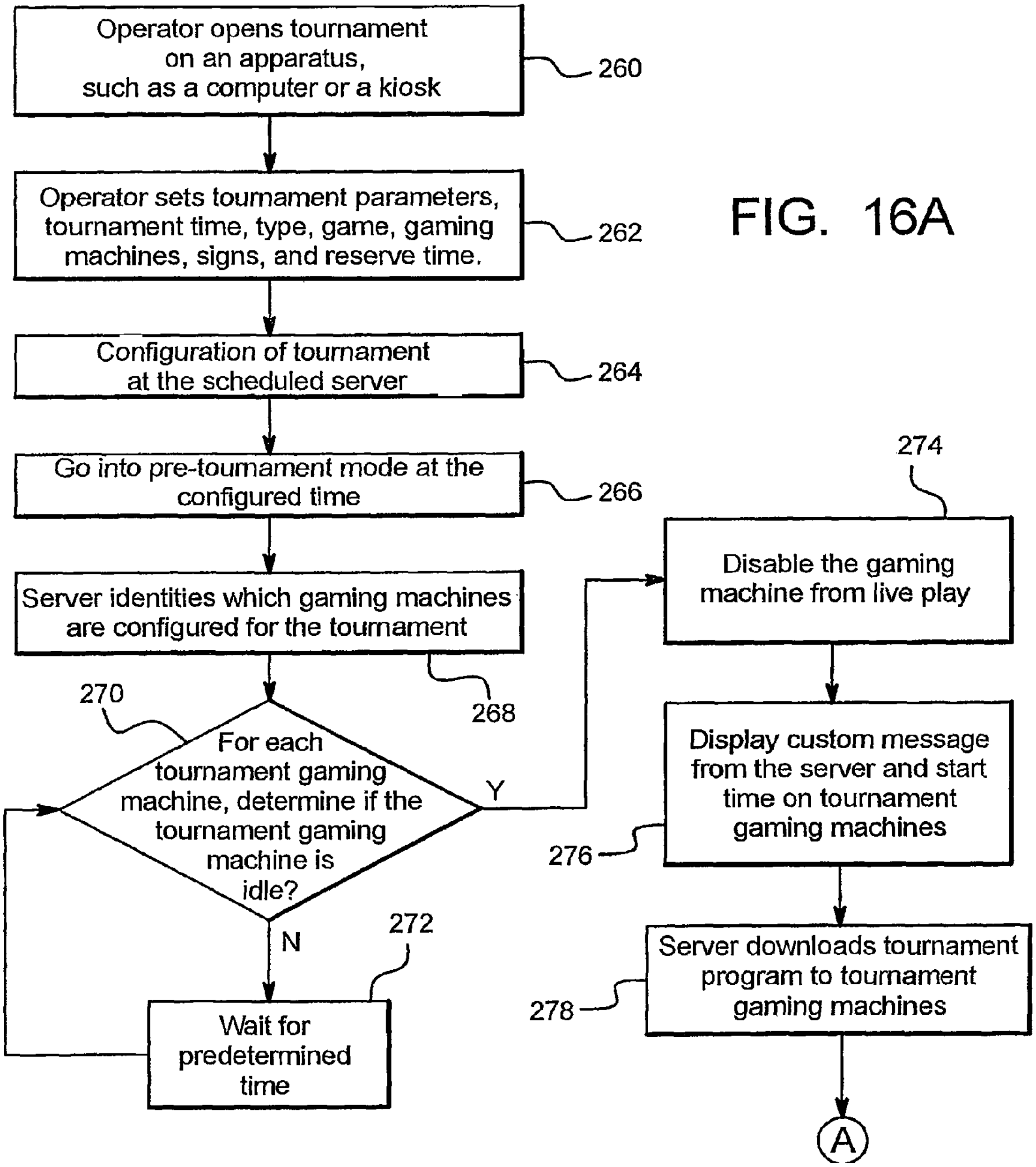
FIGS. 16A, 16B, 16C, 16D and 16E is a flow chart of one method of one embodiment of a tournament disclosed herein.

FIGS. 16A, 16B, 16C, 16D and 16E illustrate one method of a tournament. As illustrated in FIG. 16A, the operator opens the tournament on an apparatus such as a personal computer to configure the tournament, as illustrated in block 260. The operator determines and sets any suitable tournament parameters, as illustrated in block 262. For example, the operator may set any of the parameters previously discussed, such as the tournament time, the type of tournament, the tournament game, the gaming machines, the affiliated signs and the time of the tournament. As illustrated in block 264, the gaming system configures at the tournament at the scheduled server. As illustrated in block 266, the gaming system goes into pre-tournament mode at a configured or reserved time.

That is, a certain amount of time prior to the start of the tournament, the server prepares the determined gaming machines for the tournament.

As illustrated in FIG. 16A, in block 268, the server identifies which gaming machines are configured for the tournament to place the gaming machines in pre-tournament mode and disable the gaming machines from non-tournament game play. As illustrated in diamond 270, for each gaming machine, the server determines if the tournament gaming machine is idle. If the tournament gaming machine is not idle, the gaming system waits for a predetermined time, as illustrated in block 272. If the tournament gaming machine is idle, the gaming system disables the gaming machine from live play, as illustrated in block 274. As illustrated in block 276, the gaming device, in thin client mode (meaning that the server is controlling the display of the gaming machine) displays a custom message on the tournament gaming machines that are disabled from live play. The custom message may include any appropriate message, including but not limited to information about the tournament, the gaming machine and the start time. In one embodiment, server downloads the tournament program to the gaming machines memory, such that the processor of the gaming machine controls the game, as illustrated in block 278.

Figure 16B:
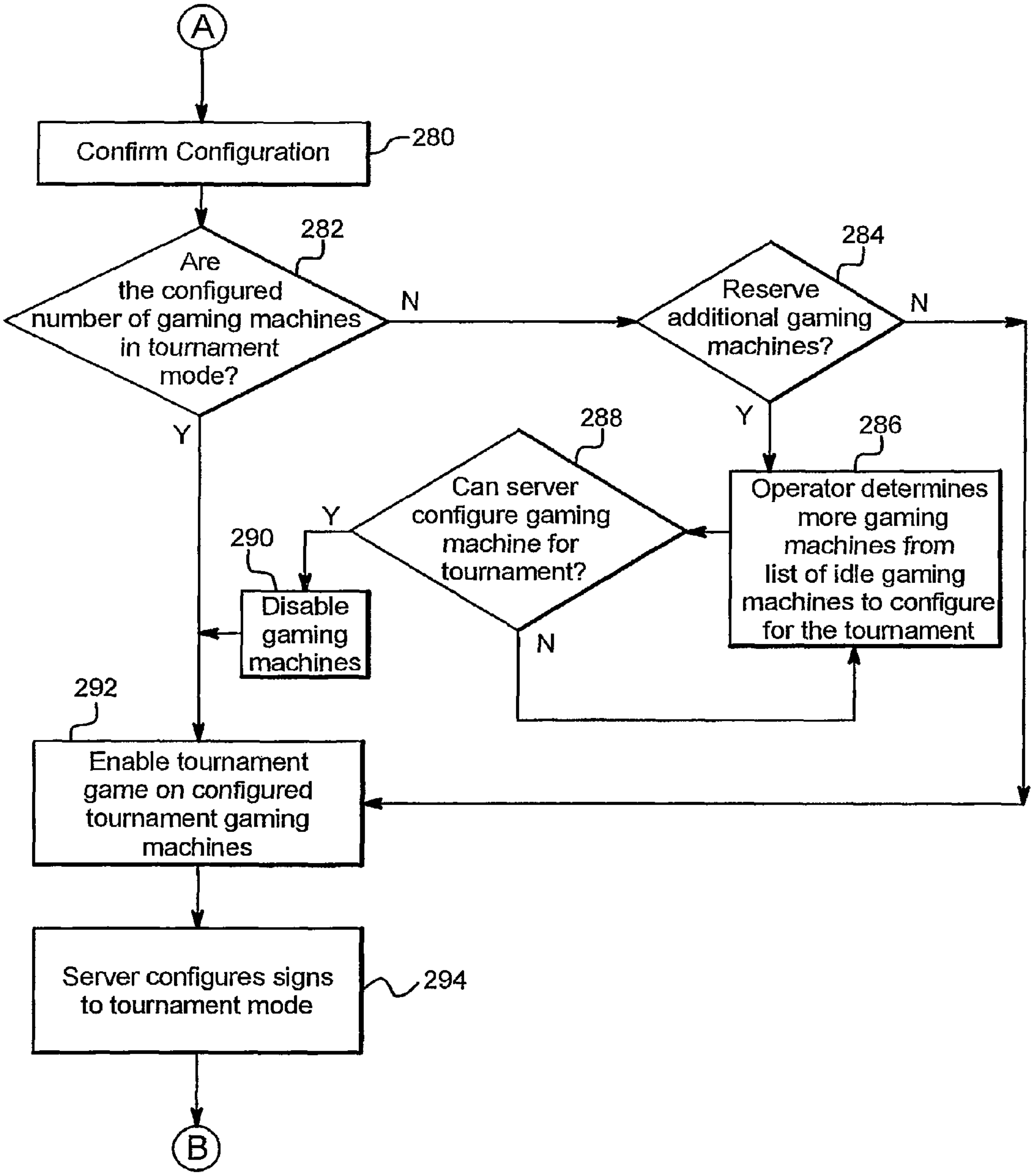

As illustrated in FIG. 16B, the server confirms the configuration of the tournament as illustrated in block 280. The server determines if all of the number of configured gaming machines are in tournament mode, as illustrated in diamond 282. If the number of gaming machines are not configured in tournament mode, the gaming system determines whether to reserve additional gaming machines, as illustrated in diamond 284. That is, the gaming operator determines a number of gaming machines to configure for the tournament. Before the tournament begins, the server determines if each of those gaming machines became idle and was disabled. If a player remained playing on one of the tournament gaming machines, the operator determines whether to reserve more gaming machines. If the operator wants to enable the player on an occupied tournament gaming machine to keep playing non-tournament games, the operator may select another gaming machine for the tournament and rapidly configure that gaming machine. If a gaming establishment operator selects to disable a gaming machine that a player is playing on, the gaming establishment may offer an incentive to the player to transfer to another gaming machine, such as a free amount of game credits. It should be appreciated that adding more gaming machines may also be used to accommodate last minute tournament entries. For example, if a player registers or joins the tournament within five minutes to the start of the tournament, the operator may add in another gaming machine for that player.

If the operator determines to reserve additional gaming machines for the tournament, the operator determines more gaming machines from the list of idle gaming machines to configure for the tournament, as illustrated in block 286. The server determines if the server can configure the determined idle gaming machines for the tournament, as illustrated in diamond 288. If the server cannot configure the idle gaming machines, the operator reserves additional gaming machines, as illustrated in block 286. It should be appreciated a gaming establishment operator may reserve additional gaming machines for any suitable reason.

As illustrated in FIG. 16B, when either the gaming machines have been disabled, as illustrated in block 290 or if the gaming system determines not to reserve additional gaming machines, as illustrated in diamond 284, the server enables the tournament game on each of the configured tournament gaming machines, as illustrated in block 292. The server configures the signs of the gaming system to tournament mode, as illustrated in block 294. As indicated in block 296, the tournament begins when it is time to start the tournament. The gaming system configures signs and other display devices into tournament mode, as illustrated in block 294.

Figure 16C:
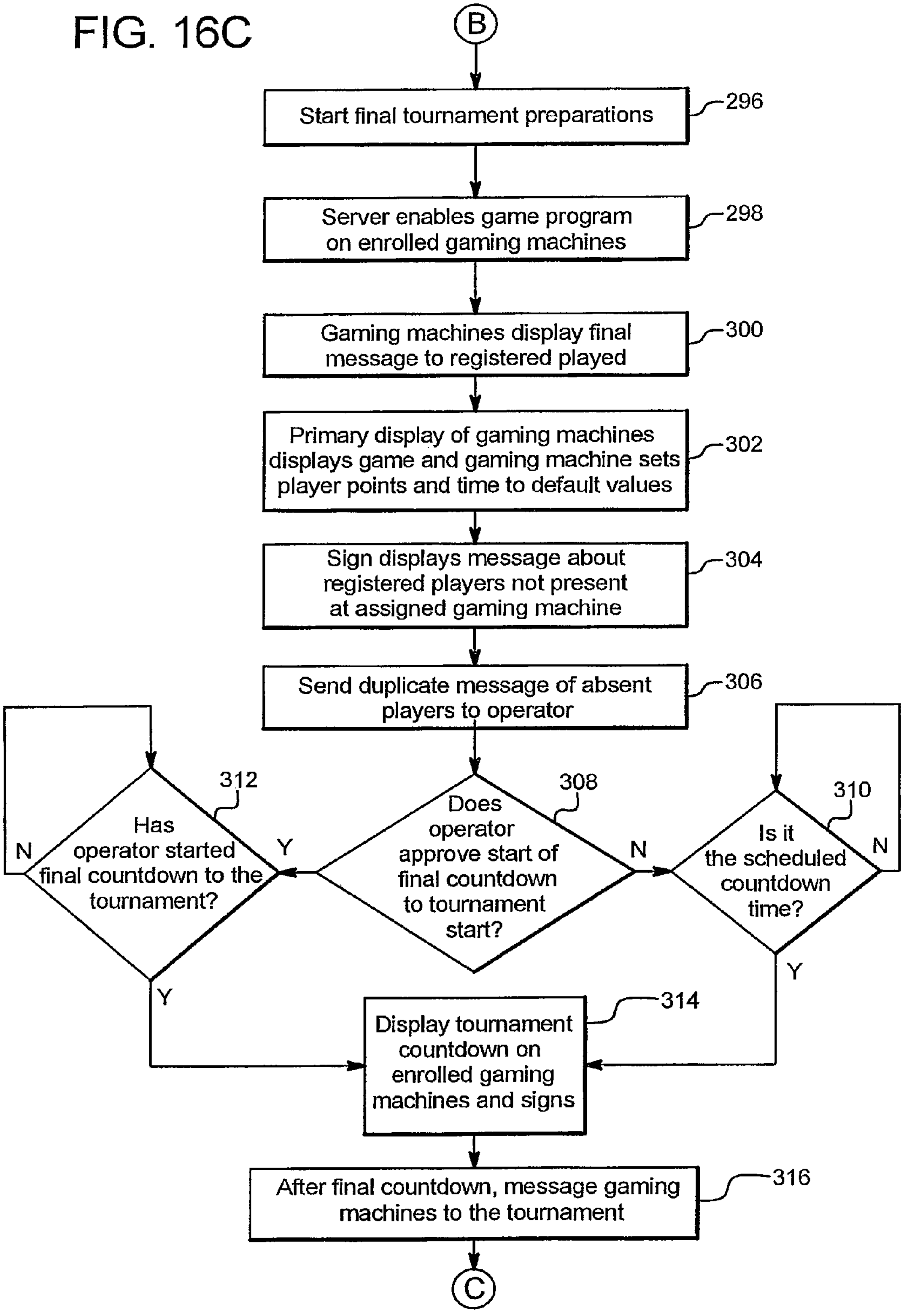

In one embodiment, once a sufficient number of gaming machines are reserved, the server begins the final tournament preparations, as illustrated in FIG. 16C, block 296. In one embodiment, the server enables the game program on the enrolled gaming machines, as illustrated in block 298. The gaming machine displays the final message to the registered players, as illustrated in block 300. The primary display of each enrolled gaming machine displays the game and sets each player's points and times to default values, as illustrated in block 302. The server causes the sign displays to message about registered players not present at their assigned gaming machine, as illustrated in block 304. As illustrated in block 306, the server sends a duplicate message of which players are absent to the operator.

The gaming system determines if the operator approves the start of the final countdown to the tournament start, as illustrated in diamond 308. If the operator does not approve the start of the final countdown to the tournament start, the server determines if is the time for the final countdown scheduled time, as illustrated in diamond 310. If it is the scheduled time, the server causes the countdown to be displayed on the enrolled gaming machines and signs as illustrated in block 314. If the operator determines it is time to start the scheduled countdown, the server determines if the operator has started the final countdown to the tournament, as illustrated in diamond 312. If the operator has not started the time to the final countdown, the server continues to determine if the operator has started the final countdown. If the server determines that the final countdown has started, the server messages the gaming machines and the signs to display the final countdown to the tournament, as illustrated in block 314. After the final countdown, the server messages the gaming machines to start the tournament as illustrated in block 316.

Figure 16D:
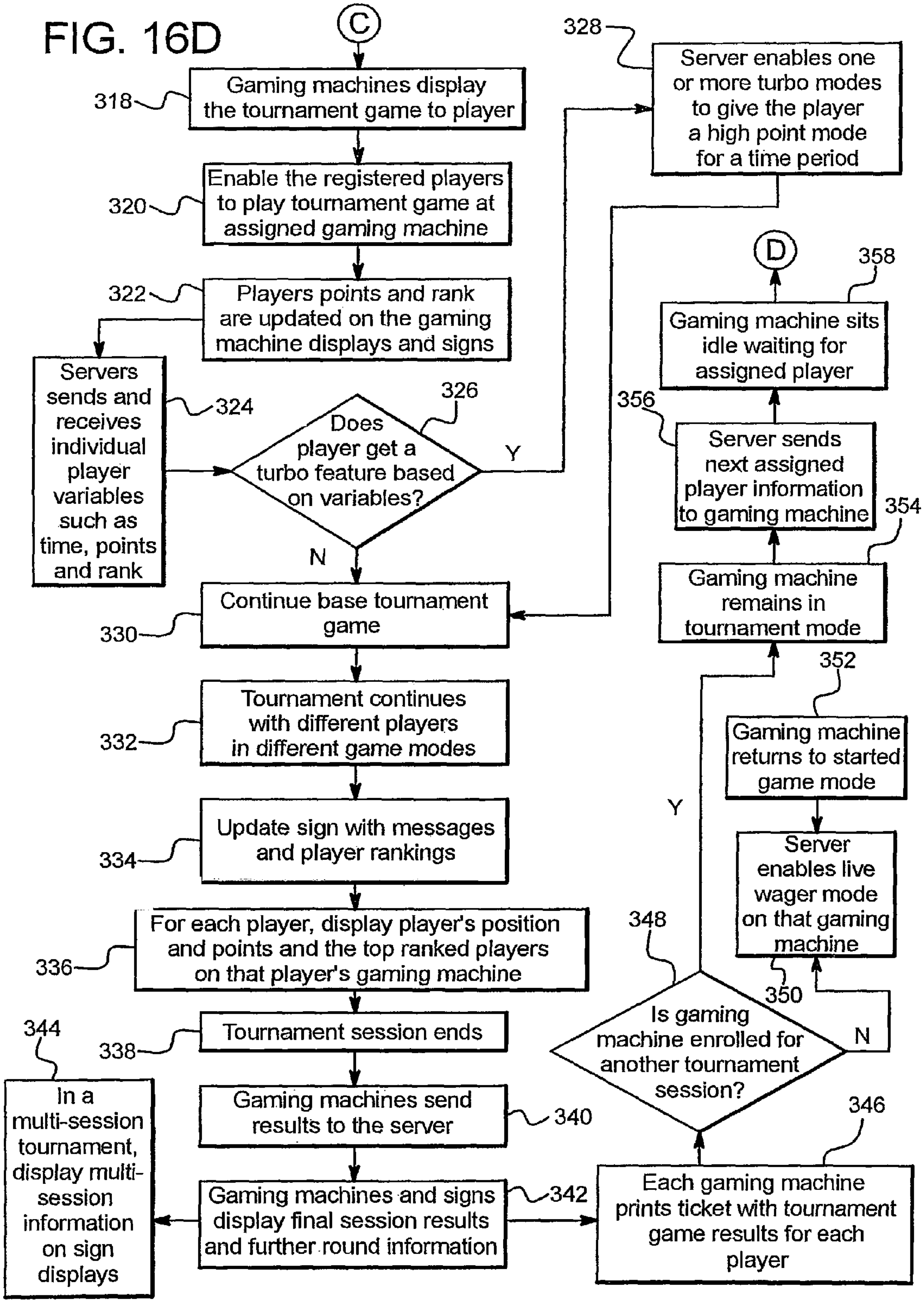

As illustrated in FIG. 16D, block 318, the gaming machines each display the tournament game, as illustrated in block 318. The gaming machines enable the registered players to play the tournament game at the assigned gaming machine, as illustrated in block 320. The players' points and ranks are updated on the gaming machine displays and signs, as illustrated in block 322. The server sends and receives variables of the players, such as the player's status, time, points and rank, as illustrated in block 324. That is, the server receives messages from each gaming machine regarding the player of that gaming machine. The server then sends that message to the other gaming machines and signs. As illustrated in diamond 326, the server determines if each of the players receives a turbo feature based on the variables. If the player receives one or more turbo features, the server enables one or more turbo modes for a time period to enable the player to score more points, as illustrated in block 328. Either when the turbo mode is over, or if the player does not receive a turbo mode, the base tournament game continues, as illustrated in block 330. The tournament continues with different players in different game modes, as illustrated in block 332. For example, one player may be playing with two turbo modes and one player may be playing with four turbo modes. The server causes the signs to display updates with messages and player rankings, as illustrated in block 334. For each player, that player's position and points and the top ranked players are displayed on that player's gaming machine, as illustrated in block 336. According to the tournament configurations, the tournament ends, as illustrated in block 338.

As illustrated in FIG. 16D, each gaming machine sends the results to the server, as illustrated in block 340. The gaming machine and signs display final session results such as player rankings, and further round of information, if there are multiple rounds, as illustrated in block 342. As illustrated in block 344, in a multi-session tournament the sign displays display information from multiple sessions. Upon the session conclusion, round conclusion or tournament conclusion, the gaming machines each print a ticket with the player results for each player at each gaming machine, as illustrated in block 346. These results confirm the tournament game results for that player.

As illustrated in FIG. 16D, the server determines if each gaming machines is enrolled in another tournament session, as illustrated in diamond 348. If the gaming machine is not enrolled for another tournament session, the server enables live wager or non-tournament gaming mode on that gaming machine, as illustrated in block 350. The gaming machines return to standard/non-tournament game mode and enable the tournament player to remain at the gaming machine to play non-tournament games, as illustrated in block 352.

If the gaming machine is enrolled in another tournament session, the gaming machine remains in tournament mode, as illustrated in block 354. The server sends the next assigned player information to the gaming machine, as illustrated in block 356. The gaming machine sits idle and waits for the assigned player, as illustrated in block 358 and the whole process begins again.

Figure 16E:
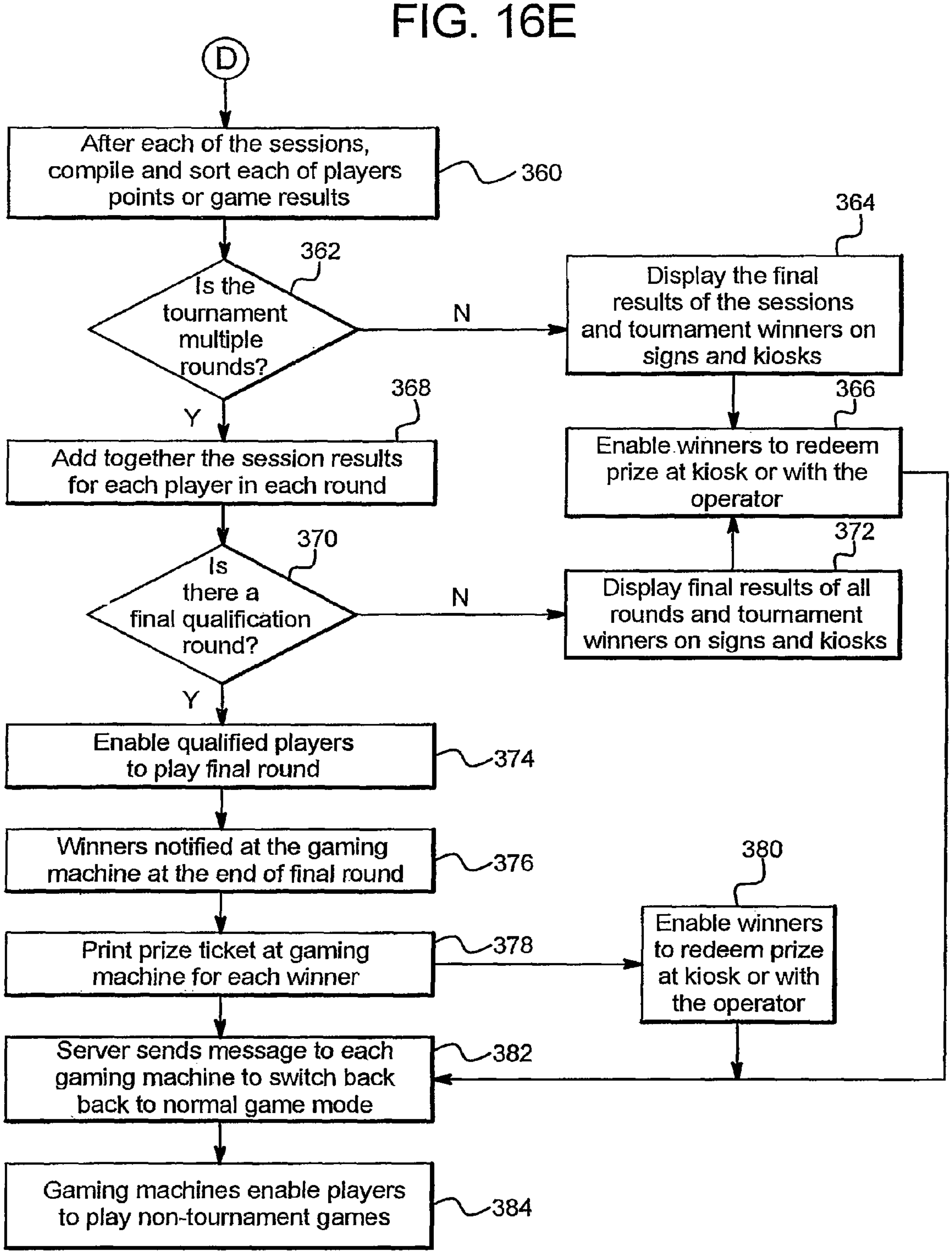

As illustrated in FIG. 16E, after each of the sessions, the server compiles and sorts each of the players' points or game results. The server determines if the tournament is a multi-round tournament, as illustrated in diamond 362. If the tournament is not a multi-round tournament, the final results of the sessions and the winners are displayed on the signs and kiosk, as illustrated in block 364. The gaming system enables the winners to redeem their prize at the kiosk or with the operator, as illustrated in block 366.

If the tournament is a multi-round tournament, the server adds together the session results for each player in each round, as illustrated in block 368 of FIG. 16E. The server determines if there is a final qualification round, as illustrated in diamond 370. If there is not a final qualification round, the server displays the final results of all the rounds and the tournament winner on the signs and kiosks, as illustrated in block 372.

If the tournament includes a final round, gaming machines enable the qualified players to play the final round, as illustrated in block 374 of FIG. 16E. One or more winners of the tournament are notified at that gaming machine at the end of the final round, as illustrated in block 376. For each winner, the gaming machine of the winner prints out a ticket, as illustrated in block 378. The gaming system enables the winners to redeem their prize at the kiosk or with the operator, as illustrated in block 380. The server sends a message to enable each of the gaming machines participating in the tournament to go into non-tournament game mode, as illustrated in block 382. The gaming machines enable the players to play non-tournament games, as illustrated in block 384. That is, each of the players of the tournament may play non-tournament games on the gaming machine when the tournament is over.

Figure 17:
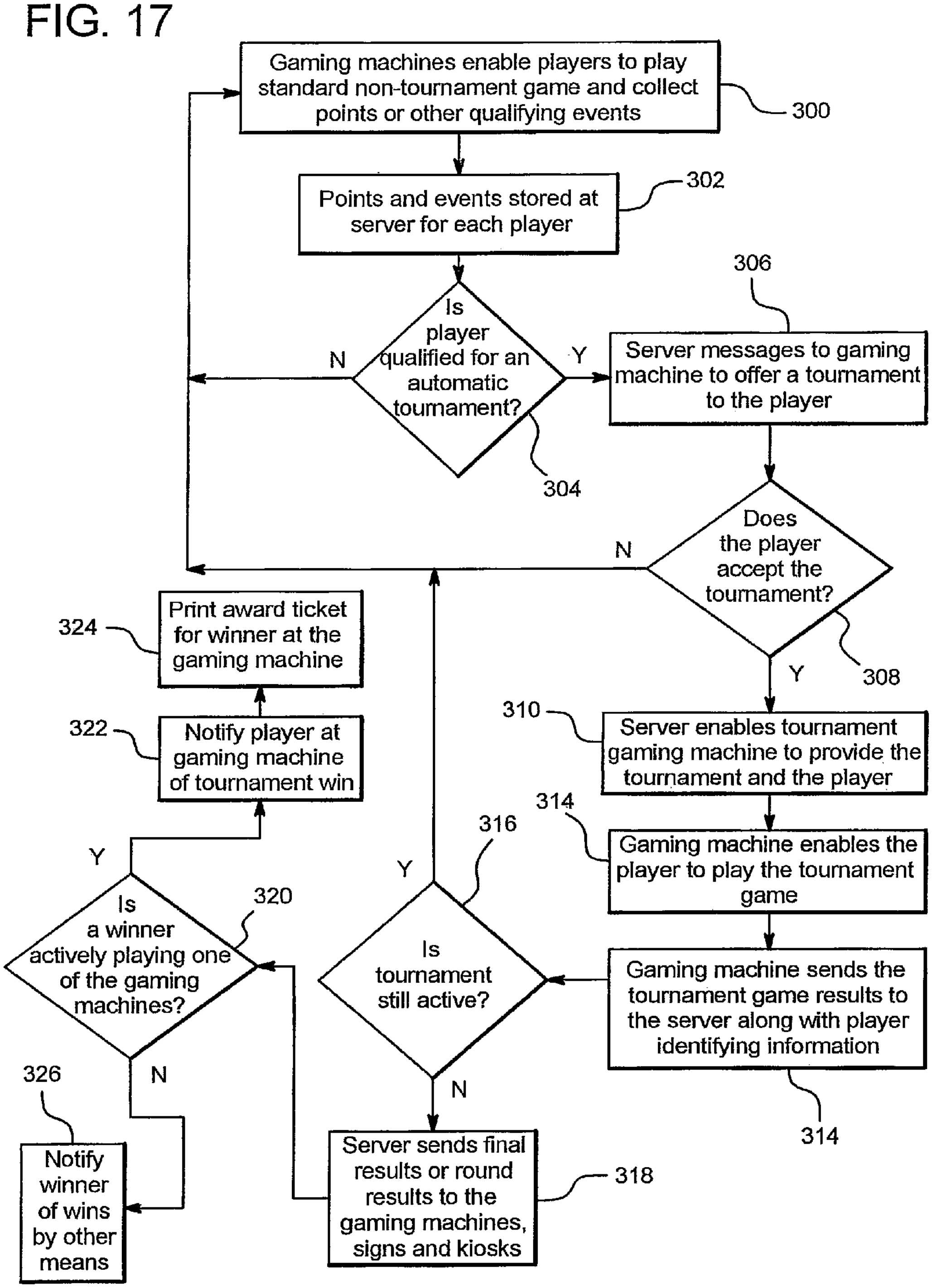
FIG. 17 is a flow chart of one method of one embodiment disclosed herein, illustrating one method of an automatic tournament.

FIG. 17 illustrates one method of a bonus or automatic tournament. After the tournament has been configured, the gaming system enables players to enter or register for an automatic tournament if a player meets one or more qualifying conditions. As illustrated in block 300, the gaming machines of the gaming system enable players to play standard, non-tournament games and collect points or other qualifying events. The gaming machine sends the points and other events to the server for each player, as illustrated in block 302. The server determines if the player is qualified for an automatic tournament, as illustrated in diamond 304. If the player is not qualified to play the tournament, the gaming machine continues enabling the player to play non-tournament games, as illustrated in block 300.

If the server determines that the player is qualified for the tournament, the server messages the gaming machine to offer a tournament to the qualified player, as illustrated in block 306. The server determines if the player accepts the tournament, as illustrated in diamond 308. If the player does not accept the tournament, the gaming machine continues enabling the player to play non-tournament games, as illustrated in block 300.

As illustrated in FIG. 17, if the player accepts the tournament, the server enables the gaming machine to provide the tournament to the player, as illustrated in block 310. The gaming machine enables the player to play the tournament game on the gaming machine, as illustrated in block 312. The gaming machine sends the tournament results to the server with identifying information of the player, as illustrated in block 314. The server determines if the tournament is still active, as illustrated by diamond 316. If the tournament is no longer active, the server sends the final results or round results to the gaming machines, signs and/or kiosks, as illustrated in block 318. The server determines if a winner is actively playing one of the gaming machines, as illustrated in diamond 320. If the winner is actively playing one of the gaming machines, the server sends a message to that gaming machine to notify the player at that gaming machine of the tournament win, as illustrated in block 322. The gaming machine prints an award ticket for the winner, as illustrated in block 324. If the winning player is not actively playing one of the gaming machines, the server notifies the winner by other means, as illustrated in block 326. Upon the completion of a tournament game at any of the gaming machines, the server sends a message to that gaming machine to resume non-tournament game play.

It should be appreciated that if a player is not qualified for a tournament, the gaming system may inform the player how to qualify for the tournament in any suitable manner. In one embodiment, when a player is a certain number of points away, the gaming machine messages the player how much more they have to win to qualify for the tournament. For example, if a player is five player points away from qualifying the tournament, the gaming system messages the player how far they are away from qualifying. The gaming system may message the player at certain time intervals or upon certain events. In one embodiment, when a player attempts to cash out, the gaming system informs the player of how far they have to qualify for the tournament. In one such embodiment, the gaming system enables the player to qualify for a tournament after performing a certain task before cashing out. For example, the player presses the cash out button and the gaming machine informs the player if they play three more games, they will qualify for the tournament. It should be appreciated that the gaming system may update the player as to the player's tournament qualification status in any suitable manner.

Figure 18:
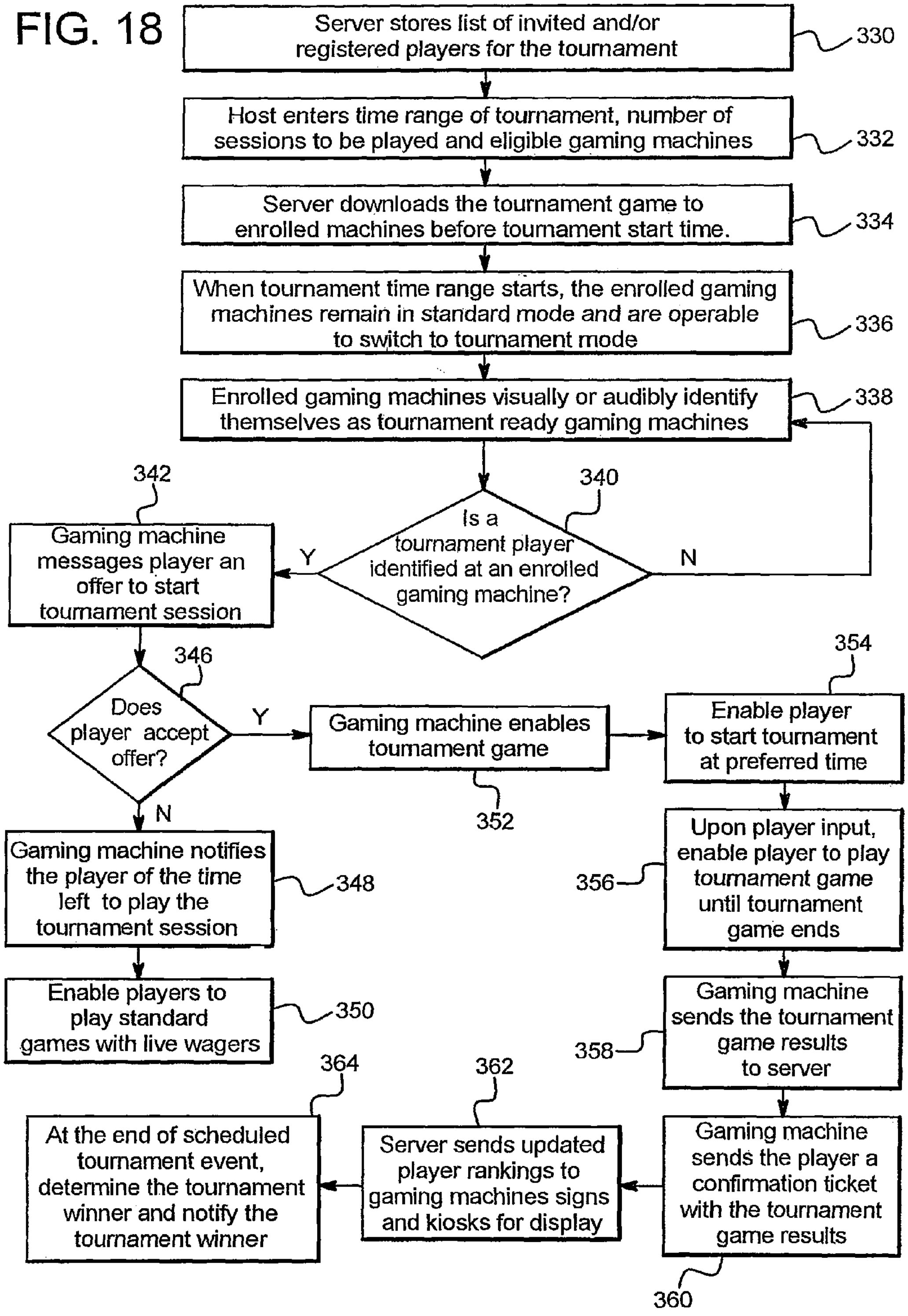
FIG. 18 is a flow chart of one method of one embodiment disclosed herein, illustrating one method of a self-scheduled tournament.

FIG. 18 illustrates one embodiment of an invited guest tournament which is a self-scheduled tournament. The server stores a list of invited players or player entered for the tournament, as illustrated in block 330. The host or operator of the tournament enters the time range of the tournament, the number of sessions to be played and which gaming machines are the eligible gaming machines, as illustrated in block 332. In one embodiment, the server downloads the tournament game to the enrolled gaming machines before the tournament start time, as illustrated in block 334. When the tournament time range starts, the enrolled gaming machines remain in standard mode and are operable to be activated into tournament mode, as illustrated in block 336. In one embodiment, the enrolled gaming machines visually or audibly identify themselves as tournament ready machines, as illustrated in block 338. It should be appreciated that the gaming machines may identify themselves in any suitable manner. The server determines if a player is identified at an enrolled gaming machine, as illustrated in diamond 340. If the player is not enrolled at one of the enrolled gaming machines, the gaming machine continues to identify which gaming machines are operable to play the tournament game, as illustrated in block 338.

If a tournament player is identified at an enrolled gaming machine, the gaming machine messages the player an offer to start the tournament session, as illustrated in block 342. The gaming machine determines if the player accepts the offer to play the tournament session, as illustrated in diamond 346. If the player does not accept the offer, the gaming machine notifies the player of the time left to play or participate in the tournament session, as illustrated in block 348. The gaming machine enables the player to continue play standard games with live wagers, as illustrated in block 350.

If the gaming machine determines that the player accepts the offer, the gaming machine enables the tournament game to be played, as illustrated in block 352. The player chooses when to the play the tournament game, within the allowed time range, as illustrated in block 354. Upon player input, the gaming machine enables the player to play the tournament game until the tournament game ends, as illustrated in block 356. The gaming machine sends the tournament game results to the server, as illustrated in block 358. The gaming machine provides the player a confirmation ticket with the tournament game results, as illustrated in block 360. The server sends updated tournament rankings to gaming machines, signs and kiosks for display, as illustrated in block 362. At the expiration of the tournament, the server determines the tournament winner and notifies the tournament winner via any suitable method, as illustrated in block 364. The gaming system enables the gaming machine to return to standard game play.

In one embodiment, the gaming system includes a special accounting system for tournament proceeds and payouts. That is, the money allotted for the tournament is stored in the gaming system separately than the money wagered by players. In one such embodiment, the gaming system includes a first fund that accounts for the wagers placed in non-tournament play at the gaming machines. In this embodiment, the gaming system includes a second fund for the tournament buy-ins and entry fees. That is, player money or credits that are spent on tournament play are stored apart from player money or credits that are spent on non-tournament game play. It should be appreciated that the gaming system may account for tournament funds in any suitable manner.

It should be appreciated that any suitable element of any of the examples disclosed herein may be combined. It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of operating a tournament gaming system, said method comprising:

(a) causing at least one processor to execute a plurality of instructions stored in at least one memory device to operate with a plurality of gaming machines to, at a designated first point in time, enable a first plurality of qualified players to begin play of a first round of a tournament until a designated third point in time, each of the first plurality of players using one of the gaming machines;

(b) causing the at least one processor to execute the plurality of instructions to operate with the gaming machines to, at a designated second point in time, enable a second plurality of qualified players to begin play of the first round of the tournament until the third point in time, each of the second plurality of players using one of the gaming machines, wherein the second point in time is subsequent to the first point in time and the third point in time is subsequent to the second point in time;

(c) causing the at least one processor to execute the plurality of instructions to operate with the gaming machines to, during the first round of the tournament, enable each of the first plurality of players and each of the second plurality of players to play a plurality of tournament games, wherein, for each of the second plurality of players, the plurality of tournament games played by said player are configured such that said player has a substantially same chance of winning the tournament as each of the first plurality of players;

(d) causing the at least one processor to execute the plurality of instructions to, for each play of each of said tournament games, randomly determine one of a plurality of different tournament game outcomes;

(e) causing the at least one processor to execute the plurality of instructions to operate with at least one display device to display said determined tournament game outcomes;

(f) causing the at least one processor to execute the plurality of instructions to, at an end of the tournament, determine a tournament winner based on the displayed tournament game outcomes; and (g) causing the at least one processor to execute the plurality of instructions to operate with the at least one display device to display an indication of an award to be provided to the determined tournament winner.

2. The method of claim 1, which includes causing the at least one processor to execute the plurality of instructions to determine player qualification for said tournament based on at least one selected from the group consisting of a player card level, a location of one of the gaming machines, a wager amount, a placement of a side wager, an amount won, a jackpot win, a bonus win, a player tracking rank, and a win from another tournament.

3. The method of claim 1, which includes, for each round of the tournament, causing the at least one processor to execute the plurality of instructions to determine at least one round winner for said round based on the displayed tournament game outcomes of said round, wherein said round winner is in addition to the tournament winner.

4. The method of claim 1, wherein the first plurality of players and the second plurality of players have different qualifications for the tournament.

5. The method of claim 1, which is provided through a data network.

6. The method of claim 5, wherein the data network is an internet.

7. A method of operating a tournament gaming system, said method comprising:

(a) causing at least one processor to execute a plurality of instructions stored in at least one memory device to operate with a plurality of gaming machines to, at a designated first point in time, enable a first plurality of qualified players to begin play of a first round of a tournament until a designated third point in time, each of the first plurality of players using one of the gaming machines;

(b) causing the at least one processor to execute the plurality of instructions to operate with the gaming machines to, at a designated second point in time, enable a second plurality of qualified players to begin play of the first round of the tournament until the third point in time, each of the second plurality of players using one of the gaming machines, wherein the second point in time is subsequent to the first point in time and the third point in time is subsequent to the second point in time;

(c) causing the at least one processor to execute the plurality of instructions to provide the second plurality of players an advantage in the tournament, wherein the advantage is configured such that each of the second plurality of players has a substantially same chance of winning the tournament as each of the first plurality of players;

(d) causing the at least one processor to execute the plurality of instructions to operate with the gaming machines and at least one input device to, during the first round of the tournament, for each of the first and second pluralities of players, receive a wager from said player for at least one play of one of a plurality of tournament games;

(e) causing the at least one processor to execute the plurality of instructions to, for each said tournament game played, randomly determine one of a plurality of different tournament game outcomes;

(f) causing the at least one processor to execute the plurality of instructions to operate with at least one display device to display said determined tournament game outcomes;

(g) causing the at least one processor to execute the plurality of instructions to, for each of the players, for each play of each of the tournament games, if a winning tournament game outcome is displayed to said player provide said player an award for said winning tournament game outcome based on said player's wager for said play of the tournament game;

(h) at an end of the tournament, causing the at least one processor to execute the plurality of instructions to determine a tournament winner based on the awards provided to the players; and (i) causing the at least one processor to execute the plurality of instructions to operate with the at least one display device to display an indication of a tournament award to be provided to the determined tournament winner, the tournament award being in addition to any other awards provided to the tournament winner.

8. The method of claim 7, wherein the advantage includes weighting the wagers of each of the second plurality of players more than the wagers of each of the first plurality of players.

9. The method of claim 7, wherein the advantage includes providing the second plurality of players a different number of winning combinations than the first plurality of players.

10. The method of claim 7, wherein the advantage includes providing the second plurality of players a different tournament paytable than the first plurality of players.

11. The method of claim 7, wherein the advantage includes providing the second plurality of players a multiplier.

12. The method of claim 7, wherein the advantage includes providing the second plurality of players a bonus game opportunity.

13. The method of claim 7, which includes causing the at least one processor to execute the plurality of instructions to determine player qualification for the tournament based on at least one selected from the group consisting of a player card level, a location of one of the gaming machines, a wager amount, a placement of a side wager, an amount won, a jackpot win, a bonus win, a player tracking rank, and a win from another tournament.

14. The method of claim 7, which includes, for each round, causing the at least one processor to execute the plurality of instructions to determine at least one round winner for said round based on the provided awards of said round, wherein said round winner is in addition to the tournament winner.

15. The method of claim 7, which includes causing the at least one processor to execute the plurality of instructions to additionally provide tournament credits for winning tournament game outcomes.

16. The method of claim 7, which is provided through a data network.

17. The method of claim 16, wherein the data network is an internet.

18. A method of operating a tournament gaming system, said method comprising:

(a) causing at least one processor to execute a plurality of instructions stored in at least one memory device to operate with a plurality of gaming machines to, at a designated first point in time, enable a first plurality of qualified players to begin play of a first round of a tournament until a designated third point in time, each of the first plurality of players using one of the gaming machines;

(b) causing the at least one processor to execute the plurality of instructions to operate with the gaming machines to, at a designated second point in time, enable a second plurality of qualified players to begin play of the first round of the tournament until the third point in time, each of the second plurality of players using one of the gaming machines, wherein the second point in time is subsequent to the first point in time and the third point in time is subsequent to the second point in time;

(c) causing the at least one processor to execute the plurality of instructions to operate with the gaming machines to, during the first round of the tournament, enable each of the first plurality of players and each of the second plurality of players to play a plurality of tournament games, wherein at least one of the tournament games played by each of the second plurality of players includes a feature that is different than a feature of at least one of the tournament games played by each of the first plurality of players, each different feature of the tournament games played by the second plurality of players being configured such that each of the second plurality of players has a substantially same chance of winning the tournament as each of the first plurality of players;

(d) causing the at least one processor to execute the plurality of instructions to, for each play of each of said tournament games, randomly determine one of a plurality of different tournament game outcomes;

(e) causing the at least one processor to execute the plurality of instructions to operate with at least one display device to display said determined tournament game outcomes;

(f) causing the at least one processor to execute the plurality of instructions to, at an end of the tournament, determine a tournament winner based on the displayed tournament game outcomes; and (g) causing the at least one processor to execute the plurality of instructions to operate with the at least one display device to display an indication of an award to be provided to the determined tournament winner.

19. The method of claim 18, which includes causing the at least one processor to execute the plurality of instructions to group the players by wager denominations.

20. The method of claim 18, which includes causing the at least one processor to execute the plurality of instructions to determine player qualification for the tournament based on at least one selected from the group consisting of a player card level, a location of one of the gaming machines, a wager amount, a placement of a side wager, an amount won, a jackpot win, a bonus win, a player tracking rank, and a win from another tournament.

21. The method of claim 18, which includes causing the at least one processor to execute the plurality of instructions to, for each round of the tournament, determine at least one round winner after said round based on the displayed tournament game outcomes of said round, wherein said round winner is in addition to the tournament winner.

22. The method of claim 18, wherein the different feature of at least one of the tournament games played by at least one of the second plurality of players includes providing extra wild symbols to the at least one player of the second plurality of players.

23. The method of claim 18, wherein the different feature of at least one of the tournament games played by at least one of the second plurality of players includes providing scatter pays to the at least one player of the second plurality of players.

24. The method of claim 18, wherein the different feature of at least one of the tournament games played by at least one of the second plurality of players includes providing multipliers to the at least one player of the second plurality of players.

25. The method of claim 18, wherein the different feature of at least one of the tournament games played by at least one of the second plurality of players includes providing paytable to the at least one player of the second plurality of players that is different than a paytable provided to at least one of the players of the first plurality of players.

26. The method of claim 18, wherein the different feature of at least one of the tournament games played by at least one of the second plurality of players includes providing faster play to the at least one player of the second plurality of players.

27. The method of claim 18, wherein the different feature of at least one of the tournament games played by at least one of the second plurality of players includes providing extra paylines to the at least one player of the second plurality of players.

28. The method of claim 18, wherein the different feature of at least one of the tournament games played by at least one of the second plurality of players includes providing at least one extra reel to the at least one player of the second plurality of players.

29. The method of claim 18, wherein the second plurality of players have different qualifications for the tournament than the first plurality of players.

30. The method of claim 18, which is provided through a data network.

31. The method of claim 30, wherein the data network is an internet.

32. A method of operating a tournament gaming system, said method comprising:

(a) causing at least one processor to execute a plurality of instructions stored in at least one memory device to operate with a plurality of gaming machines to, at a designated first point in time, enable a first plurality of qualified players to begin play of a first round of a tournament until a designated third point in time, each player using one of the gaming machines;

(b) causing the at least one processor to execute the plurality of instructions to operate with the gaming machines to, at a designated second point in time, enable a second plurality of qualified players to begin play of the first round of the tournament until the third point in time, each player using one of the gaming machines, wherein the second point in time is subsequent to the first point in time and the third point in time is subsequent to the second point in time, wherein a feature of the first round of the tournament for the second plurality of players is different than a feature of the first round of the tournament for the first plurality of players, wherein the feature includes providing extra winning combinations to the second plurality of players;

(c) causing the at least one processor to execute the plurality of instructions to operate with the gaming machines to, during the tournament, enable each of the first plurality of players and each of the second plurality of players to play a plurality of tournament games;

(d) causing the at least one processor to execute the plurality of instructions to, for each said tournament game played, randomly determine one of a plurality of different tournament game outcomes;

(e) causing the at least one processor to execute the plurality of instructions to operate with at least one display device to display said determined tournament game outcomes;

(f) causing the at least one processor to execute the plurality of instructions to, at an end of the tournament, determine a tournament winner based on the displayed tournament game outcomes; and (g) causing the at least one processor to execute the plurality of instructions to operate with at least one display device to display an indication of an award to be provided to the determined tournament winner.

* * * * *

UNITED STATES PATENT AND TRADEMARK OFFICE

CERTIFICATE OF CORRECTION

PATENT NO. : 8,070,583 B2
APPLICATION NO. : 11/830198
DATED : December 6, 2011
INVENTOR(S) : Anthony J. Baerlocher et al.

It is certified that error appears in the above-identified patent and that said Letters Patent is hereby corrected as shown below:

IN THE CLAIMS:

In Claim 25, column 83, line 47, before "paytable" add --a--.

Signed and Sealed this
Thirty-first Day of January, 2012

David J. Kappos

David J. Kappos
*Director of the United States Patent and Trademark Office*